Oct. 30, 1945.  K. J. BRAUN ET AL  2,387,828
PUNCHING MECHANISM
Filed Dec. 1, 1944  37 Sheets-Sheet 1

INVENTORS
KARL J. BRAUN AND
OTTO E. KASE
BY
ATTORNEY

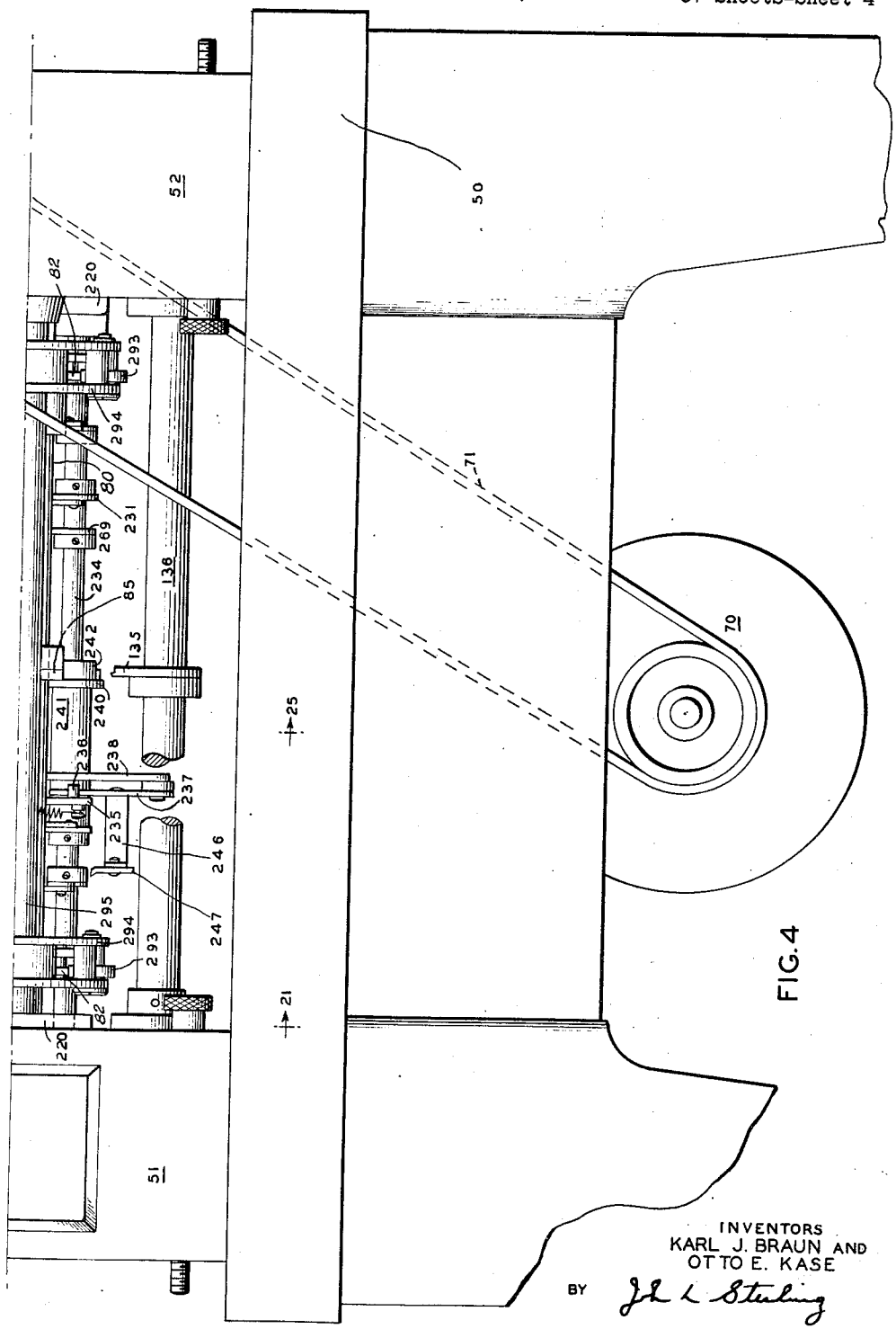

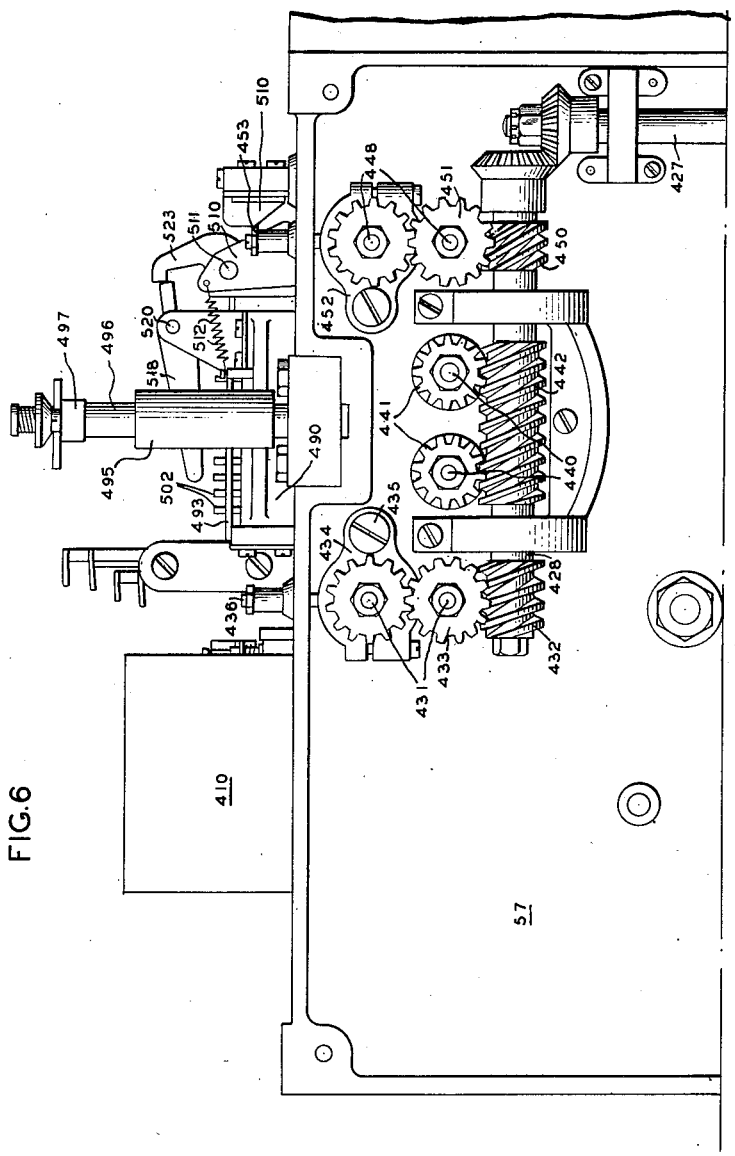

INVENTORS
KARL J. BRAUN AND
OTTO E. KASE
ATTORNEY

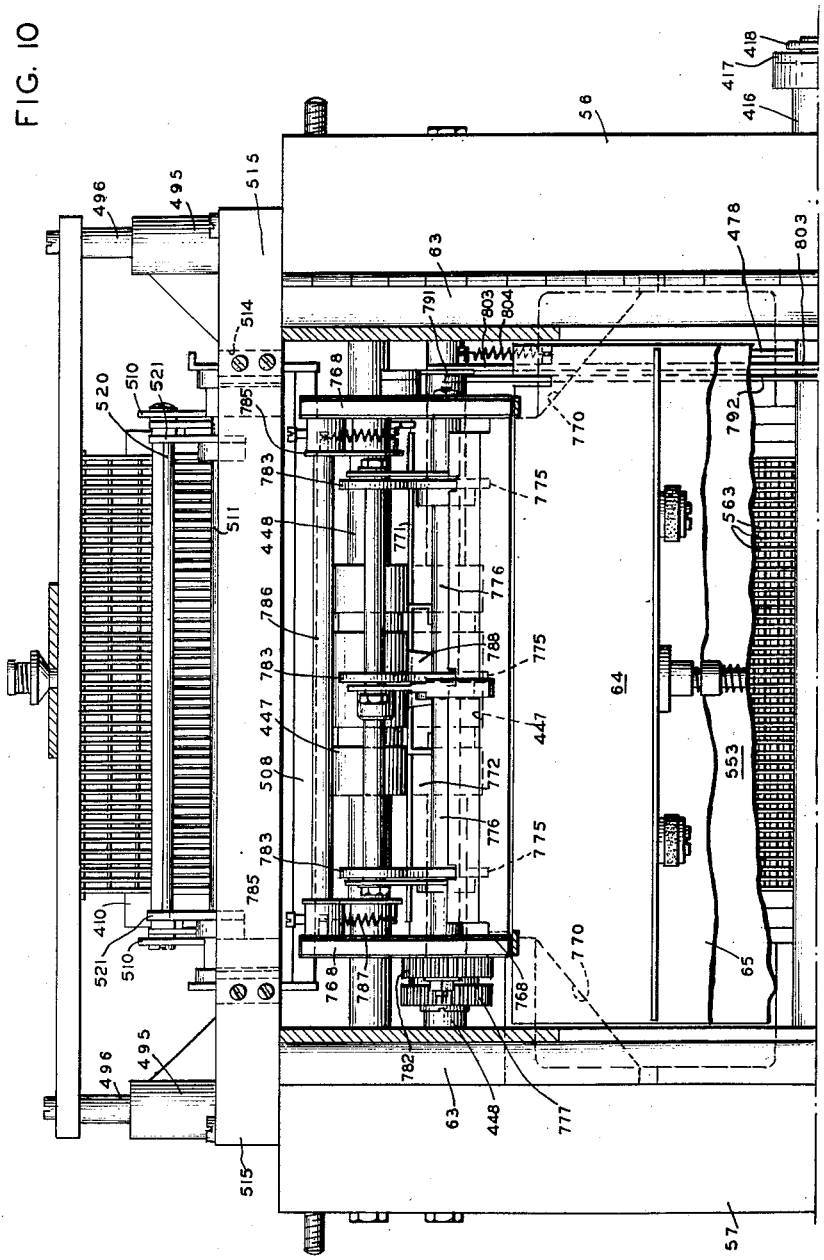

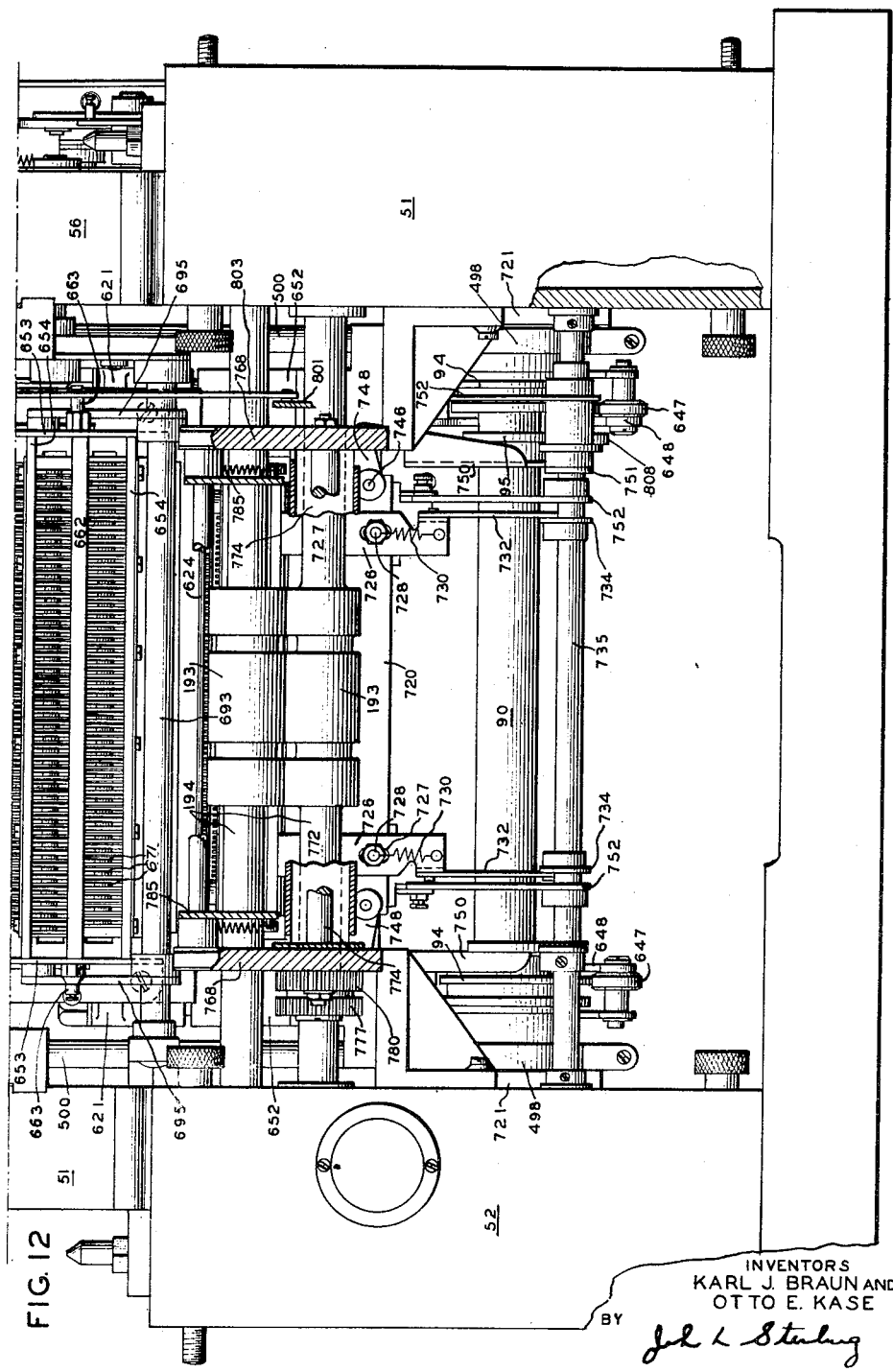

Oct. 30, 1945.  K. J. BRAUN ET AL  2,387,828
PUNCHING MECHANISM
Filed Dec. 1, 1944      37 Sheets—Sheet 11
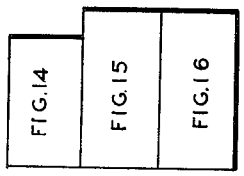
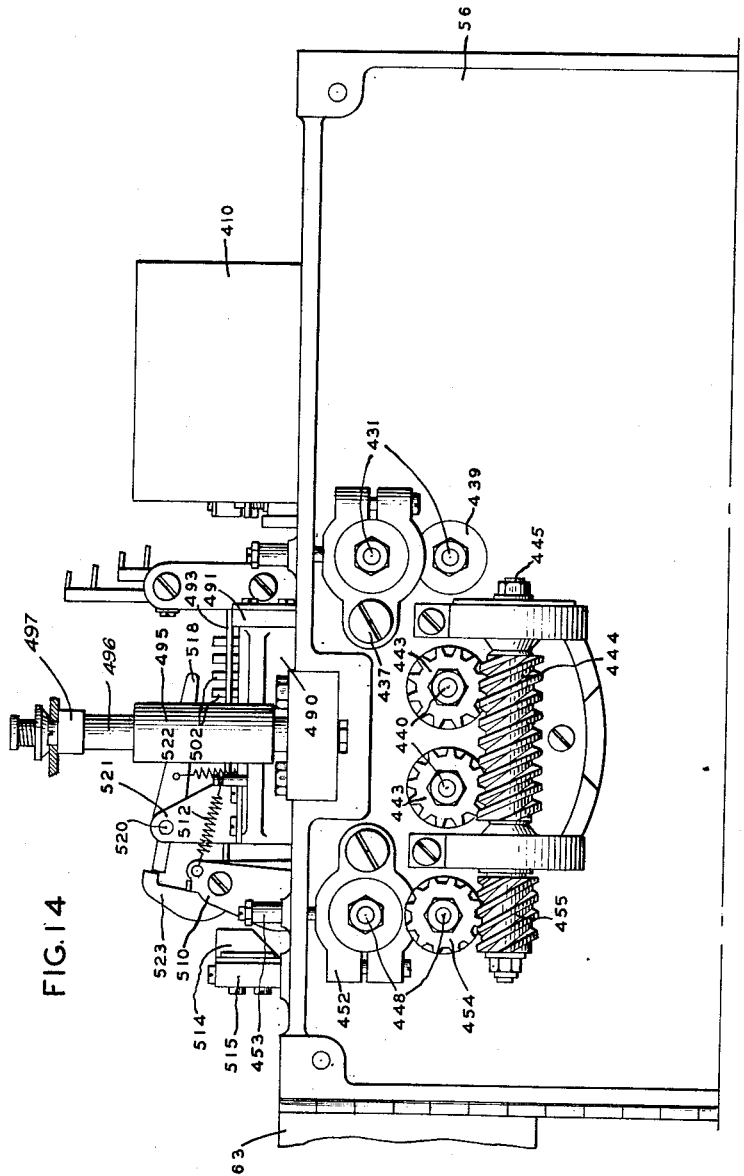
INVENTORS
KARL J. BRAUN AND
OTTO E. KASE
BY
ATTORNEY

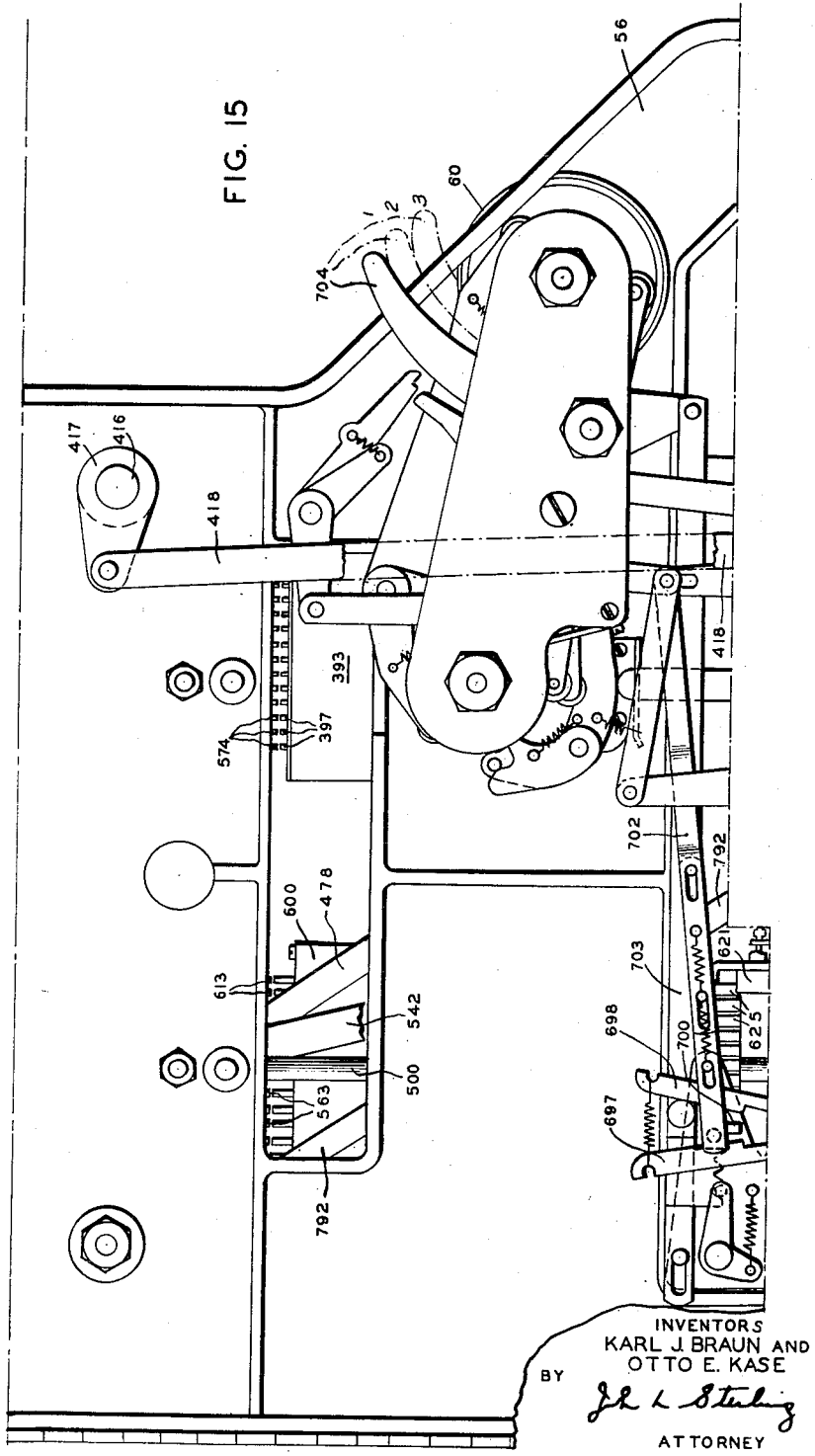

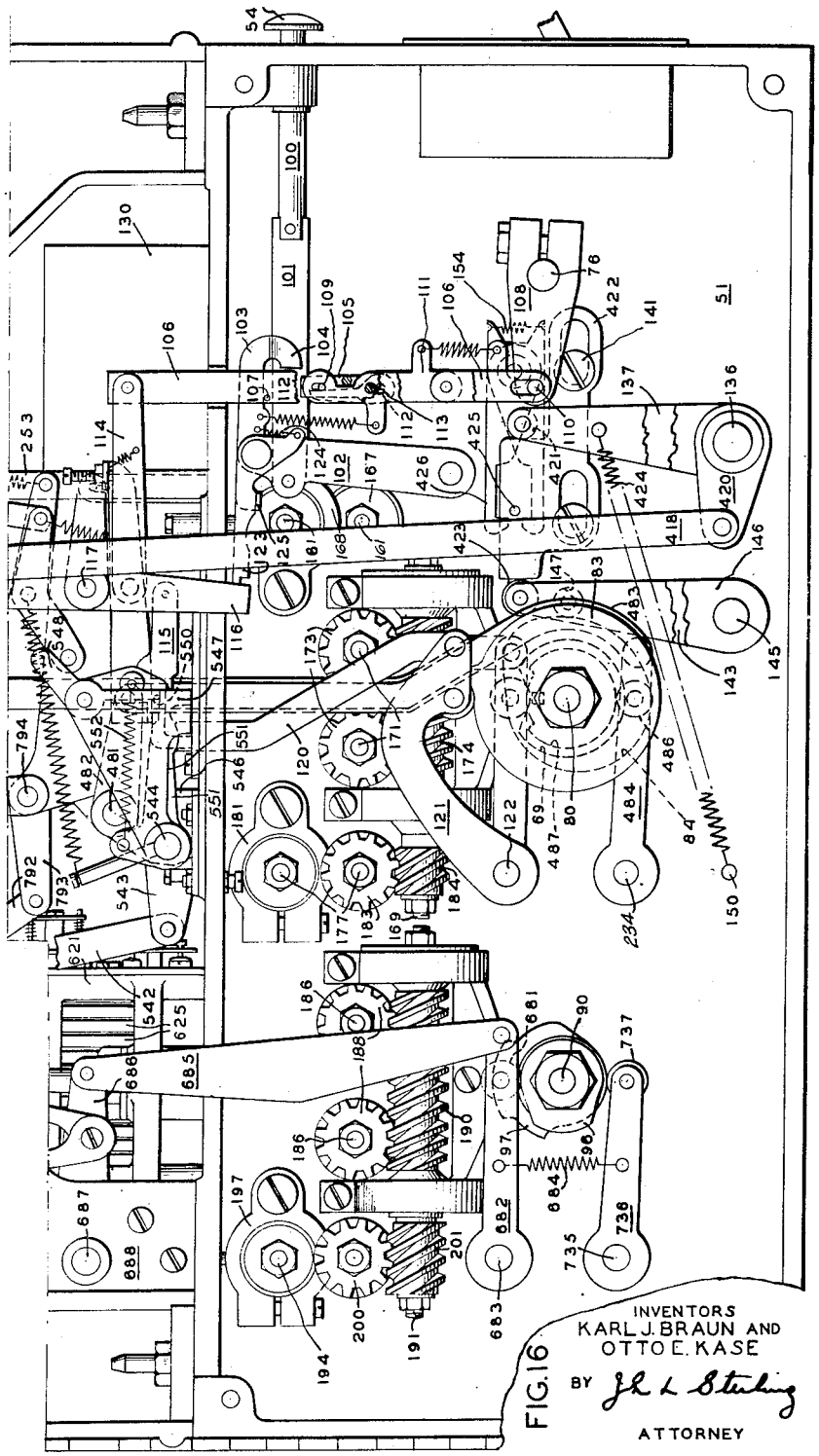

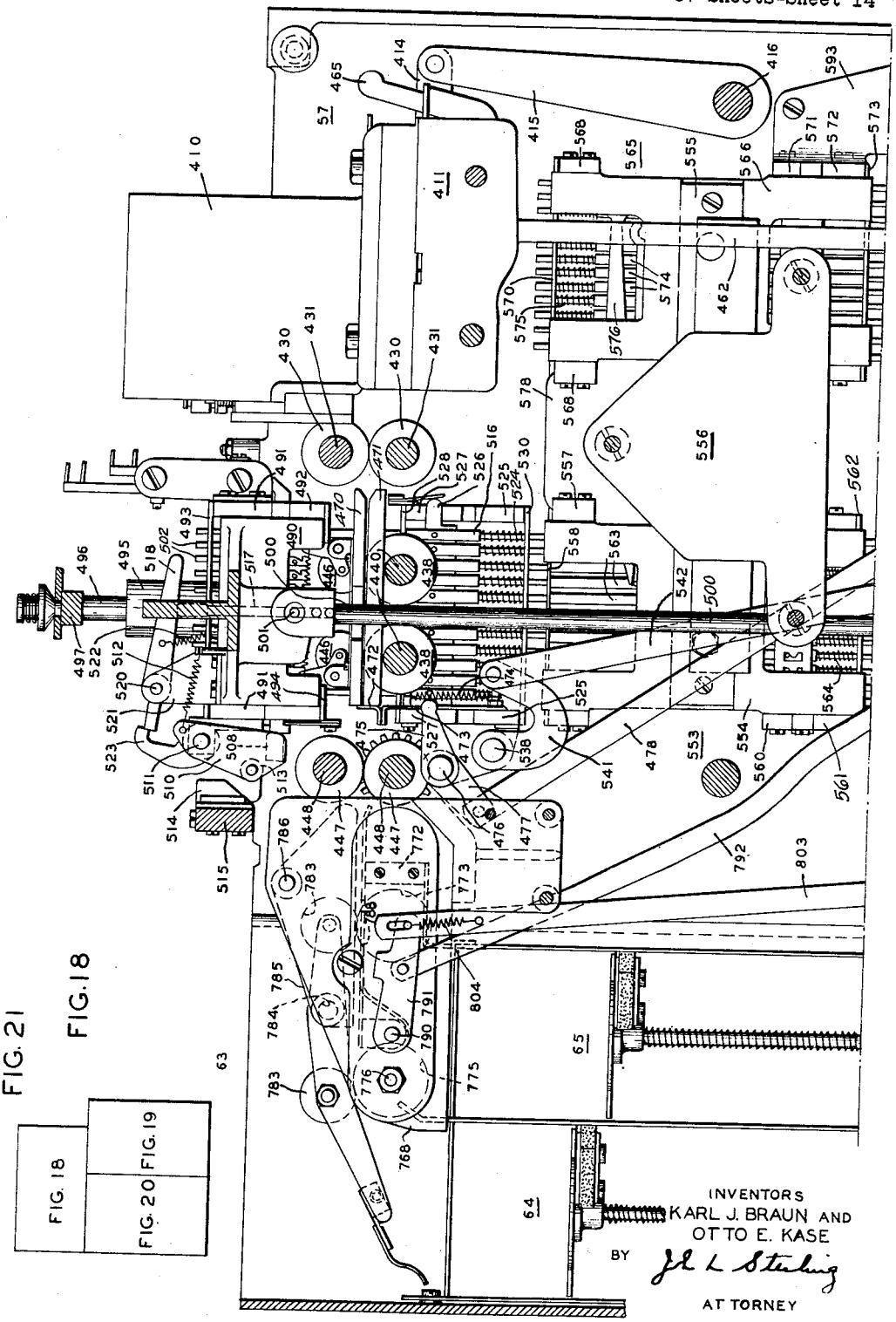

Oct. 30, 1945.　　　K. J. BRAUN ET AL　　　2,387,828
PUNCHING MECHANISM
Filed Dec. 1, 1944　　　37 Sheets-Sheet 15

INVENTORS
KARL J. BRAUN AND
BY　OTTO E. KASE
ATTORNEY

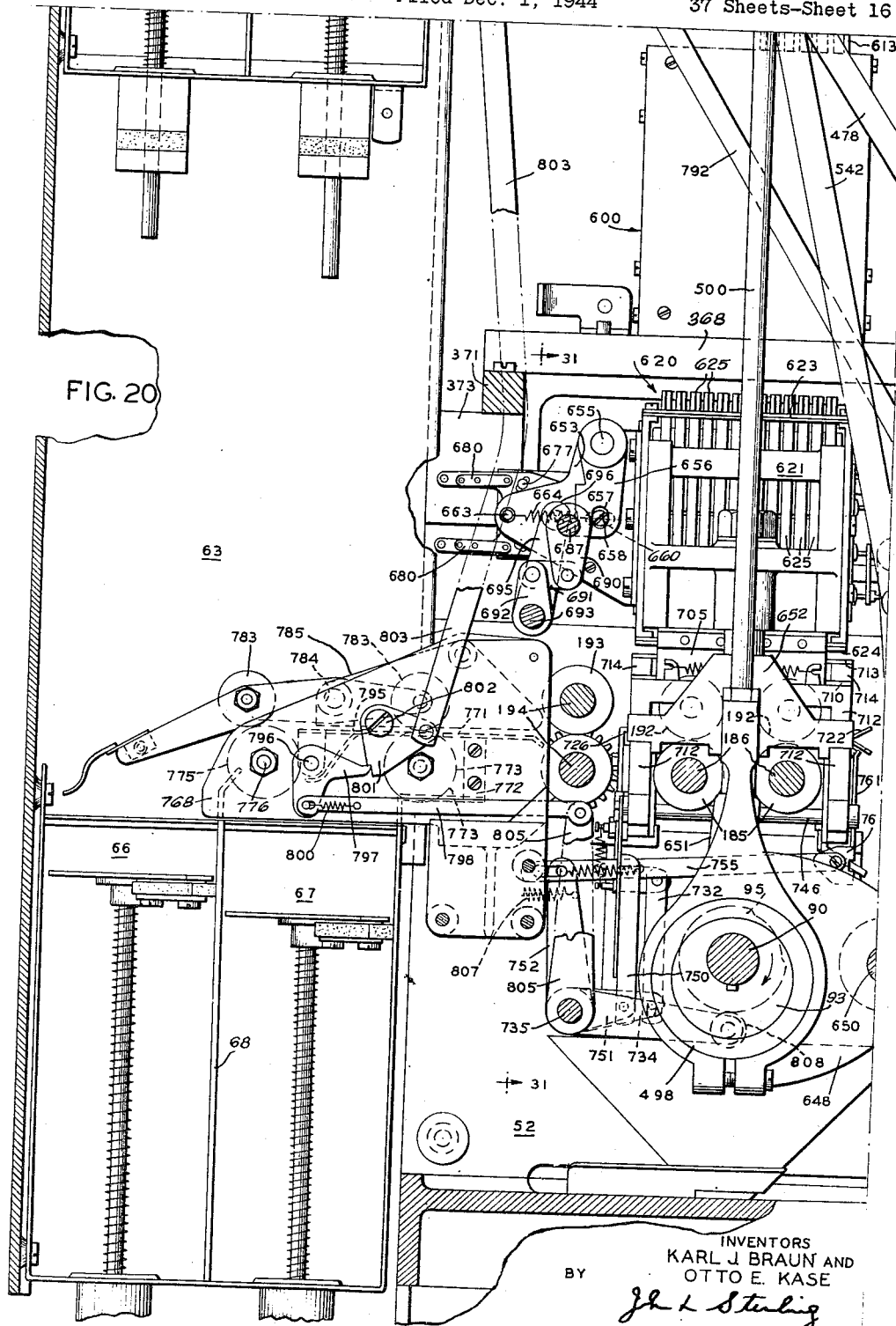

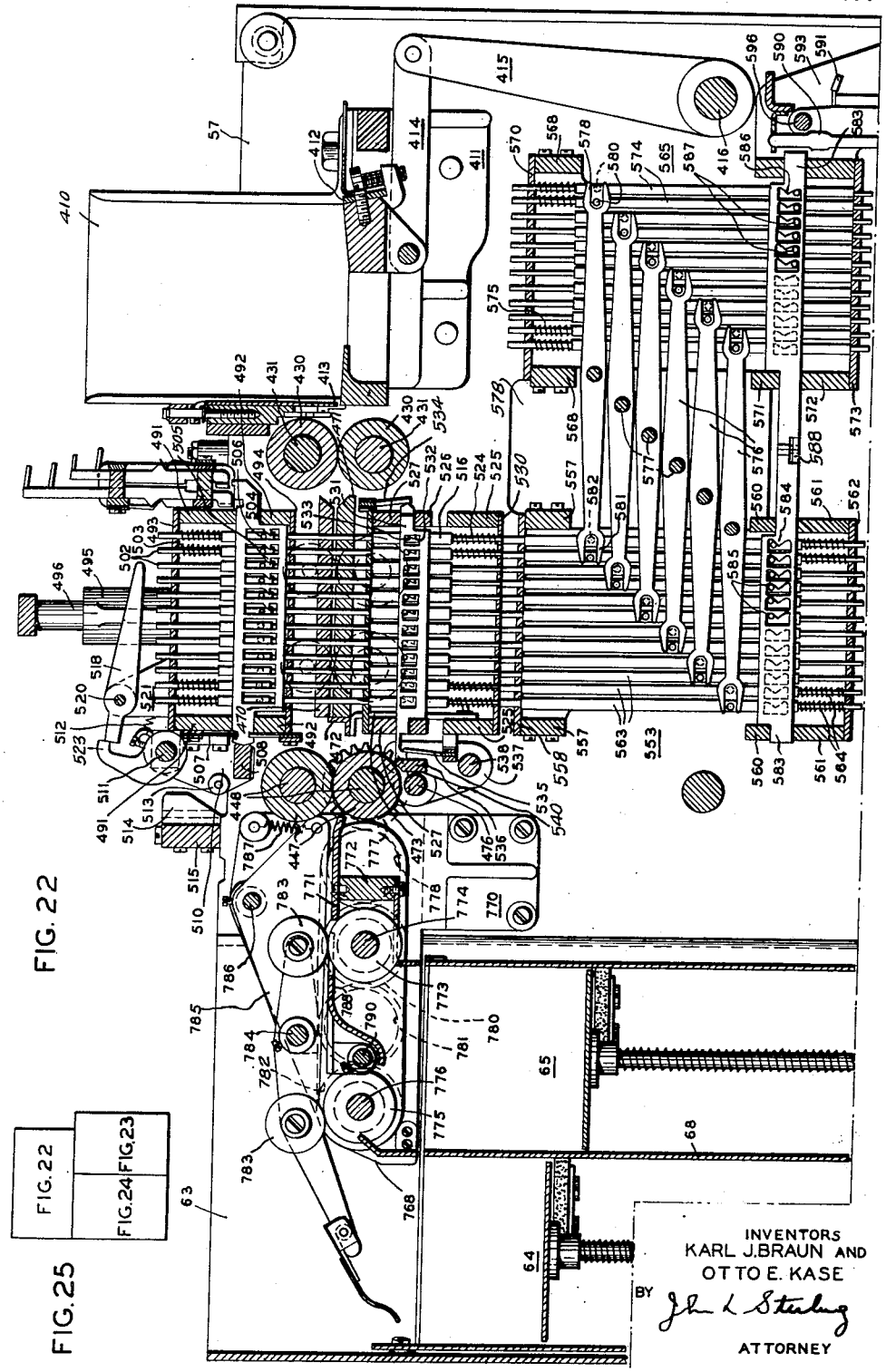

INVENTORS
KARL J. BRAUN AND
OTTO E. KASE
BY John L. Sterling
ATTORNEY

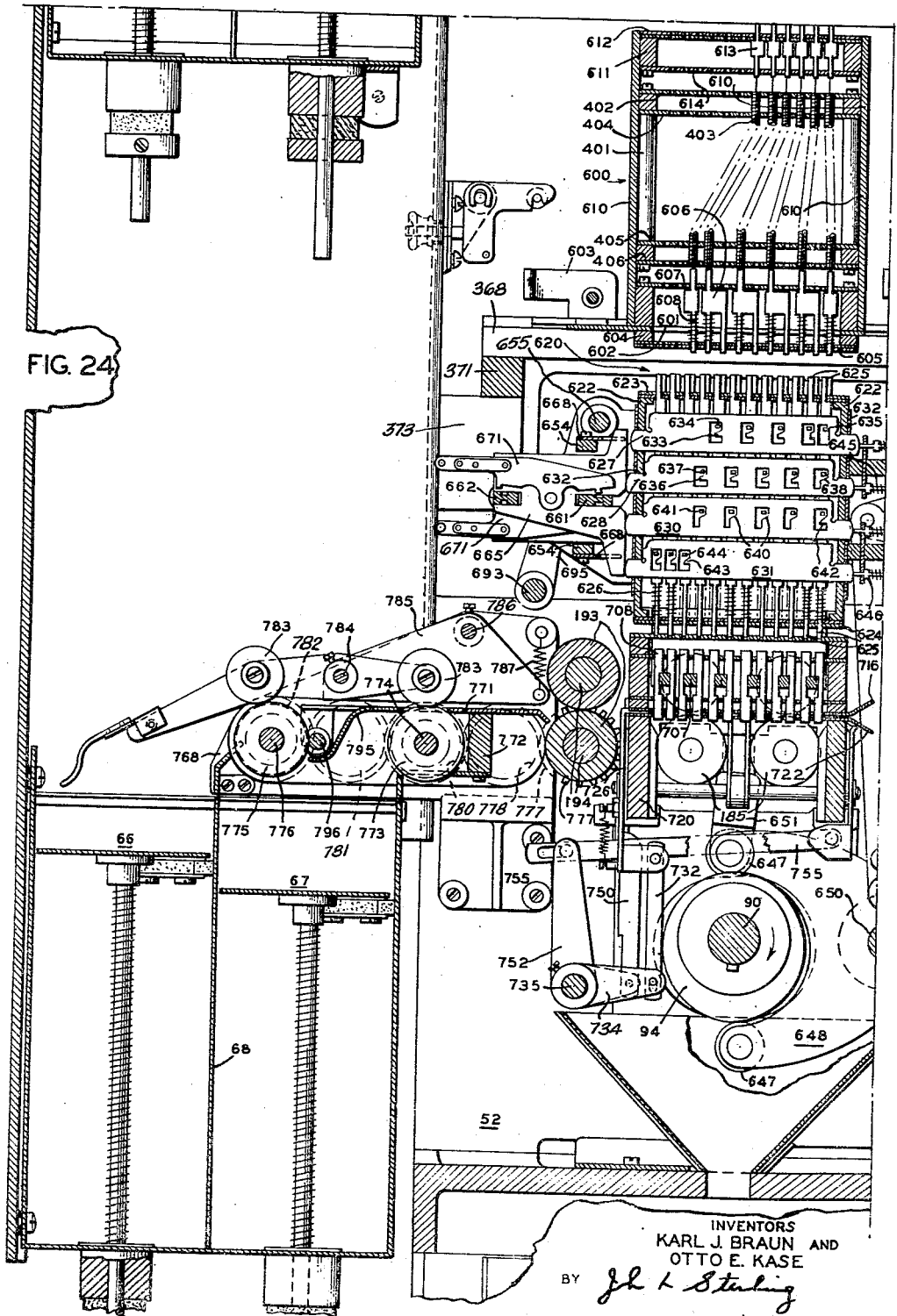

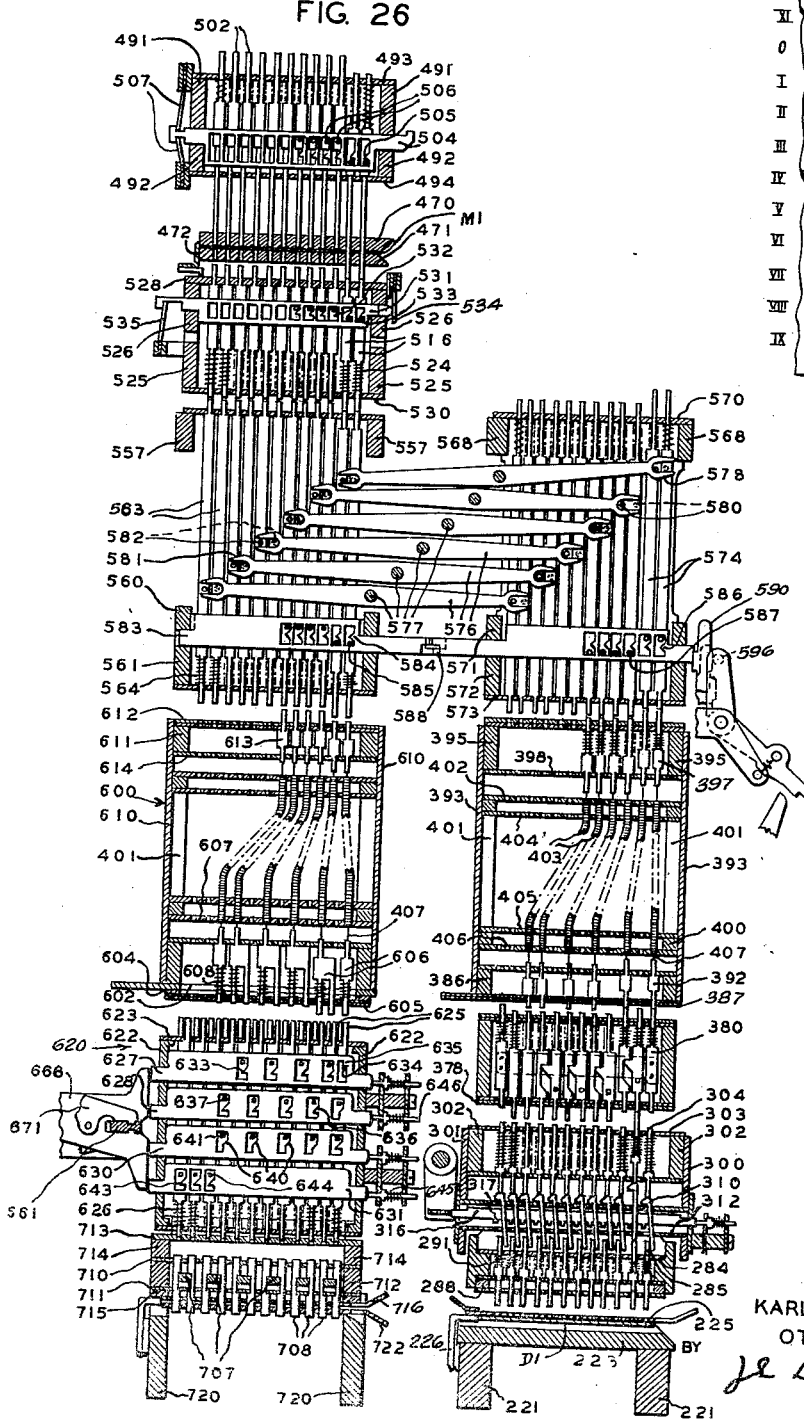

Oct. 30, 1945.   K. J. BRAUN ET AL   2,387,828
PUNCHING MECHANISM
Filed Dec. 1, 1944   37 Sheets-Sheet 21

INVENTORS
KARL J. BRAUN AND
OTTO E. KASE
BY
John L. Sterling
ATTORNEY

Oct. 30, 1945.  K. J. BRAUN ET AL  2,387,828
PUNCHING MECHANISM
Filed Dec. 1, 1944  37 Sheets-Sheet 24
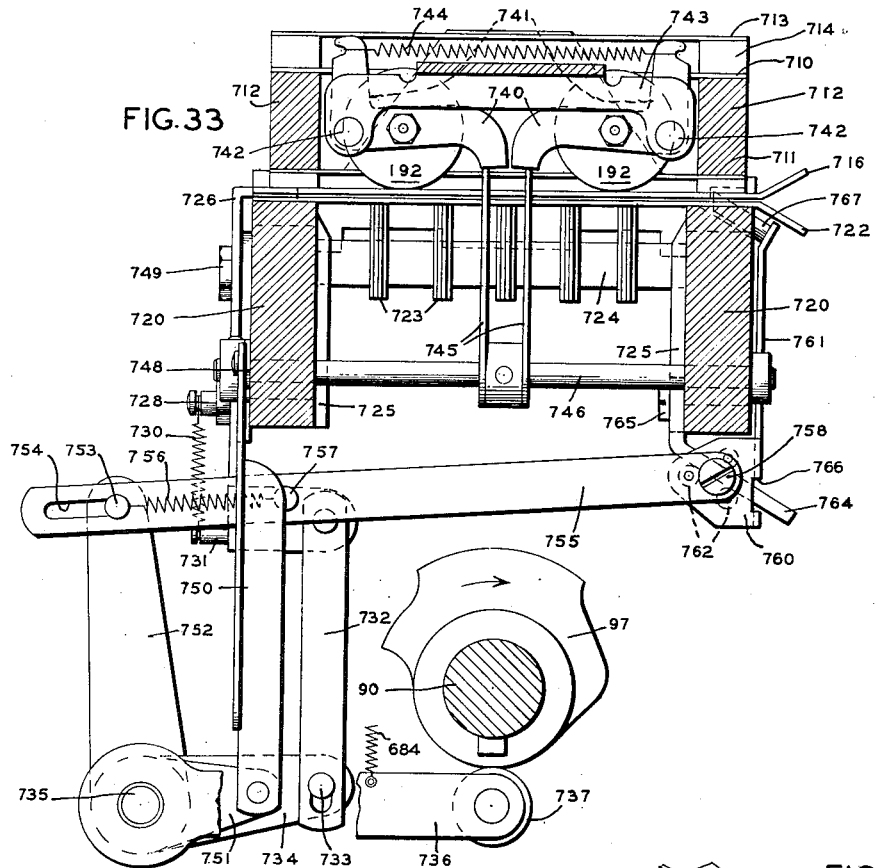
FIG. 33
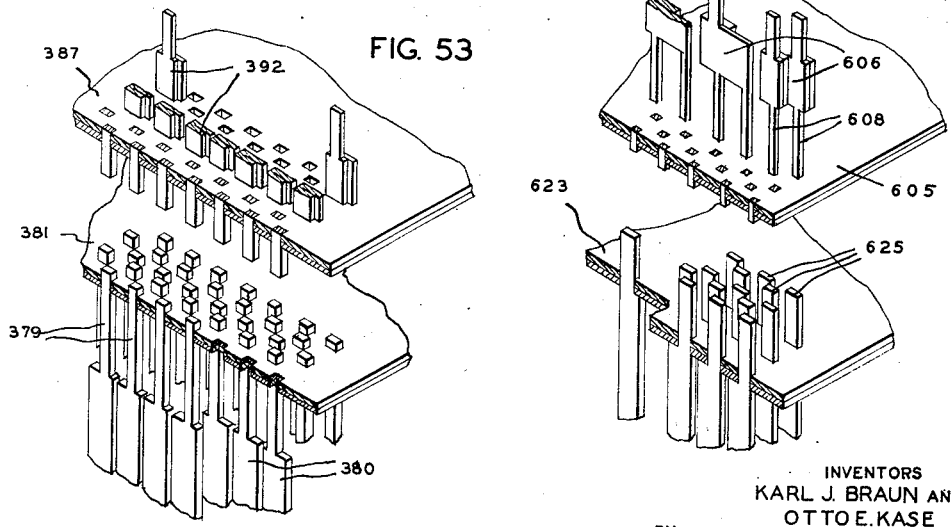
FIG. 53
FIG. 54
INVENTORS
KARL J. BRAUN AND
OTTO E. KASE
BY
ATTORNEY Oct. 30, 1945.
K. J. BRAUN ET AL
2,387,828
PUNCHING MECHANISM
Filed Dec. 1, 1944
37 Sheets-Sheet 26
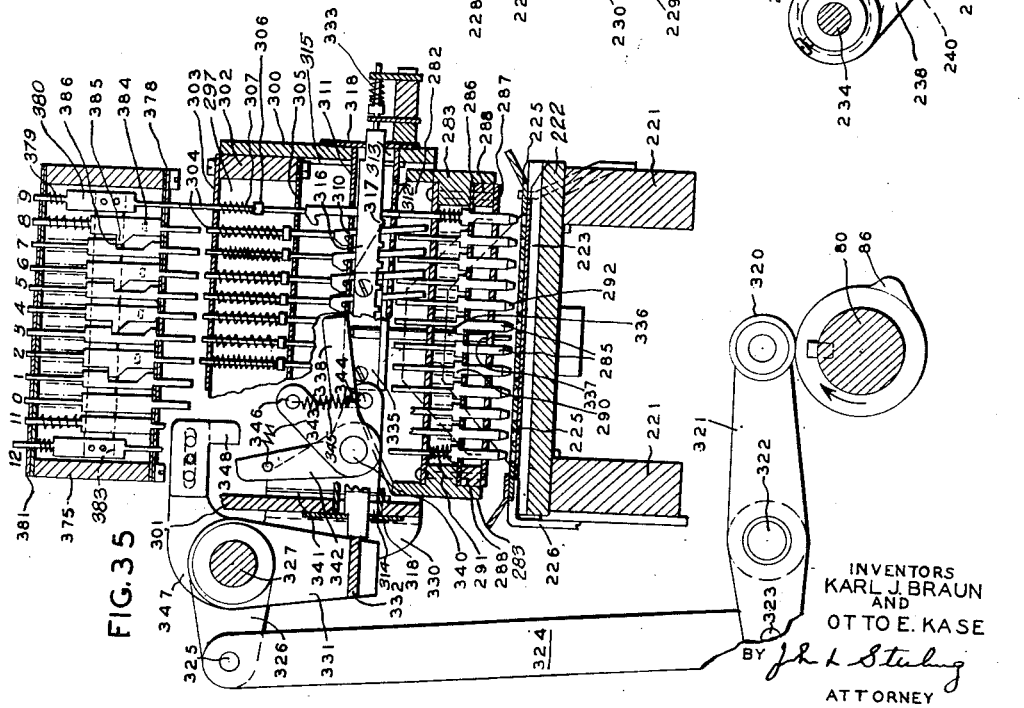
INVENTORS
KARL J. BRAUN
AND
OTTO E. KASE
BY
ATTORNEY Oct. 30, 1945.    K. J. BRAUN ET AL    2,387,828
PUNCHING MECHANISM
Filed Dec. 1, 1944    37 Sheets-Sheet 27
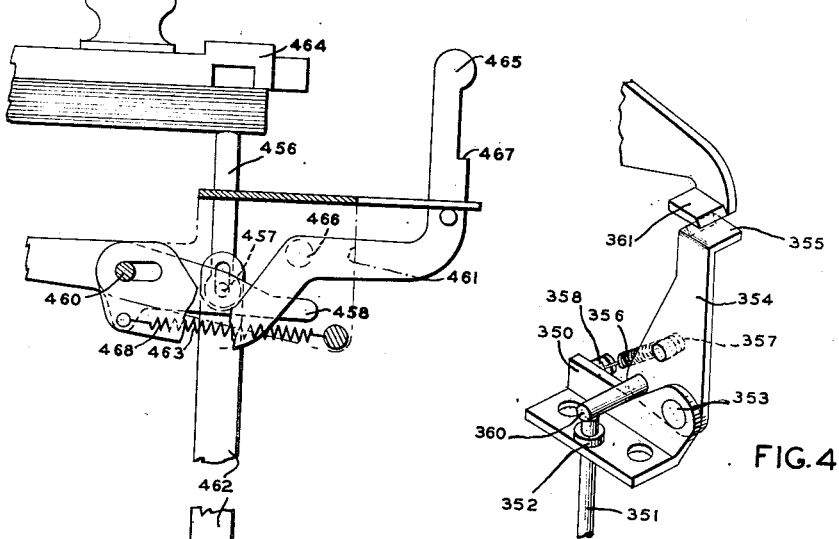
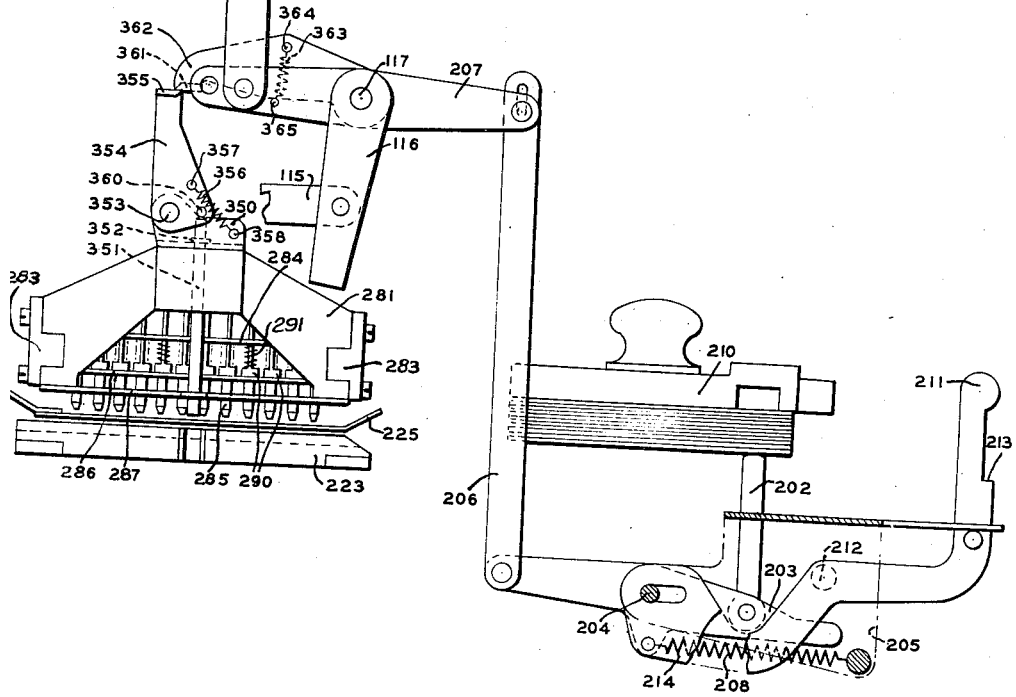
INVENTORS
KARL J. BRAUN AND
BY    OTTO E. KASE
ATTORNEY Oct. 30, 1945.

K. J. BRAUN ET AL 2,387,828

PUNCHING MECHANISM

Filed Dec. 1, 1944

INVENTORS
KARL J. BRAUN, AND
OTTO E. KASE

BY

ATTORNEY

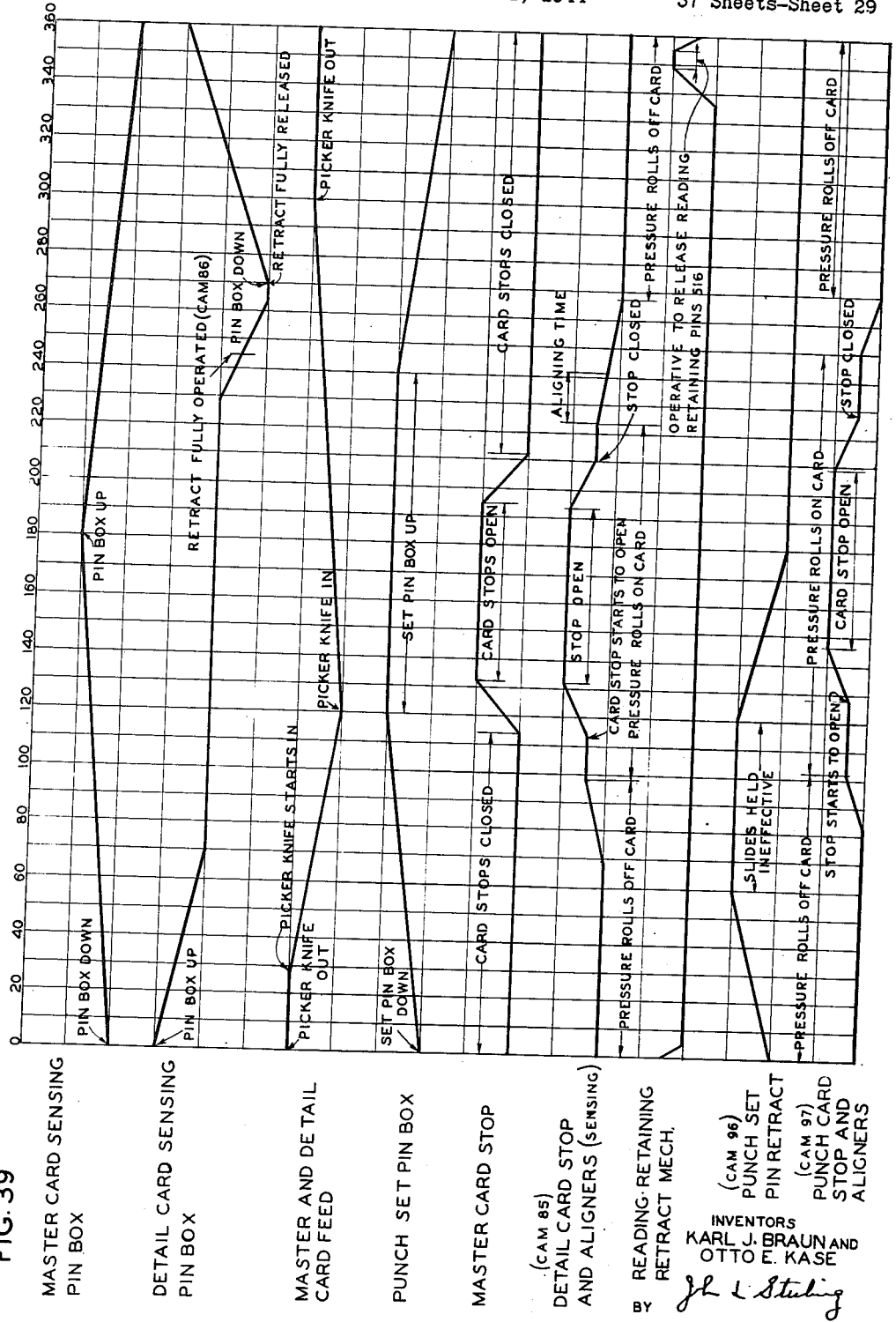

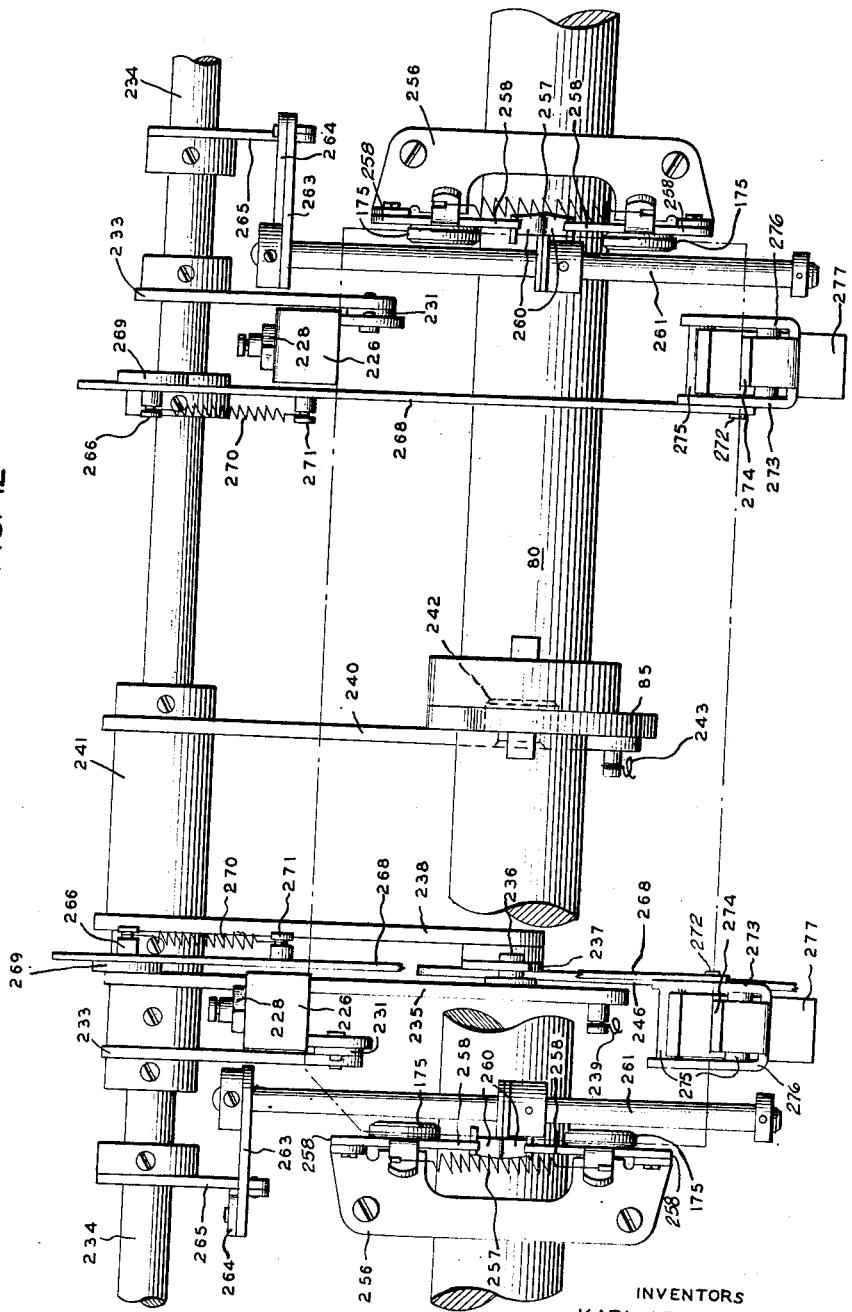

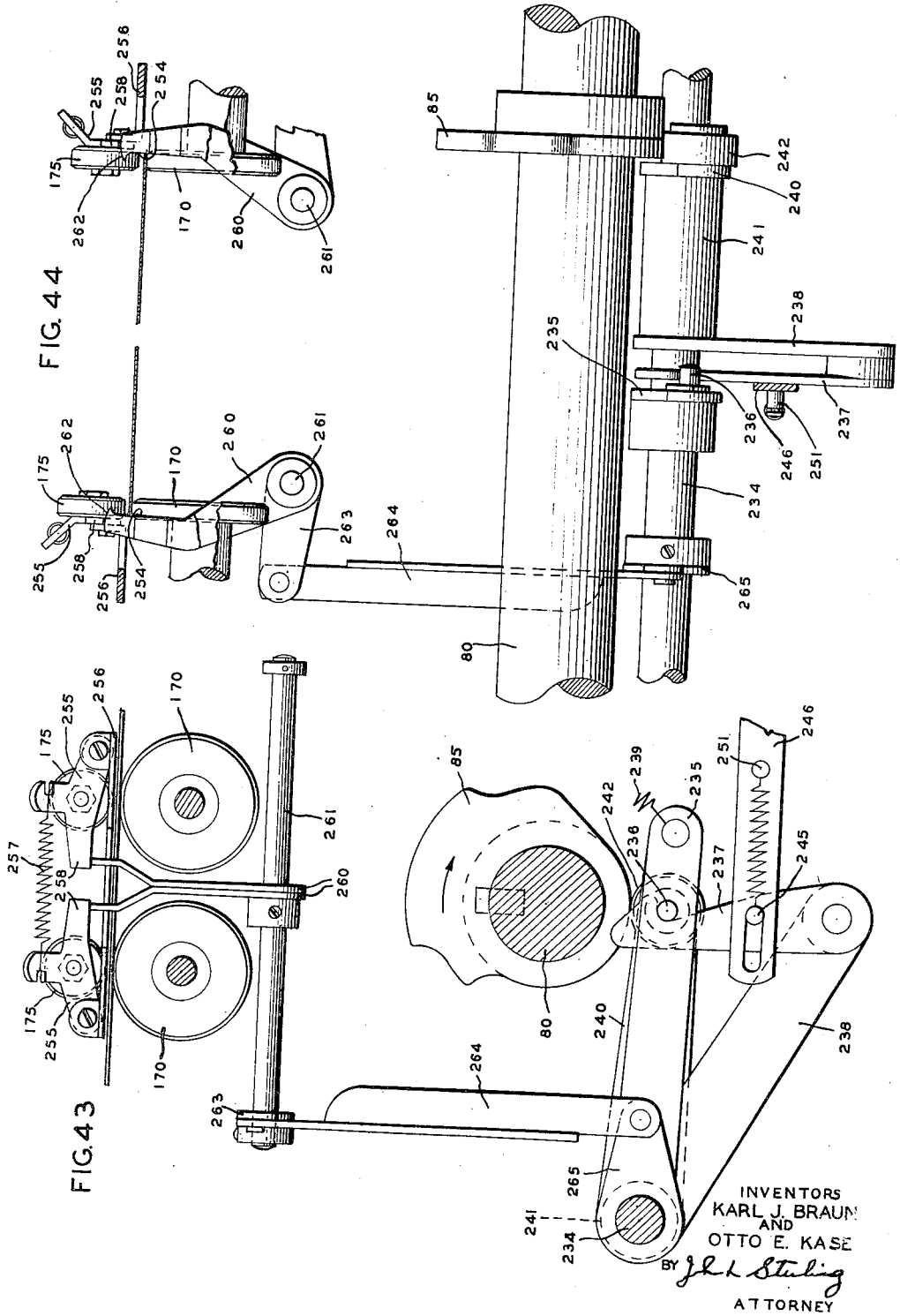

Oct. 30, 1945.   K. J. BRAUN ET AL   2,387,828
PUNCHING MECHANISM
Filed Dec. 1, 1944   37 Sheets-Sheet 32
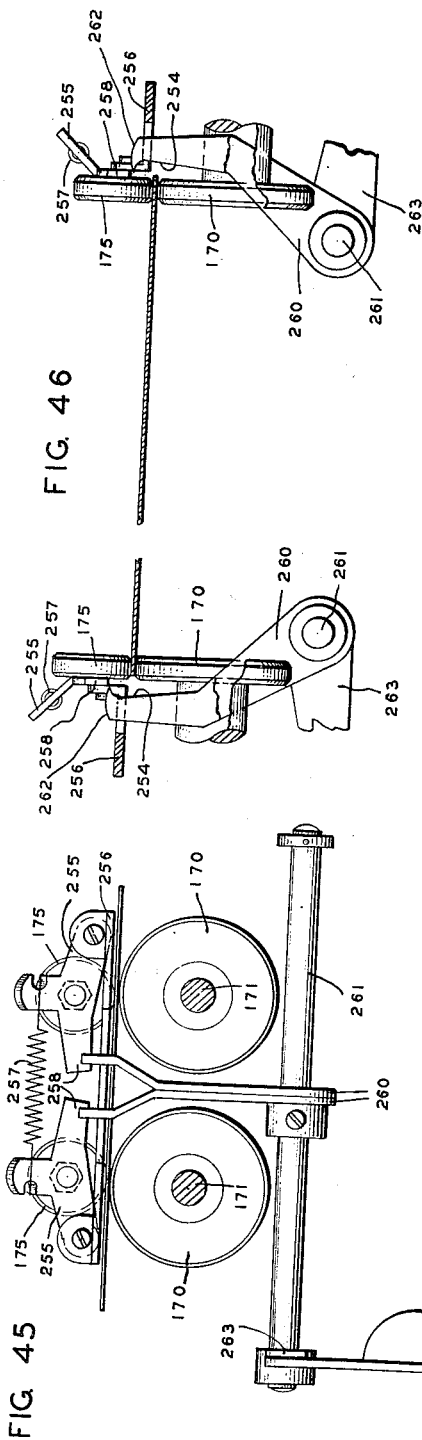
FIG. 46
FIG. 45
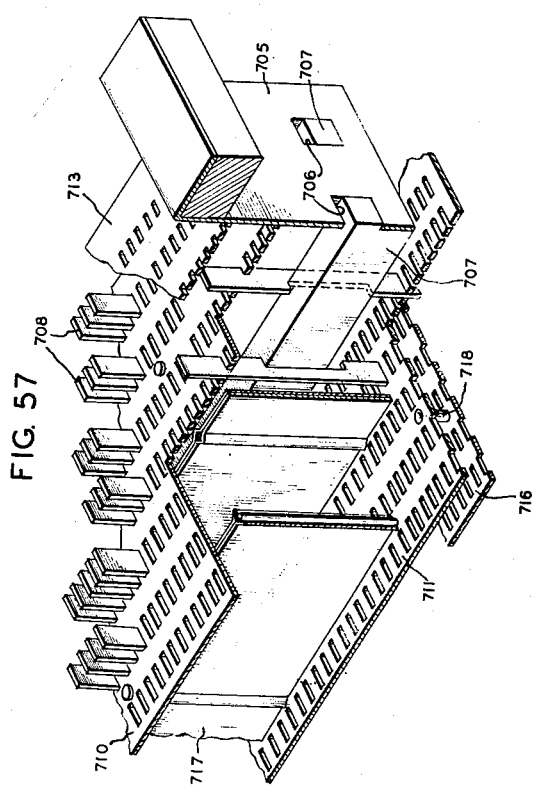
FIG. 57
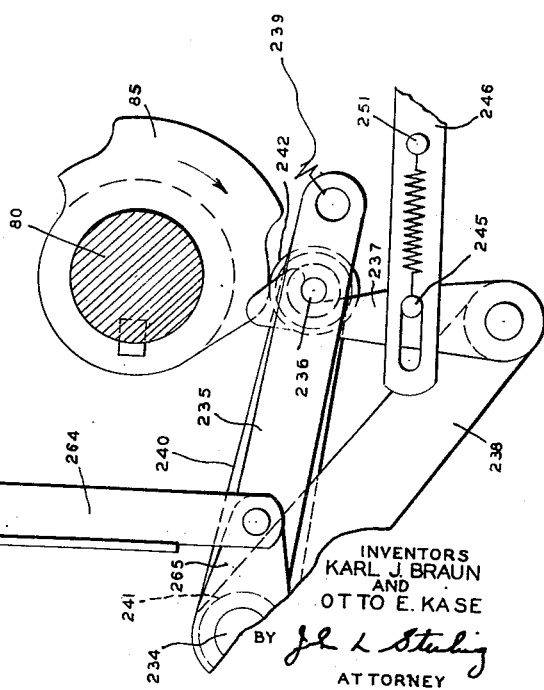
INVENTORS
KARL J. BRAUN
AND
OTTO E. KASE
BY
ATTORNEY Oct. 30, 1945.　　K. J. BRAUN ET AL　　2,387,828
PUNCHING MECHANISM
Filed Dec. 1, 1944　　37 Sheets-Sheet 33

INVENTORS
KARL J. BRAUN AND
OTTO E. KASE
BY
ATTORNEY

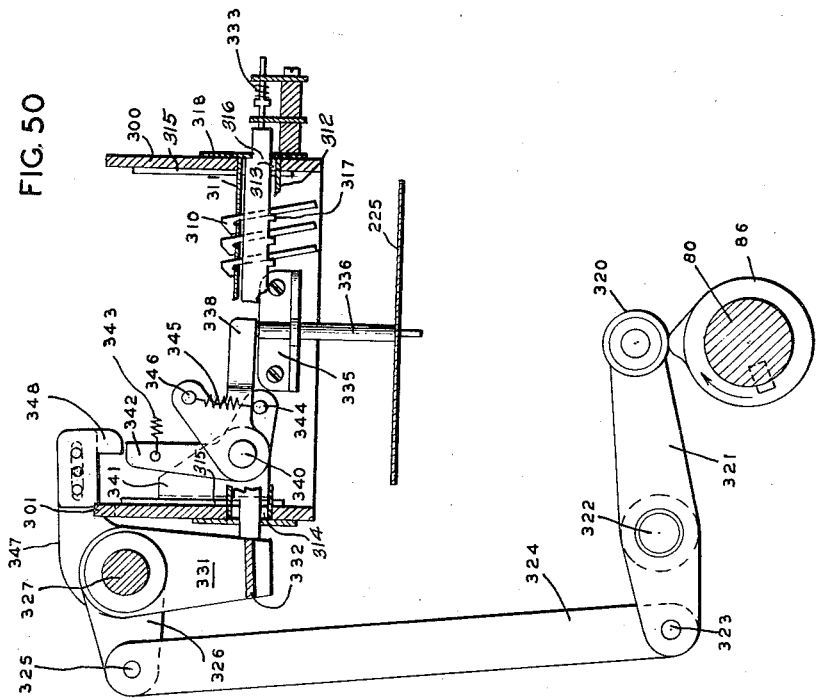
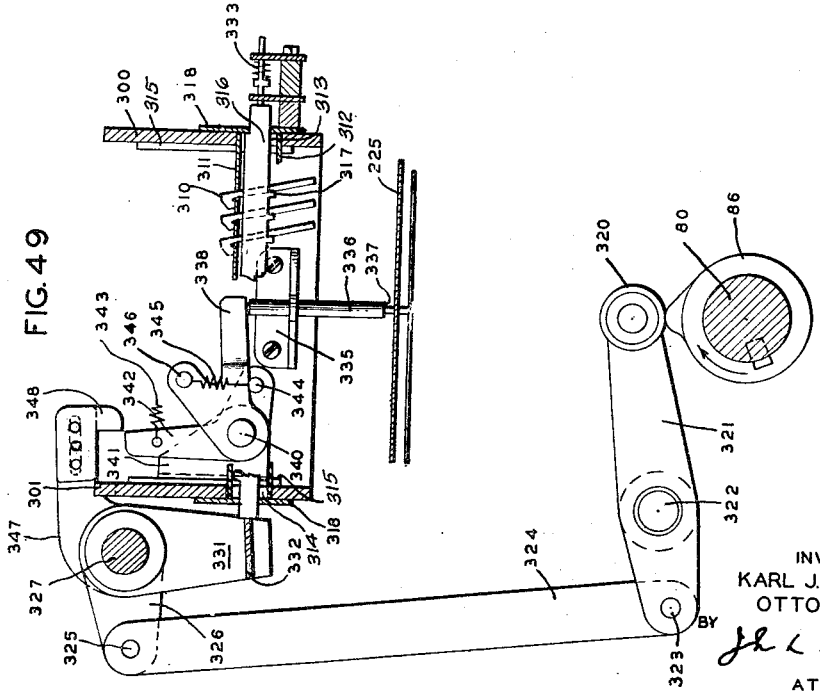

Oct. 30, 1945.　　　K. J. BRAUN ET AL　　　2,387,828
PUNCHING MECHANISM
Filed Dec. 1, 1944　　　37 Sheets-Sheet 35
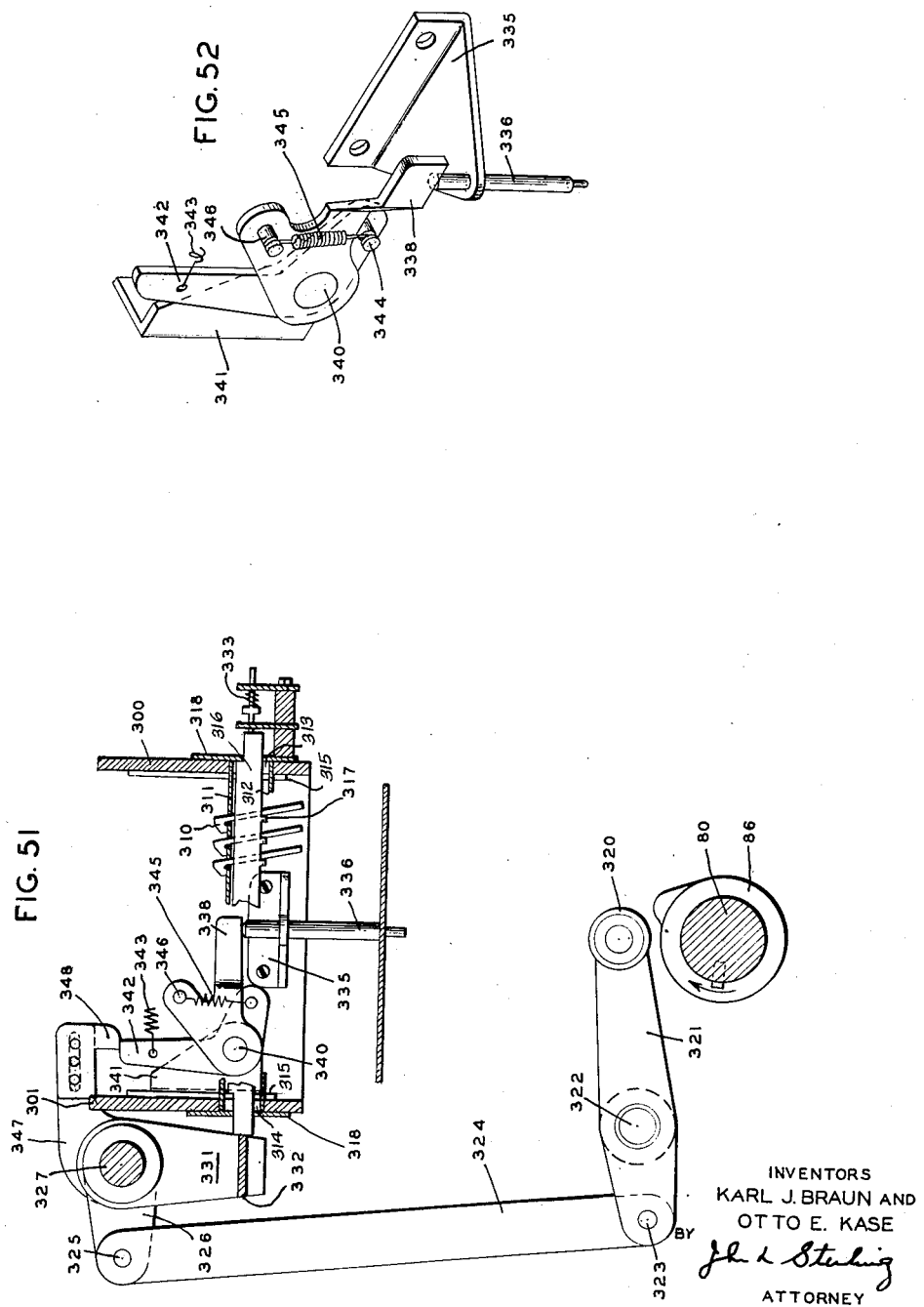

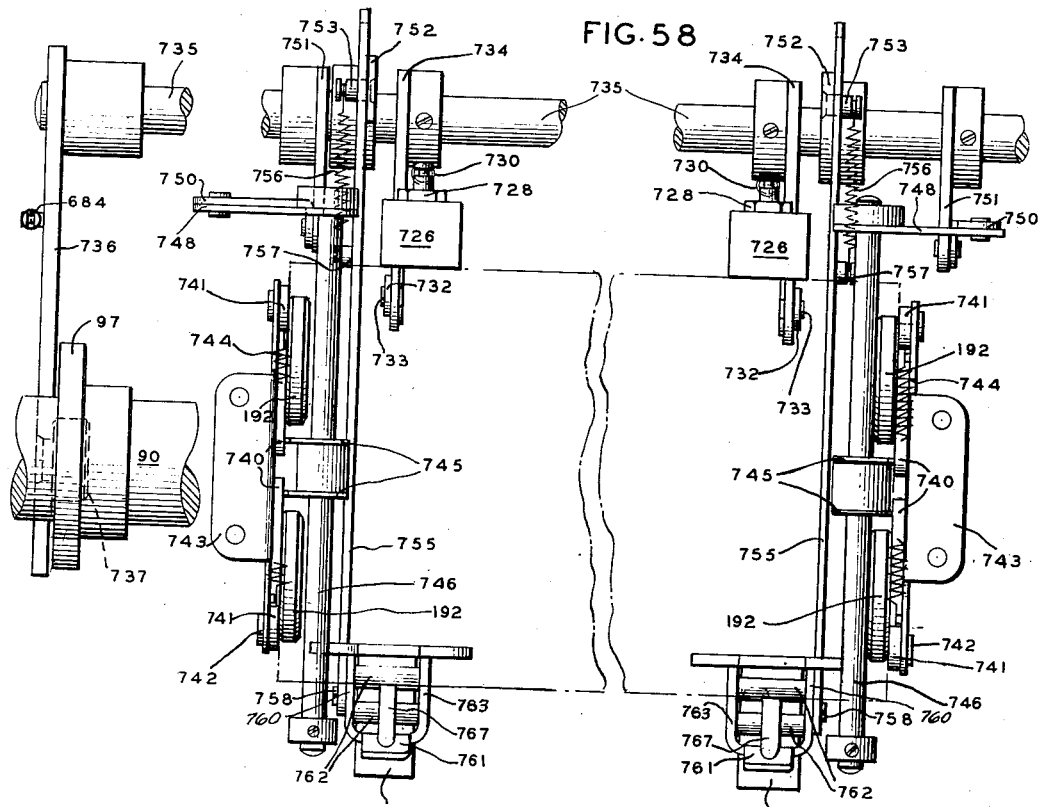
FIG. 58
FIG. 59 FIG. 60
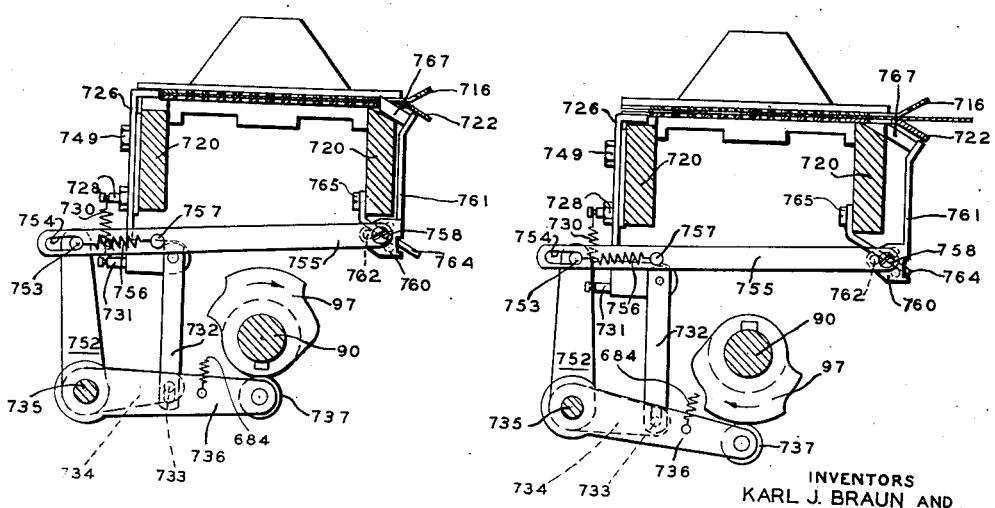
INVENTORS
KARL J. BRAUN AND
OTTO E. KASE
BY
ATTORNEY Oct. 30, 1945.  K. J. BRAUN ET AL  2,387,828
PUNCHING MECHANISM
Filed Dec. 1, 1944  37 Sheets-Sheet 37

INVENTORS
KARL J. BRAUN AND
OTTO E. KASE
BY
ATTORNEY

Patented Oct. 30, 1945

2,387,828

UNITED STATES PATENT OFFICE 2,387,828

PUNCHING MECHANISM

Karl J. Braun, North Merrick, and Otto E. Kase, Valley Stream, N. Y., assignors to Remington Rand Inc., Buffalo, N. Y., a corporation of Delaware Application December 1, 1944, Serial No. 566,200

38 Claims. (Cl. 164—114)

This invention relates to machines for comparing records containing patterns of perforations in one code with records containing patterns of perforations in a different code and in which one or more functions, such as record feeding, record punching, record sorting, or the stopping of the machine, are effected as the result of the comparison and/or non-comparison between such patterns.

The invention described herein is shown embodied in a statistical card comparing machine of the type shown and described in Patent No. 2,211,094 dated August 13, 1940, and Patent 2,214,010 dated September 10, 1940. However, while the invention is herein embodied in the above type of machine it will be understood that the same may be used in connection with any other type of statistical record machines without departing from the scope of the invention.

Briefly, in the invention disclosed in the above patents, any one or more of three different functions, namely, sorting, punching, or stopping the machine, may be effected or varied as a result of a comparison and/or non-comparison between patterns of perforations in like codes. For performing the first function, i. e., to segregate or sort the detail and master records having identical designative perforation patterns from the non-comparing detail and master records, the above patents disclose two receiving pockets for detail records and two additional receiving pockets for master records. Interlocking deflector mechanisms, operable by the control mechanism, are provided whereby comparing detail records and master records may be passed to their respective rear or "receiver" pocket and non-comparing detail records and/or master records may be passed to their respective front or "eject" pocket, or vice versa, as desired.

For performing the second function, i. e., to punch additional information in detail records, the above patents disclose a punch mechanism, settable under control of the master records, whereby one or more columns of information in a master record may be transferred to a detail record. A punch retract mechanism, operable by the control mechanism, is arranged to cancel or erase the setting in the punch mechanism whereby punching may be prevented in either comparing or in non-comparing detail records as desired.

For performing the third function, i. e., to stop the machine (e. g., to permit the insertion of control or supplemental records at various points in a run), means operable by the control mechanism may be arranged to actuate the machine stopping mechanism, when either a comparison or a non-comparison is sensed, as desired. Each of the devices for effecting the above mentioned functions may be used individually or in combination with either or both of the other devices.

In addition to the foregoing functions, the above patents disclose variably settable operating means for the master and/or detail record feeding mechanisms whereby eight different types of record feeding may be effected, as follows:

1. To feed master and detail records simultaneously on a comparison and on a non-comparison.
2. To feed detail records only on a comparison and on a non-comparison.
3. To feed master and detail records simultaneously on a comparison, and only master records on a non-comparison.
4. To feed master and detail records simultaneously on a comparison, and only detail records on a non-comparison.
5. To feed only detail records on a comparison, and only master records on a non-comparison.
6. To feed only master records on a comparison, and master and detail records simultaneously on a non-comparison.
7. To feed only detail records on a comparison, and master and detail records simultaneously on a non-comparison.
8. To feed only master records on a comparison, and only detail records on a non-comparison.

Thus, any type of accounting problem involving the comparison and/or non-comparison of master and detail records in which one of the preceding types of record feeding operations is employed, and in which sorting, punching, stopping of the machine, or any combination thereof is to be effected, may be performed by the machine disclosed in the above patents.

However, while the machine disclosed in the above patent is a great improvement in the statistical punched card art, it is limited in its use in that it can compare pattern perforations in only one common code. It is well known in the punched record art that perforations are made in various codes depending upon the type of tabulating equipment to be used and a serious problem is faced when it becomes necessary for a user of one type of tabulating equipment to tabulate pattern perforations in different codes. If, in this situation, any tabulator user desires a report to be taken from two sets of cards, one set perforated according to one code and the other set according to another code, it is evident that he cannot obtain the report with a tabulator operable on cards perforated according to a common code. It is thus desirable to provide a reproducing punch which will convert pattern perforations in unusable code to pattern perforations in usable code.

Therefore, the principal object of this invention is to enable the comparison, and/or non-comparison of pattern perforations in master and detail records punched in uncommon codes.

Another object of the invention is to punch additional data, sensed in the master record in one code, into a comparing detail record in another code.

Another object of this invention is to convert pattern perforations sensed in the 80 column detail card to 90 column code, to sense perforation patterns in the 90 column master card, and to compare the converted 90 column pattern perforations sensed in the detail card with the 90 column pattern perforations sensed in the master card.

Another object of this invention is to sense 90 column code pattern perforations sensed in the master card, convert said sensed pattern perforations into the 80 column code, and punch certain of said converted pattern perforations into a comparing and/or non-comparing detail card.

Still another object of this invention is to properly align the detail card relative to the sensing mechanism to more accurately sense the pattern perforations therein.

Still another object of this invention is to properly align the detail card relative to the punch mechanism to more accurately punch the pattern information obtained from the master card.

Still another object is to pre-selectively render any of the punch gags effective or ineffective to punch the data sensed in the master card into the detail card.

Other objects and structural details will be apparent from the following specification when read in conjunction with the accompanying drawings, in which:

Fig. 1 is an isometric view of the entire machine with cover plates in place;

Figs. 2, 3 and 4 taken together disclose a front elevation of the machine of Fig. 1 with cover plates removed. In Fig. 2 are shown the master card magazine and portions of the master card sensing mechanism, the master card feeding mechanism, and the comparing mechanism. In Fig. 3 are shown the detail card magazine and portions of the comparing mechanism, the controlling mechanism and dial, the sensing translator and the detail card sensing mechanism. In Fig. 4 are shown portions of the detail card sensing mechanism, card stops and aligning mechanisms and the drive mechanism;

Fig. 5 is a schematic diagram indicating the manner in which Figs. 2, 3 and 4 are combined to form a complete front elevation of the machine;

Figs. 6, 7 and 8 taken together disclose a right hand elevation of the machine, exclusive of the sorting mechanisms, and receiving magazines, with cover plates removed. In Fig. 6 are shown portions of the drive mechanism, the master card magazine, and the master card sensing mechanisms. In Fig. 7 are shown portions of the sensing and punch translators. In Fig. 8 are shown portions of the drive mechanism, the detail card magazine, the detail card sensing mechanism, and the punch mechanism;

Fig. 9 is a schematic diagram indicating the manner in which Figs. 6, 7 and 8 are combined to form a complete right side elevation of the machine;

Figs. 10, 11 and 12 taken together disclose a rear elevation of the machine with cover plates and rear door removed. In Fig. 10 are shown portions of the master card sensing mechanism, the master card sorting mechanism, and the comparing mechanism. In Fig. 11 are shown the punch translator, and portions of the comparing mechanism and the control mechanism. In Fig. 12 are shown portions of the punch mechanism, the detail card sorting mechanism, the detail card stop mechanism, and the drive mechanism;

Fig. 13 is a schematic diagram indicating the manner in which Figs. 10, 11 and 12 are combined to form a complete rear elevation of the machine;

Figs. 14, 15 and 16 taken together, disclose a left side elevation, exclusive of the sorting mechanism, and the receiving magazines, with cover plates removed. In Fig. 14 are shown portions of the drive mechanism, the master card magazine and the master card sensing mechanism. In Fig. 15 are shown portions of the control mechanism and dial, and the sensing and punching translators. In Fig. 16 are shown portions of the control mechanism, the drive mechanism, the card feeding mechanism, and the machine stopping mechanism;

Fig. 17 is a schematic diagram indicating the manner in which Figs. 14, 15 and 16 are combined to form a left side elevation of the machine;

Figs. 18, 19 and 20 taken together disclose a longitudinal section view of the entire machine taken along the line 21—21 of Figs. 2, 3 and 4. In Fig. 18 are shown the master card magazine, sensing mechanism and receiving magazines, with the several operating linkages therefor. In Fig. 19 are shown the detail card magazine, detail card sensing and decoding mechanisms, detail card stop and aligning mechanisms, and sensing translator. In Fig. 20 are shown the punch mechanism, the punch translator, detail card stop and aligning mechanisms, and the detail card receiving magazines;

Fig. 21 is a schematic diagram indicating the manner in which Figs. 18, 19 and 20 are combined to form a complete longitudinal section view of the machine;

Figs. 22, 23 and 24 taken together, disclose a longitudinal section view of the entire machine taken along the line 25—25 of Figs. 2, 3 and 4. In Fig. 22 are shown the master card magazine (with card removed), the master card sensing mechanism, the master card receiving magazines, and the comparing mechanism. In Fig. 23 are shown the detail card magazine (with cards removed), the detail card sensing and decoding mechanisms, the detail card stop and aligning mechanisms, and the sensing translator. In Fig. 24 are shown the punch mechanism, the decoding set pin box, the punch translator, and the detail card receiving magazines;

Fig. 25 is a schematic diagram indicating the manner in which Figs. 22, 23 and 24 are combined to form a complete longitudinal section view of the machine.

Fig. 26 is a detail of the detail card sensing mechanism, the detail card decoding mechanism, the master card sensing mechanism, master card reading retaining mechanism, the comparing mechanism, the punch mechanism, and the punch decoding set pin box showing the several elements after comparing detail and master cards have been sensed;

Fig. 28 is a detail of the portion of the master card shown in the master card sensing chamber in Fig. 26;

Fig. 29 is a detail of the portion of the detail card shown in the detail card sensing chamber in Fig. 26;

Fig. 33 is a detail cross sectional view taken along line 33—33 of Fig. 31 and discloses the punch detail card stop and aligning mechanisms in normal position;

Fig. 35 is a left hand cross sectional detail view taken along the line 35—35 of Fig. 34 and discloses the set pin retract mechanism in normal position;

Fig. 36 is a left hand detail view disclosing the machine starting and stopping mechanism in normal stopping position;

Fig. 37 is a left hand detail view disclosing the detail card stop mechanism and portions of the detail and master card feeding mechanisms in operated position;

Fig. 39 is a timing diagram of the main operating mechanisms of the machine;

Fig. 40 is an isomeric detail view of the no card machine stopping pin and some of its associated parts;

Fig. 42 is a schematic detail plan view showing the detail card in the sensing stage and the card stop and card aligning mechanisms in effective positions;

Fig. 43 is a schematic detail left side view of the sensing chamber pressure roll release mechanism in normal position with the pressure rolls out of engagement with the card;

Fig. 44 is a side view of Fig. 43 showing pressure rolls out of engagement with the card and the card being aligned by the aligning fingers;

Fig. 45 is a schematic detail left side view similar to Fig. 43 but in operated position with the pressure rolls in engagement with the card;

Fig. 46 is a side view of Fig. 45 with the pressure rolls on the card and the aligning fingers out of aligning position;

Fig. 49 is a schematic left hand side view of the sensing retract mechanism in operated position with the no card pin sensing the presence of the card;

Fig. 50 is a view similar to Fig. 49 but with the no card pin sensing the absence of a card;

Fig. 51 is a view similar to Fig. 50 but later in the same cycle in which the retract slides are locked in their retract positions;

Fig. 52 is an isometric detail view of the retract no card pin and its associated mechanism;

Fig. 53 is an isometric detail view showing the staggered relation of the lower translator pins and the decoding pins associated with the sensing mechanism;

Fig. 54 is an isometric detail view showing the staggered relation of the lower translator pins and the decoding set pins associated with the punch mechanism;

Fig. 55 is a detail view of a retract slide in operated retract position;

Fig. 56 is a view similar to Fig. 55 with a retract slide manually set to retract position;

Fig. 57 is a detail isometric view showing the manner in which the punch guide plates and the stripper plate are reinforced;

Fig. 58 is a schematic detail plan view showing the detail card in the punching stage and the card stop and card aligning mechanisms in effective positions;

Fig. 59 is a left hand detail view showing the detail card in the punching chamber and the card stops in normal stopping position;

Fig. 60 is a left hand detail view similar to Fig. 59 but with the card stops in operated non-stopping position;

Framework

Figure 1:
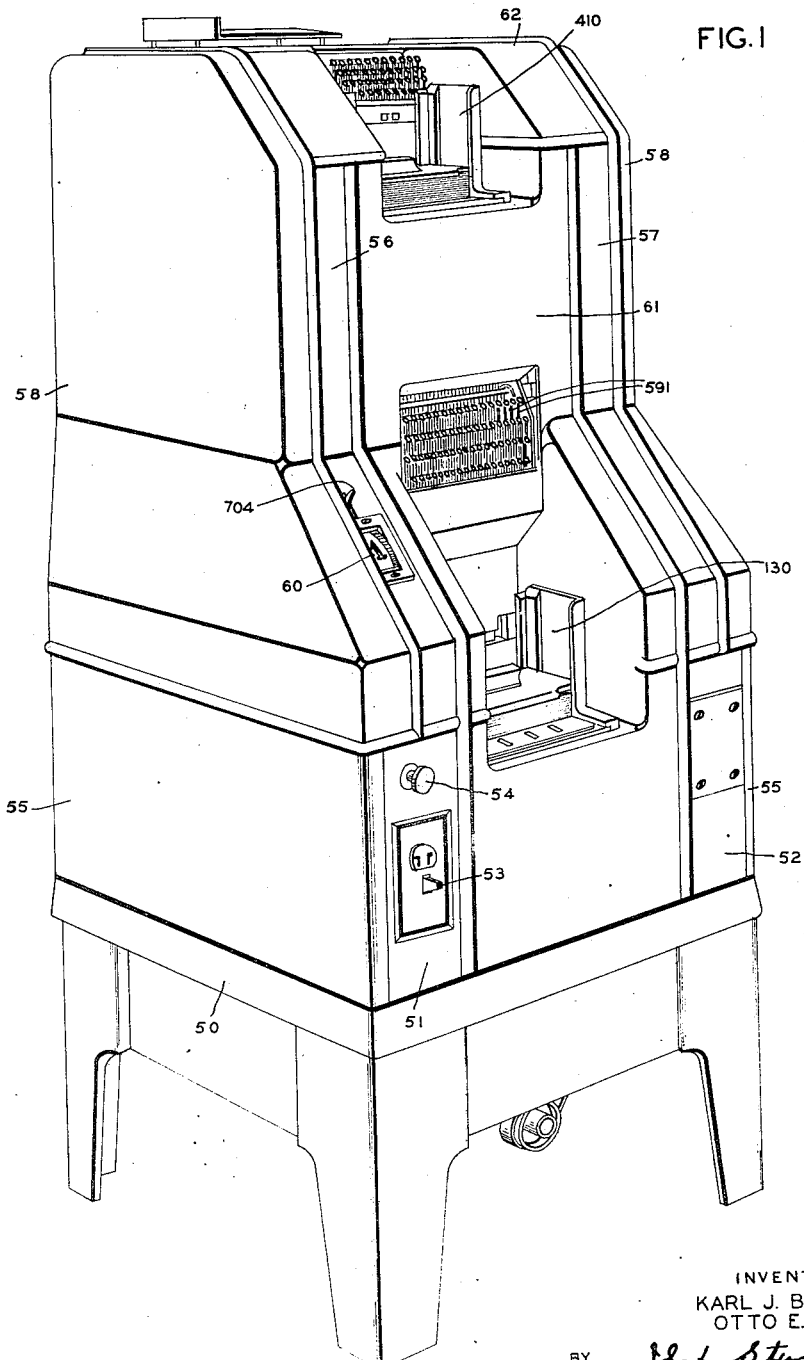
Figure 11:
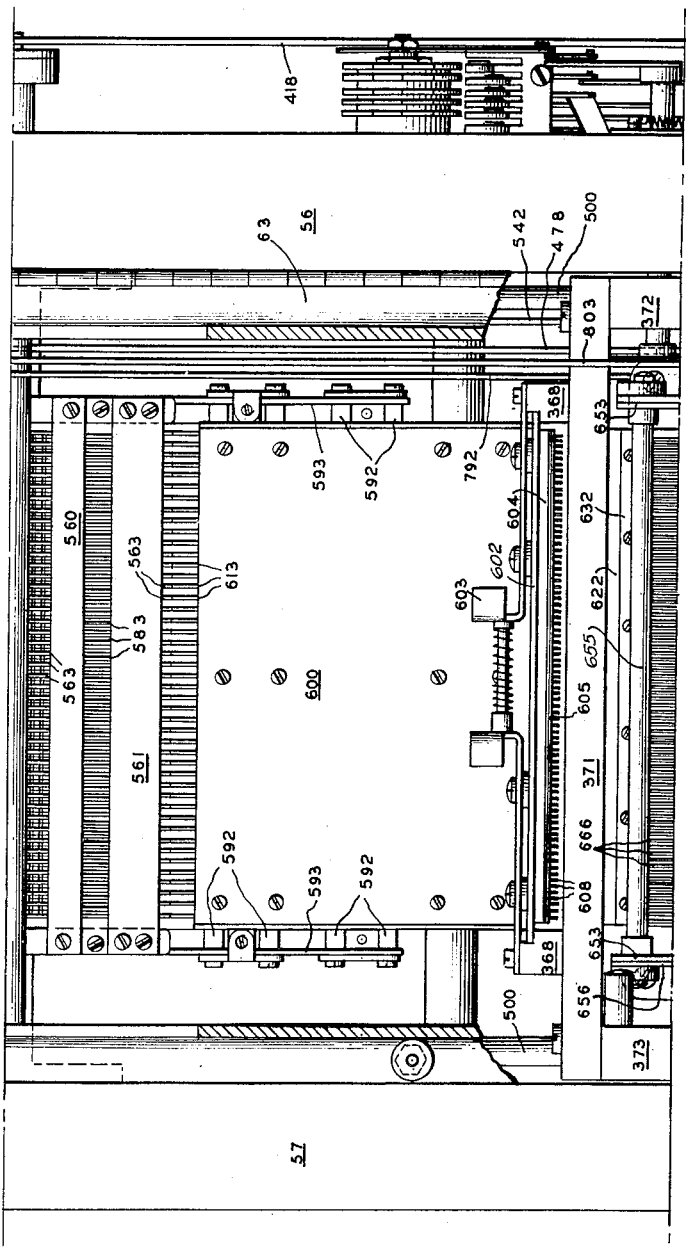

Referring to Fig. 1, the machine is housed in a framework including a base casting 50 to which is mounted a pair of rectangular box-like castings 51 and 52 that serve to support the several transverse shafts and brackets of the detail card feed, the sensing and punching mechanisms. The left hand casting 51 houses portions of the driving mechanism, card feeding mechanisms and starting mechanism and its forward face is provided with openings for a motor switch 53 and the button 54 of the starting and stopping mechanism. The right hand casting 52 houses portions of the driving mechanism and the clutch mechanism. Suitable cover plates 55 are provided to enclose castings 51 and 52. Supported by castings 51 and 52 are a pair of substantial L shaped box-like castings 56 and 57 that serve to support the several transverse shafts and brackets of the master card feed rolls and sensing mechanism and the comparing mechanism. The left hand casting 56 houses the control mechanism and a portion of the feed roll drive mechanism and the inclined forward face thereof is provided with a suitable opening for a dial 60 of the control mechanism. The right hand casting 57 houses portions of the upper feed roll drive mechanism. Suitable cover plates 58 are provided to enclose castings 56 and 57. The front portion of the machine is enclosed by a cover plate 61 having suitable openings to permit access to the master and detail card magazines, magazines 410 and 130 respectively, and to the settable keys 591 of a comparing mechanism. The top portion of the machine is enclosed by a cover plate 62 and is provided with a suitable opening for the settable keys of the master card sensing mechanism and the card aligning table. The rear portion of the machine is enclosed by a door 63 that is hinged to the frame casting 56 (see Figs. 10 and 11). Located in the door 63 are two sets of card receiving pockets (see Figs. 18, 20, 22 and 24) including an upper set comprising a rear or "receiver" pocket 64 and a front or "eject" pocket 65 for master cards, and a lower set comprising a rear or "receiver" pocket 66 and a front or "eject" pocket 67 for detail cards. The pockets of each set are separated by a suitable partition 68.

Drive mechanism

Figure 8:
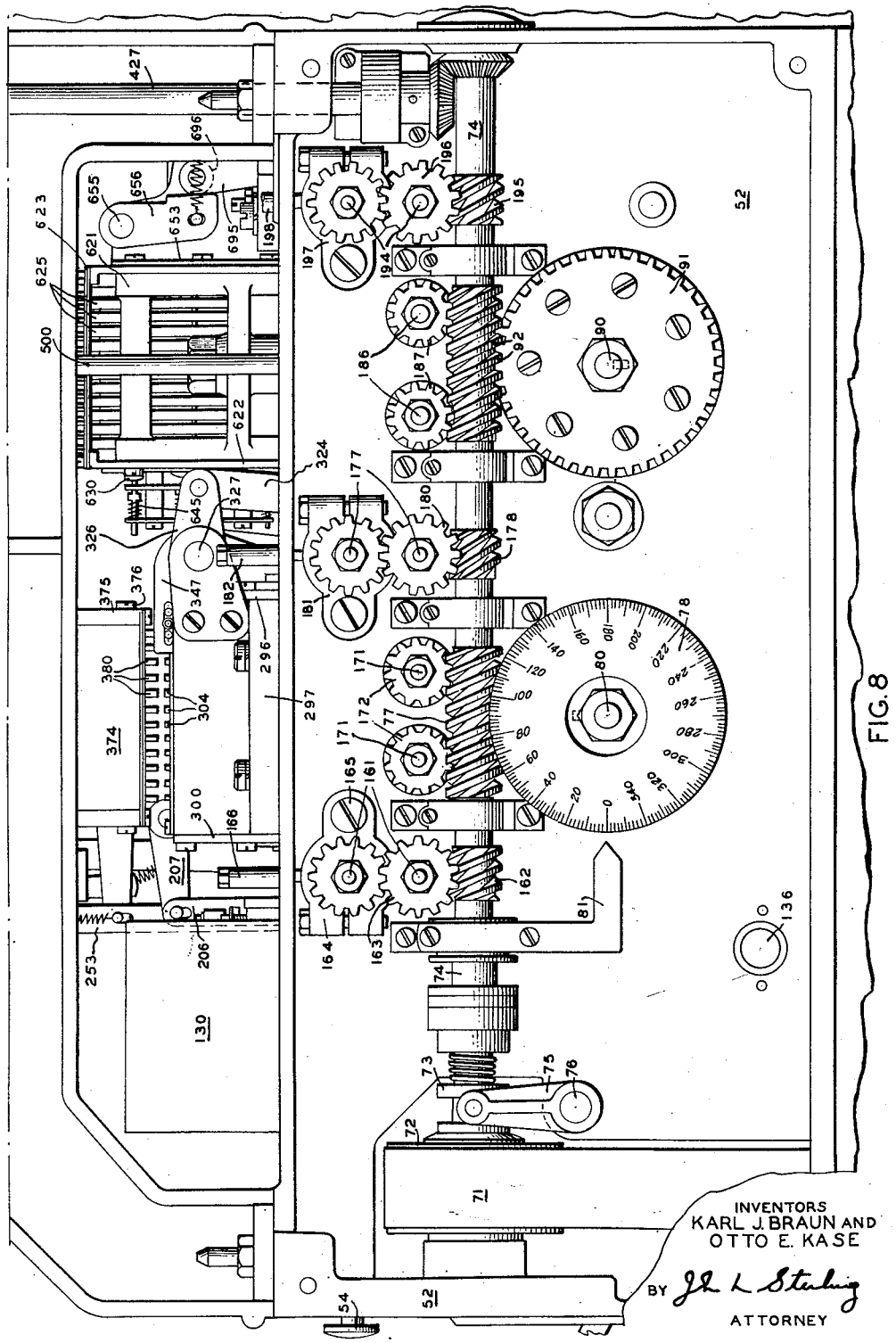

Motive power to drive the several cam shafts and card feed rolls, etc., is supplied by an electric motor 70 (Fig. 4), suspended from base casting 50 and controlled by switch 53. The motor shaft is connected by a belt 71 to a pulley 72 of a friction clutch mechanism 73 (Fig. 8) connected to a longitudinal drive shaft 74, suitably journaled in the frame casting 52. In the arrangement shown the clutch mechanism 73 is controlled by a forked arm 75 fixed to a transverse rock shaft 76. When the machine is in its idle or stopping position, as shown in Fig. 8, shaft 76 is held in rocked position and the arm 75 compresses the clutch spring to disengage the shaft 74 from pulley 72. When the machine is to be operated, shaft 76 is released whereby the clutch spring engages shaft 74 with pulley 72.

For operating the sensing pin box of the detail card sensing mechanism and other cam operated elements a front cam shaft 80 (see also Figs. 3, 4, 8, and 16) extends transversely across the machine and is journaled in suitable bearings in frame castings 51 and 52. The right hand end of shaft 80 (Fig. 8) extends into frame casting 52 and is provided with a worm wheel (not shown) that meshes with a worm 77 on shaft 74. Mounted upon the extreme right end of shaft 80 is an indicator wheel 78 marked in degrees relative to a pointer 81 whereby the timing of the various machine elements may be set and adjusted. Keyed on the portion of shaft 80 extending between frame castings 51 and 52 (Figs. 3 and 4) are a pair of complementary cams 82 that serve to effect the reciprocation of the sensing pin box of the detail card sensing mechanism. Keyed to the portion of shaft 80 that extends into frame castings 51 (see Fig. 16) is a cam 83 for operating the machine stopping mechanism and the retract mechanism of the master card reading retaining mechanism, a cam 487 for operating the card stop mechanisms of the master card sensing mechanism, a cam 69 for operating the control device actuating mechanism, and a cam 84 (partly shown in Fig. 37) for operating the master and detail card feeding mechanism. The function and manner of operation of each of the several mechanisms controlled by the above cams being fully described in the above mentioned Patent 2,211,094 will only be described briefly hereinafter.

Also keyed to the shaft 80 and located between the pair of complementary cams 82 (see Figs. 3, 4 and 23) is a cam 85 for operating the card stop and the card aligning mechanism of the detail card sensing mechanism and a cam 86 for operating the sensing pin retract mechanism of the detail card sensing mechanism (see also Figs. 19, 34, 35, and 38).

For operating the sensing pin box of the master card sensing mechanism, the punch set-pin basket and other operated elements, a rear cam shaft 90 (see Figs. 8, 12, and 16) extends transversely across the machine and is journaled in suitable bearings in frame castings 51 and 52. The right hand end of shaft 90 extends into frame casting 52 (Fig. 8) and is provided with a worm wheel 91 that meshes with a worm 92 on the shaft 74. The gear ratio between the shafts 74 and 90 is identical to that between shafts 74 and 80 so that shafts 80 and 90 are driven synchronously. However, for purposes of assembly, the shaft 90 is so positioned that in the normal or stopping position of the machine the keyway in the shaft is in its bottom dead-center position and the keyway in shaft 80 is in its top dead-center position. Keyed on the portion of the shaft 90 extending between frame castings 51 and 52, and immediately adjacent the inner walls of the castings are a pair of eccentrics 93 (see also Fig. 20) that serve to effect the reciprocation of the sensing pin box of the master card sensing mechanism. Adjacent to each eccentric 93 are sets of complementary cams 94 (see also Fig. 24) that serve to effect the reciprocation of the set-pin basket of the punch mechanism. Adjacent to the left hand complementary cam 94 (right hand Fig. 12) is a cam 95 for operating the deflector mechanism of the master and detail card receiving pockets (see also Fig. 20).

Figure 31:
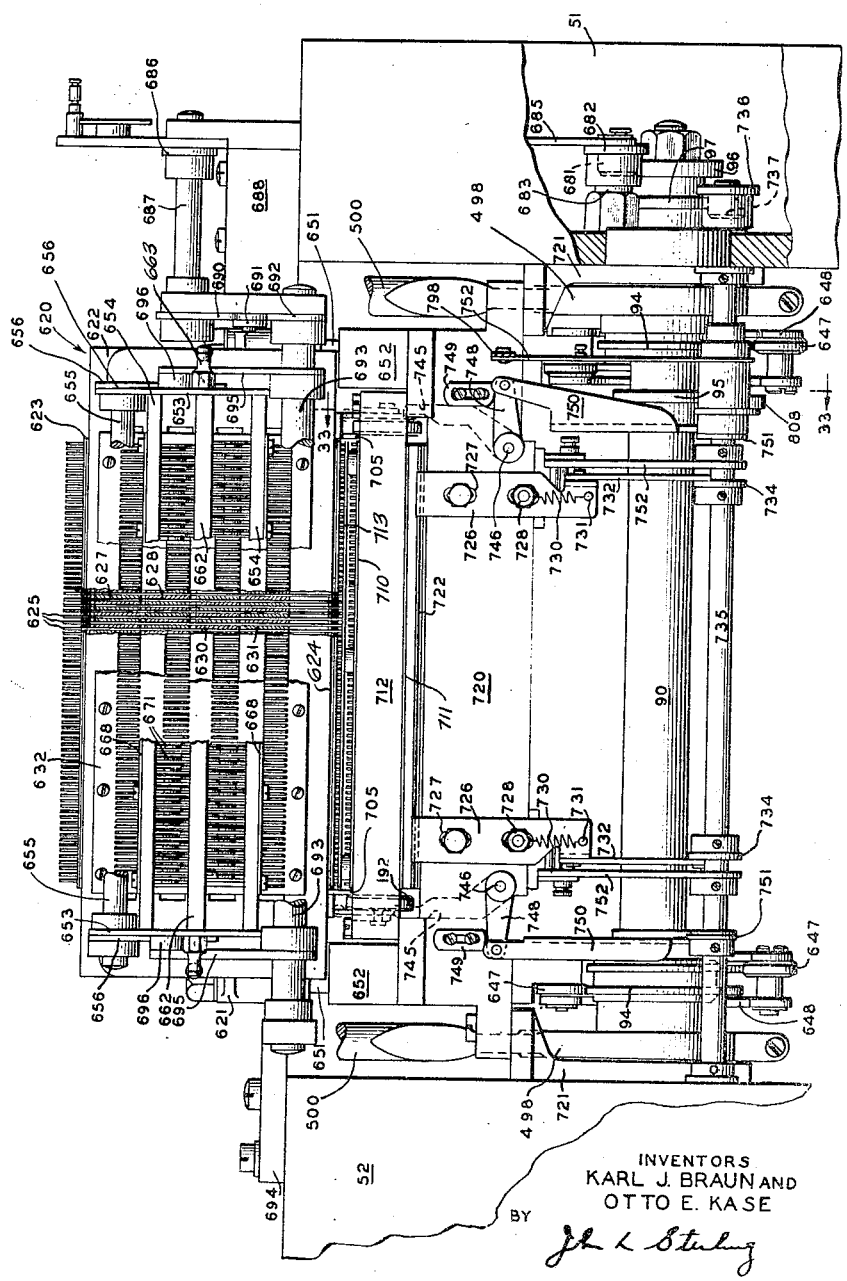
Fig. 31 is a rear cross section taken along the line 31—31 of Fig. 20 disclosing the decoding set pin box, the punch mechanism, and the detail card stop and aligning mechanisms.

Keyed to the portion of shaft 90 that extends into frame casting 51 (see Fig. 16) is a cam 96 for operating the punch retract mechanism (see also Fig. 32) and a cam 97 for operating the card punch stop and aligning mechanisms (see also Fig. 31). The function and manner of operation of the several mechanisms controlled by the cams on shaft 90 is described hereinafter.

Starting and stopping mechanism

As disclosed in the above Patent 2,211,094 the drive mechanism may be started by manually depressing the button 54 (Figs. 1, 8, and 16), and may be stopped either manually by again depressing button 54, or automatically, when the supply of cards in a magazine is exhausted or when a card sensing chamber is empty. In addition the machine is provided with means manually settable to prevent the stopping of the drive mechanism when a card magazine is exhausted. Further, the machine is provided with means automatically operable to stop the drive mechanism when a comparison or non-comparison between a master and detail card is sensed, as desired.

Referring to Fig. 16 the controlling mechanism of clutch 73 comprises the button 54 fixed to the forward end of a plunger 100 which protrudes through and is slidably mounted in a housing on the forward wall of frame casting 51. The plunger is provided with suitable limit stops and is normally held in the position shown by a suitable spring. A link 101 connects the plunger with an arm 102 which arm is pivoted on a frame stud. A forwardly extending arm 103, pivoted at the upper end of arm 102, is provided with a bent hook element 104. The lower portion of the hook lies in the same vertical plane as an upwardly extending toggle-breaking arm 105 pivoted on a frame stud. The arm 103 is urged downwardly by a spring extended from the midpoint of the arm to a rearwardly protruding ear on a vertical link 106 and is limited by a pin 107 on the link.

The above mentioned transverse rock shaft 76 (see Figs. 3 and 8) for actuating the clutch mechanism is journaled at either end in frame castings 51 and 52 and its left end passes through casting 51 and is provided with a substantially horizontal arm 108 (see Fig. 16). A pin 110 fixed in the rearward end of the arm 108 serves as a pivot point for the lower arms of left and right hand toggles 111 (one shown) and also protrudes through a slot in the lower end of link 106. The upper arm of the right hand toggle is pivoted on frame stud 112 and the upper arm of the left hand toggle is pivoted at 113 to link 106. Each upper toggle arm is provided with a finger that lies in the path of movement of a pin 109 fixed in toggle breaking arm 105.

When the drive mechanism is stopped as in Fig. 16, both toggle links are straightened and the right hand toggle 111 through the arm 108, holds the shaft 76 in rocked position to disengage the clutch mechanism. When button 54 is depressed to start the machine, the hook 104 effects the breaking of both toggles through togglebreaking arm 105 and pin 109. Shaft 76 is then rocked by the spring of the clutch mechanism (see Fig. 8) and the drive shaft 76 is engaged with pulley 72 to begin a cycle of operation.

The link 106 (Fig. 16) extends upwardly through suitable slots in frame casting 51 and 56 and is connected to the forward end of an adjustable two part lever 114. The lever 114 is pivoted near its mid-point on a suitable frame stud and is provided at its rearward end with a lug that overlies the rearward end of a stepped interponent 115 connected at its forward end to a rock arm 116 fast on a rock shaft 117. The construction and arrangement of the parts thus far described is such that immediately after the machine is started, the left hand toggle 111 (Fig. 16) is straightened by the action of its spring, thereby elevating link 106 to the limit of the slot in its lower end and rocking lever 114 to place its lug against the upper side of interponent 115. Thus, a rigid connection is established between lever 114 and the arm 108 consisting of the upper portion of link 106 and left hand toggle 111.

Cooperating with the stepped portion of interponent 115 (see Fig. 16) is the upper end of a push rod 120 connected at its lower end to an arm 121, pivoted at 122, having a follower roller coacting with the cam 83 keyed to the front cam shaft 80. During the running of the machine, interponent 115 is held in its forward position, as in Fig. 16, so that push rod 120, when actuated by the high spot on cam 83, moves idly in the deep step of the interponent. However, when the machine is to be stopped either manually or automatically, interponent 115 is moved rearwardly so that its shallow step overlies push rod 120. When the high spot on the cam 83 elevates the follower roller on arm 121, push rod 120 strikes the shallow step on interponent 115 thereby raising the interponent against the lug of the rock lever 114 to rock said lever clockwise. This movement depresses link 106 and through the left hand toggle 111, serves to rock arm 108 and shaft 76 counter-clockwise to disengage clutch 73 to stop the drive mechanism.

In order to stop the machine under manual control a rearwardly extending finger 123 (Fig. 16) coacting with a turned over ear on rock arm 116, is pivotally connected to arm 102 and is held in substantially horizontal position by a spring 124 and a turned over ear 125 on arm 103. Thus when the drive mechanism is operating, the depression of button 54 moves finger 123 rearwardly thereby rocking arm 116 clockwise to place the shallow stepped portion of interponent 115 between the push rod 120 and the lug on lever 114 so that the clutch mechanism is disengaged, as above, when the high spot of cam 83 strikes the follower roller on arm 121.

The construction and arrangement of arm 103 and finger 123 is such that when the machine is stopped and link 106 lowered, as in Fig. 16, hook 104 on arm 103 is in position to engage toggle breaking arm 105 when button 54 is depressed, but finger 123 is rocked out of engagement with the turned over ear on rock arm 116. Whereas when the machine is running and link 106 is elevated, pin 107 has rocked arm 103 and finger 123 counter-clockwise to move hook 104 out of position to engage toggle breaking arm 105, and moves finger 123 into position to engage the turned over ear on rock arm 116.

*Detail card feeding mechanism*

In the present embodiment, detail cards are passed through the machine in substantially the same manner as in the above mentioned Patent 2,211,094 i. e., the cards placed in a detail card magazine are passed seriatim to suitable feed rolls whereby they are fed, first, to a sensing chamber in which their perforated data is sensed, and second, to a punch chamber in which additional data may be added, and from which they are passed to the detail card ejector rolls.

Figure 3:
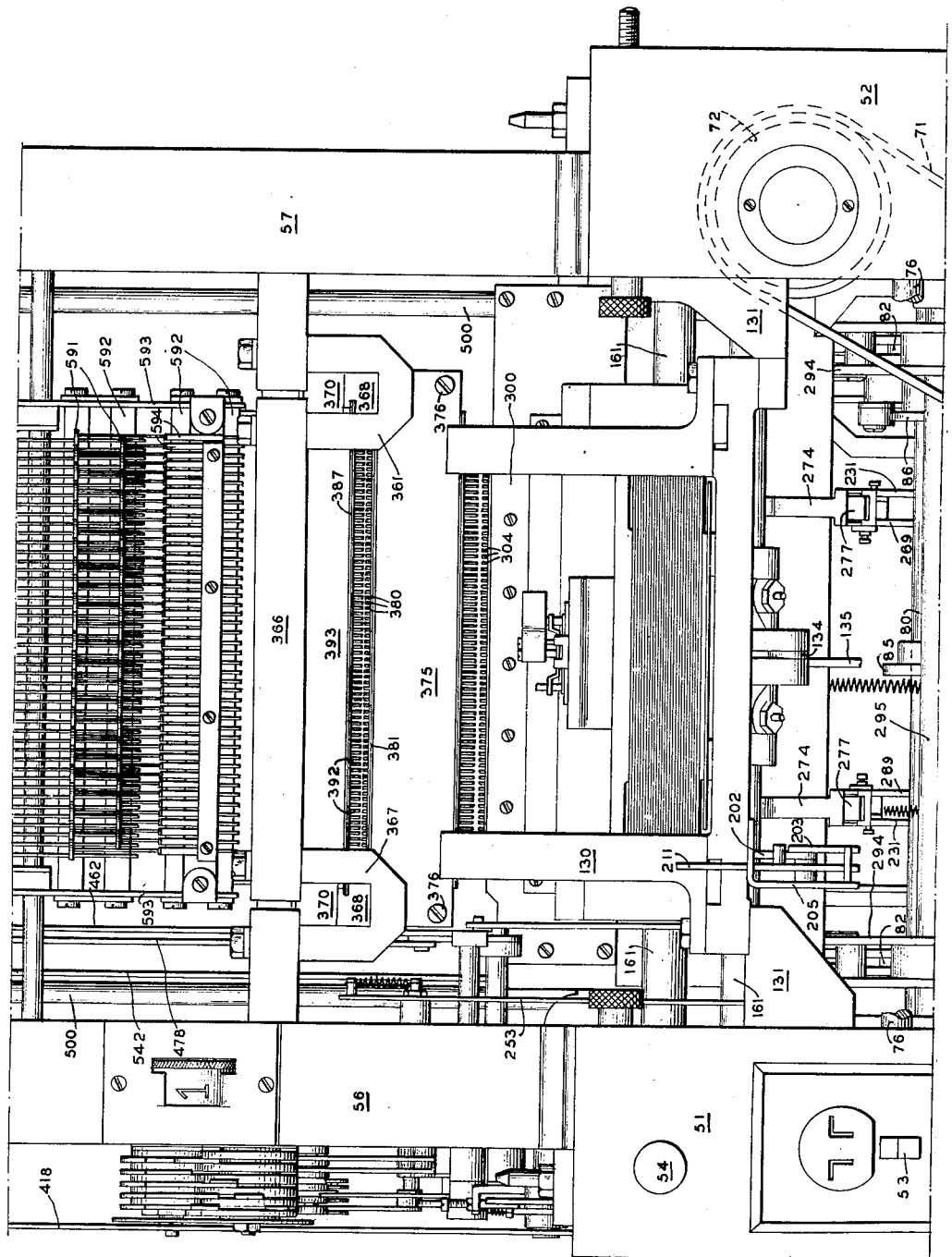
Figure 19:
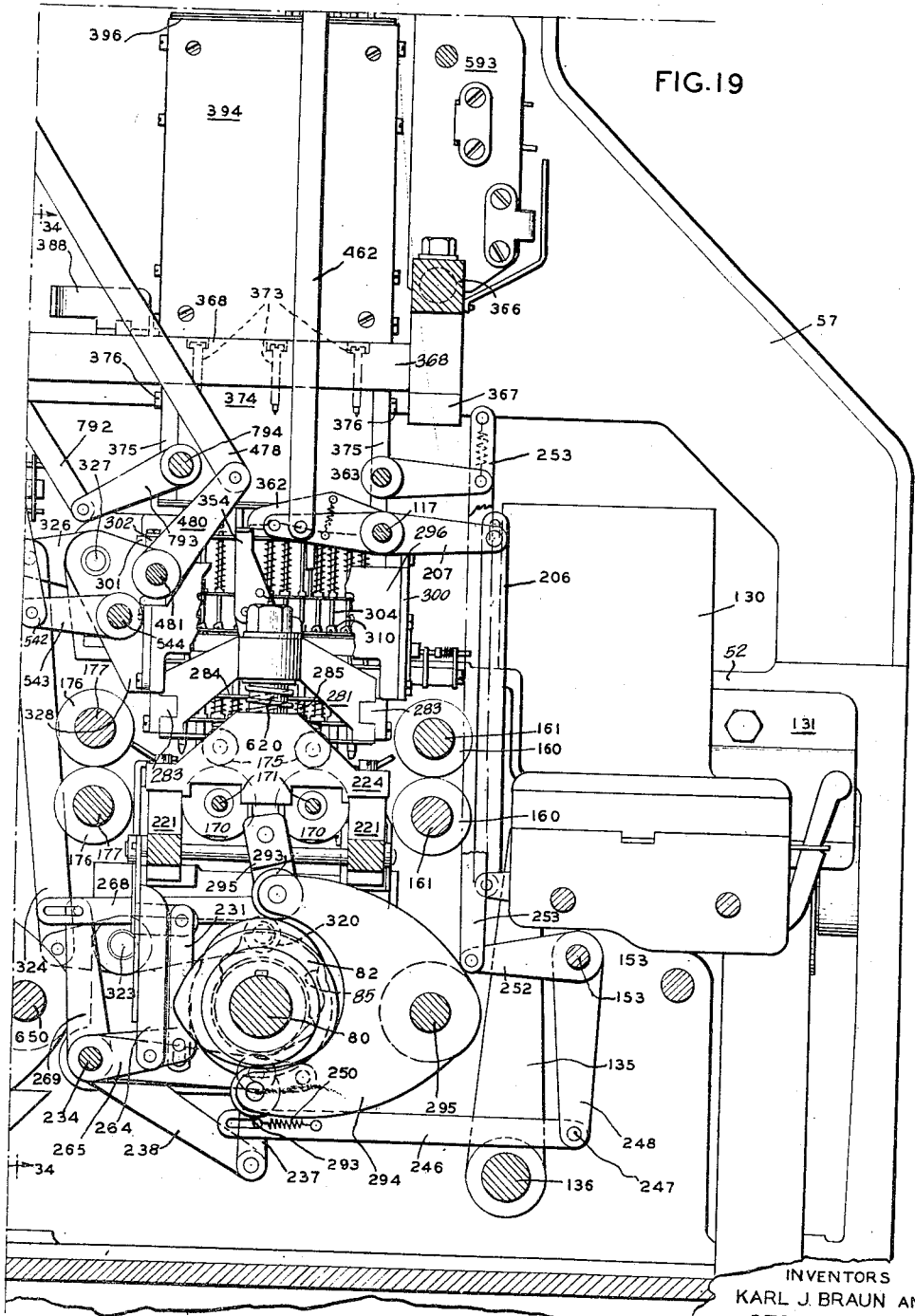
Figure 23:
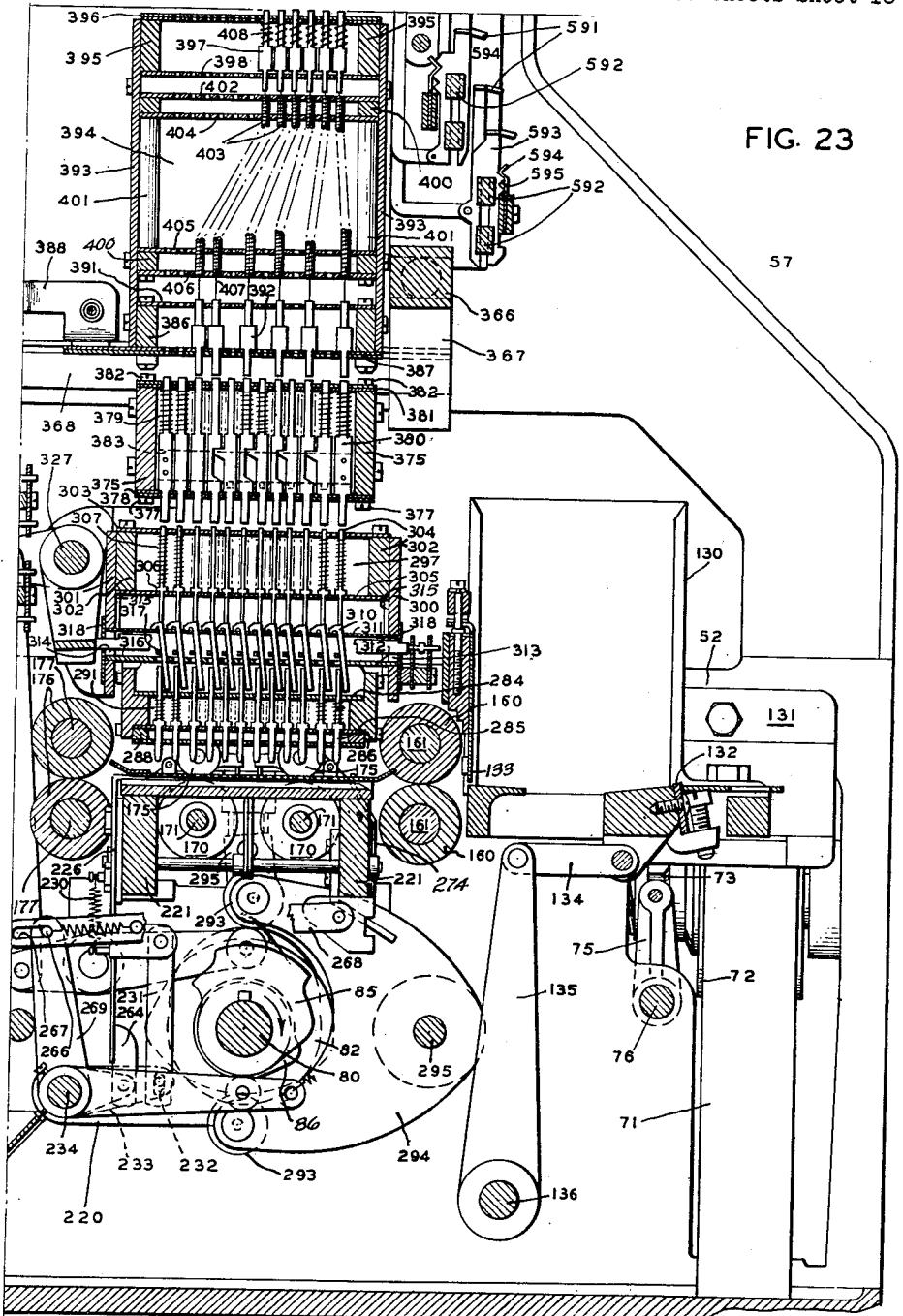

Referring to Figs. 3, 19 and 23, the detail cards are stored in a detail card magazine 130 supported by brackets 131 bolted to frame castings 51 and 52. A card picker knife 132 (see Fig. 23) suitably guided for front to rear movement and arranged to push the lowermost card beneath a throat knife 133 to the sensing chamber feed rolls, is connected by a link 134 to an arm 135 fixed to a transverse shaft 136 (see also Fig. 4), journaled in frame castings 51 and 52 which shaft may be rocked during each cycle by card feed cam 84 on shaft 80. For this purpose the left end of the shaft 136 projects into frame castings 51 (Fig. 16) and is provided with an inner arm 137 having a roller 138 (see Fig. 37) coacting with a slide 140 guided on suitable studs 141. The rearward edge of slide 140 coacts with a roller 142 on an arm 143 fixed to a collar 144 rotatably mounted upon a frame stud 145. Also fixed to collar 144 is an arm 146 (see Fig. 16) having a follower roller 147 coacting with the card feed cam 84 keyed to front cam shaft 80. A strong spring 148 (Fig. 37) extends between the arm 137, and a frame stud 150 resiliently urges arm 137, slide 140, and arm 143 rearwardly, whereby follower roller 147 is held against cam 84. The arrangement of cam 84 is such that during the first half of each revolution of the cam shaft 80, spring 148 urges arm 137 and shaft 136 counter-clockwise to cause picker knife 132 to feed a card to the sensing chamber feed rolls, whereas during the second half of each revolution of shaft 80 the picker knife is positively returned by cam 84.

As is fully explained in the above mentioned patent, it is frequently desirable to prevent feeding of detail cards during certain types of operation. To render the detail card feeding mechanism ineffective, under these conditions, slide 140 (Figs. 16 and 37) is provided with a pin 151 arranged to be engaged by a latch 152 mounted on a rock shaft 153. The latch 152, although rotatably mounted on shaft 153, is held fast thereon by a spring 154 which holds the upper edge of the latch 152 against a pin 155 in an oppositely disposed latch 426 (Fig. 16) fast on the shaft 153, so that latch 152 moves integrally with shaft 153. The shaft 153 may be rocked to place latch 152 in either of three substantially horizontal positions, in the uppermost of which the latch 152 engages pin 151. In this position of the parts, slide 140 is held against rearward movement as cam 84 rotates, whereby no movement is imparted to rock shaft 136 and detail card feeding is prevented.

Cards fed from detail magazine 130 are passed to the detail card sensing chamber feed rolls 160 (Figs. 19 and 23) mounted on transverse shafts 161, the right hand ends of which project into frame casting 52. The lower shaft 161 (Fig. 8) is journaled in a bearing in the casting and is provided with a worm wheel (not shown) driven by a worm 162 on shaft 74. The lower shaft 161 is also provided with a pinion 163 meshing with a similar pinion for driving the upper shaft. The upper shaft 161 is mounted in a ball bearing in an arm 164 pivoted at 165 and is urged downwardly by a spring pressed plunger 166 whereby the upper feed roll 160 is resiliently urged against the lower feed roll to hold the card securely. The left ends of shafts 161 project into the frame casting 51 (Fig. 16), the lower shaft being journaled in a stationary bearing 167 and the upper shaft in a floating bearing 168.

After passing the feed rolls 161, the edges of the card are gripped by two pairs of skid rolls 170 (Fig. 23) arranged at each side of the detail card sensing chamber. These rolls serve to feed the card from the sensing chamber feed rolls into the sensing chamber, urge the card against a card stop while it is being sensed, and pass the card to the punch chamber feed rolls when the card stop is moved out of the path of the card. Each skid roll 170 is fixed on a shaft 171 mounted in a tubular housing (not shown) secured to frame castings 51 and 52. The right hand skid roll shafts 171 are provided with worm wheels 172 (Fig. 8) driven by worm 77 on shaft 74. The left hand skid roll shafts 171 (Fig. 16) are provided with worm wheels 173 that mesh with a worm 174 on a shaft 169 driven by the punch chamber feed roll shafts, as hereinafter described. Each skid roll 170 is opposed by a spring pressed idler roller 175 (see Fig. 23), mounted on the upper plate of the detail card sensing chamber, in order to keep the card in contact with the skid rolls, to assure a constant feed.

When the card stop in the detail card sensing chamber is opened the card is passed to the punch chamber feed rolls 176 (Figs. 19 and 23) mounted on transverse shafts 177. At their right ends the shafts 177 project into frame casting 52 (Fig. 8), and are rotated in the same manner as the sensing chamber feed roll shafts 161, i. e., a worm 178 on shaft 74 drives a worm wheel (not shown) on lower shaft 177, and a pinion 180 on the lower shaft meshes with a similar pinion to drive the upper shaft 177. At each end the upper shaft 177 is mounted in a floating ball bearing 181 (Figs. 8 and 16) and the upper feed roll 176 is resiliently pressed against the lower feed roll by a spring urged plunger 182 (Fig. 8) acting on the right hand bearing 181. To rotate the left hand skid roll shaft 169, the left end of lower shaft 177 projects into the frame casting 51 (see Fig. 16) and is provided with a worm wheel 183 arranged to drive a worm 184 fast on shaft 169.

To convey the cards from feed rolls 176 to the punch chamber, and to hold them against the punch card stop during the punching operation, the punch chamber is provided with two sets of skid rolls 185 (Figs. 20 and 24). Each skid roll 185 is fixed on a shaft 186 mounted in a tubular housing (not shown) secured to its respective frame casting 51 or 52. The right hand skid roll shafts 186 are provided with worm wheels 187 (Fig. 8) driven by worm 82 on shaft 74. The left hand skid roll shafts 186 (Fig. 16) are provided with worm wheels 189 that mesh with a worm 190 on a shaft 191 driven by the lower ejector roll shaft, as hereinafter described. Each skid roll 185 is opposed by a spring pressed idler roll 192 (see Figs. 20, 24, and 33) mounted on the punch gag frame, which serves to keep the cards in contact with the skid rolls to assure a positive feed.

When the card stop in the punch chamber is opened, the card is passed to a pair of eject rolls 193 (Figs. 20 and 24), mounted on transverse shafts 194, by which they are passed to the detail card pocket feed rolls, as hereinafter described. At their right ends the shafts 194 project into frame casting 52 (Fig. 8) and are rotated in the same manner as the punch chamber feed roll shafts 177, i. e., a worm 195 on the shaft 74 drives a worm wheel (not shown) on lower shaft 194, and pinion 196 on the lower shaft meshes with a similar pinion to drive the upper shaft 194. At each end the upper shaft 194 is mounted in a floating ball bearing 197 (Figs. 8 and 16), and the upper feed roll 193 is resiliently pressed against the lower feed roll by a spring urged plunger 198 acting on the right hand bearing 197. To rotate the left hand skid roll shaft 191 of the punch chamber, the left end of the lower shaft 194 projects into frame casting 51 (see Fig. 16) and is provided with a worm wheel 200 arranged to drive a worm 201 fast on shaft 191.

It is desirable that the operation of the machine be stopped when the supply of cards in the detail card magazine is exhausted. For this purpose, a card presence sensing plunger 202 (Fig. 36), arranged to pass through a hole in the bottom of detail card magazine 130, is connected to the forward end of a lever 203 pivotally mounted upon a stud 204 in a bracket 205 (see also Fig. 3), bolted to the card magazine. The rearward end of lever 203 is connected to a vertical link 206, joined at its upper end by a pin and slot connection to the forward arm of a bellcrank 207 fast on rock shaft 117 of the stopping mechanism. Plunger 202 is urged upwardly by a spring 208 stretched from a pendant extension on lever 203, but is held in its lower position, as in Fig. 36, due to the weight of the cards and a card weight 210 in the detail card magazine. However, when the last card is fed from the magazine, plunger 202 is free to move upwardly into a cut-out in the weight 210, so that lever 203 is rocked counterclockwise by spring 208 to lower link 206 and rock bellcrank 207 and shaft 117 clockwise. This movement, through rock arm 116 places, the shallow step of interponent 115 between push rod 120 (see Fig. 16) and the lug on lever 114, so that the drive mechanism is stopped when push rod 120 is again actuated by cam 83.

Under certain conditions it is desirable that the machine continue to operate, even though the supply of detail cards is exhausted. In this case it is essential that card presence sensing plunger 202 be rendered ineffective to control interponent 115. For this purpose a goose neck lever 211, extending through a slot in bracket 205, is pivotally mounted on stud 204 and is provided with a stud 212 overlying the forward end of lever 203, and a cut-away shoulder 213 adapted to engage the forward end of the slot in bracket 205. Lever 211 is urged counter-clockwise to an ineffective position by a spring 214. When the lever 211 is depressed to engage shoulder 213 with bracket 205, stud 212 engages the forward end of lever 203, and prevents the elevation of plunger 202 after the last card is fed from the detail card magazine. However, the pin and slot connection between the link 206 and the bellcrank 207, is provided to permit the rocking of shaft 117 to stop the drive mechanism by other means if required.

Detail card sensing mechanism

The present invention provides a detail card sensing mechanism which serves to sense or analyze perforation patterns in one code in cards fed thereto, to decode said sensed perforation patterns into a different code, and to transmit a mechanical representation of such decoded patterns to the comparing mechanism. For purposes of this description the detail card sensing mechanism may be said to include a detail card sensing chamber, a reciprocable sensing pin box, a stationary set-up pin unit, a decoding unit, and a removable translator.

Secured to the innerside of the left and right hand castings 51 and 52, respectively, is a pair of brackets 220 (See Figs. 19, 23 and 34) which support the ends of a pair of cross bars 221 (see also Fig. 35) upon the upper surfaces of which is secured a sensing platform 222 having a plurality of transversely extending grooves 223, eighty in number, corresponding to the eighty columns of index positions in the well known Hollerith card. Secured to the bars 221, and located adjacent each end of the sensing platform 222, is a guide bracket 224, each bracket having inwardly extending portions upon which may be secured the ends of a sensing stripper plate 225 having columns of holes punched therein corresponding in quantity and arrangement to the grooves 223 in platform 222. There are twelve holes in each column corresponding to the twelve index positions of the Hollerith card. The arrangement of the stripper plate 225 and the sensing platform 222 is such that a space is provided between them through which the detail card is fed by the rolls 160, 170, and 175.

To retain the detail cards in the sensing chamber during the period in which they are sensed, a card stop mechanism is provided. This device comprises a pair of inverted L shaped card stops 226 (Figs. 23, 34, and 37) guided for vertical movement by means of slots 227 formed therein, and encompassing studs 228 secured to the rear cross bar 221. Individual springs 230, one end of each of which is connected to a stud 228 on the bar 221, and the other end connected to a stud 229 on the card stop 226, serves to urge card stops in a normal closed position. The lower end of each card stop is provided with an inwardly extending right angle lug, to which is connected one end of a depending link 231, the other end of which link is connected by pin and slot connection 232 to an arm 233 secured to a cross shaft 234. The cross shaft 234 is journaled at its right hand end in the support bracket 220 and its left hand end in the left hand frame casting 51 through which it passes.

The card stops 226 may be closed or opened by means of a forwardly extending arm 235 (see also Figs. 38 and 42) secured to shaft 234. The arm 235 and shaft 234 are urged in a counter-clockwise direction by a spring 239 having one end thereof connected to the arm 235 and the other end connected to front cross bar 221. Toward the forward end thereof the arm 235 is provided with a stud 236 which cooperates with a latch arm 237 pivotally mounted on the forward end of an arm 238. The arm 238 is pivotally mounted upon shaft 234 and is formed integral with another arm 240 by means of a hub 241 secured to said arms to form a unitary structure. Toward the forward end thereof the arm 240 is provided with a follower roller 242 adapted to ride upon the periphery of cam 85 keyed to the cam shaft 80. A spring 243 having one end connected to a pin on the arm 240 and the other end connected to a pin on the front cross bar 221 serves to urge roller 242 against the cam 85.

Figure 48:
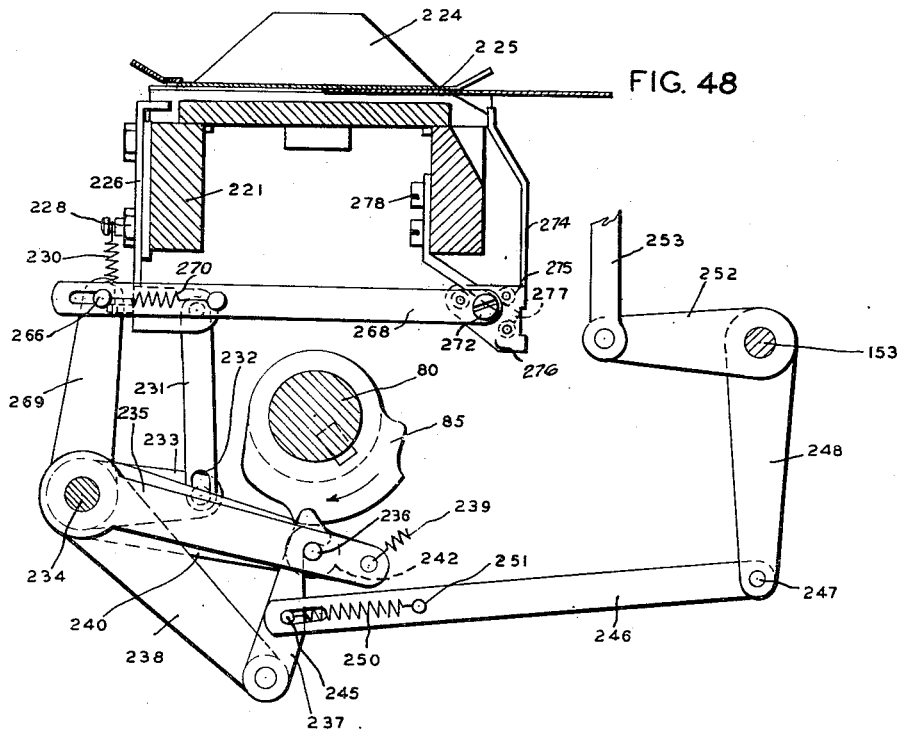
Fig. 48 is a schematic left hand detail view similar to Fig. 47 but with the card stops in operated non stopping position.
Figure 47:
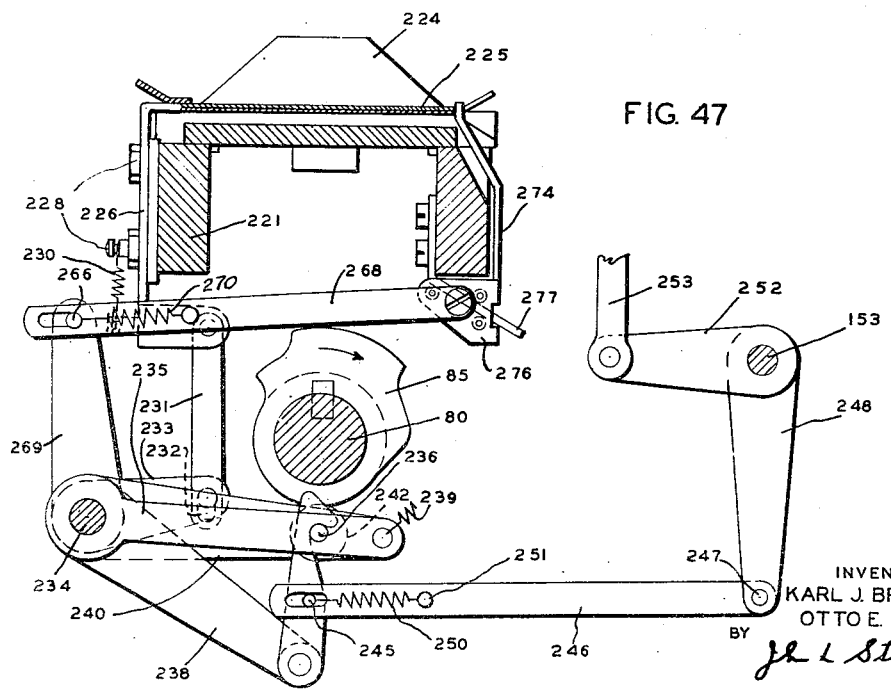
Fig. 47 is a left hand detail view showing the detail card in the sensing chamber and the card stops in normal stopping position.
Figure 61:
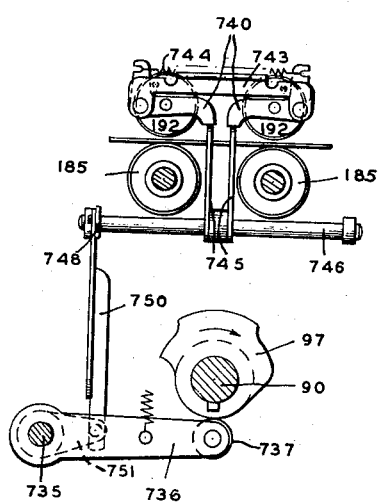
Fig. 61 is a detail left side view of the punching chamber pressure roll release mechanism in normal position with the pressure rolls out of engagement with the card.

The above construction is such that, with the latch 237 in engagement with the stud 236 (see Fig. 47), rotation of the cam 85 in a clockwise direction will cause the arms 238, 240, and 235 to be rocked clockwise when the roller 242 rides from the low dwell to the highest dwell of the cam 85, as shown in Fig. 48. This will cause clockwise rotation of the shaft 234 and the arms 233 to lower the links 231 and the card stops 226 to open position against the tension of springs 230. It will be noted that when the roller rides from the low dwell to the intermediate dwell of the cam 85, the pin on arm 233 rides the full length of its associate slot in arm 231 without effecting any downward movement of the link. Continued rotation of the cam 85 to a point where the roller 242 rides on the highest dwell of the cam, causes the pin on the arm 233 to be rocked further in a clockwise direction to move the link 231 downward and, consequently, open the card stop 226 as above described. The timing is such, as indicated in Fig. 39, that with the cam in its normal zero position, i. e., with the keyway at its top dead center (see also Figs. 23 and 47) the roller 242 rides on the low dwell of the cam 85 and the card stop is in its closed position. At about 113° rotation of the cam 85, the roller begins to rise from the intermediate dwell to the highest dwell of the cam 85 and the card stops 226 start to open. At about 131° rotation of the cam 85 the roller 242 has reached the highest dwell of the cam, at which time the card stops are fully opened (see Fig. 48). At about 193° rotation of the cam 85, the roller 242 begins to ride off the highest dwell of the cam, and the card stops begin to close due to the action of their springs 230. At about 211° rotation of the cam 85, the roller 242 has ridden off the highest dwell of the cam and the card stops are now fully closed.

Under certain conditions it is required that card stops 226 be held in closed position to retain the card in the sensing chamber. For this purpose means are provided to disable the latch 237 whereby rocking of the arm 240 by cam 85 will not effect rocking of the arm 235 and, consequently the opening of the card stops 226. The latch 237 has pivoted thereto by pin and slot connection 245 the rearward end of a link 246, the forward end of which is connected at 247 to a depending arm 248 secured to the rock shaft 153. A spring 250 having one end connected to a pin 251 on the link 246, and the other end connected to the pin of the pin and slot connection 245, serves to urge the latch 237 into engagement with the pin 236 on arm 235. It will be noted that the rock shaft 153 corresponds to and functions in the same manner as the rock shaft 195, fully disclosed in the above mentioned Patent 2,211,094. Rock shaft 153 has secured thereto a rearwardly extending arm 252 connected to the lower end of a vertical link 253 (see also Fig. 19). The arm 252 and the link 253 correspond to and are arranged to operate in the same manner as arm 646 and link 647, respectively, as described in the above Patent 2,211,094.

The above construction is such that, with the arm 252 in its middle or horizontal position, in which master and detail cards may be fed simultaneously as described in the above patent, the link 246 is in its forward position, causing the latch 237 to engage pin 236 in arm 235. The spring 250 tends to retain the latch 237 in engagement with the pin 236. With the parts in this position it will be seen that rotation of the cam 85 will cause opening and closing of the card stops 226, as above described. When the arm 252 is rocked to its upper position (as described in the above mentioned patent) in which master cards may be fed but detail cards may not be fed, then the link 246 is moved to its rearward position to disengage the latch 237 from the pin 236. With the parts in this position, rotation of the cam 85 (see Fig. 37) will rock arms 238 and 240, but inasmuch as the latch 237 is disengaged from the pin 236, no movement is imparted from the arms 238 and 240 to the card stops 226 and, therefore, the card stops remain in an upper closed position.

Figure 34:
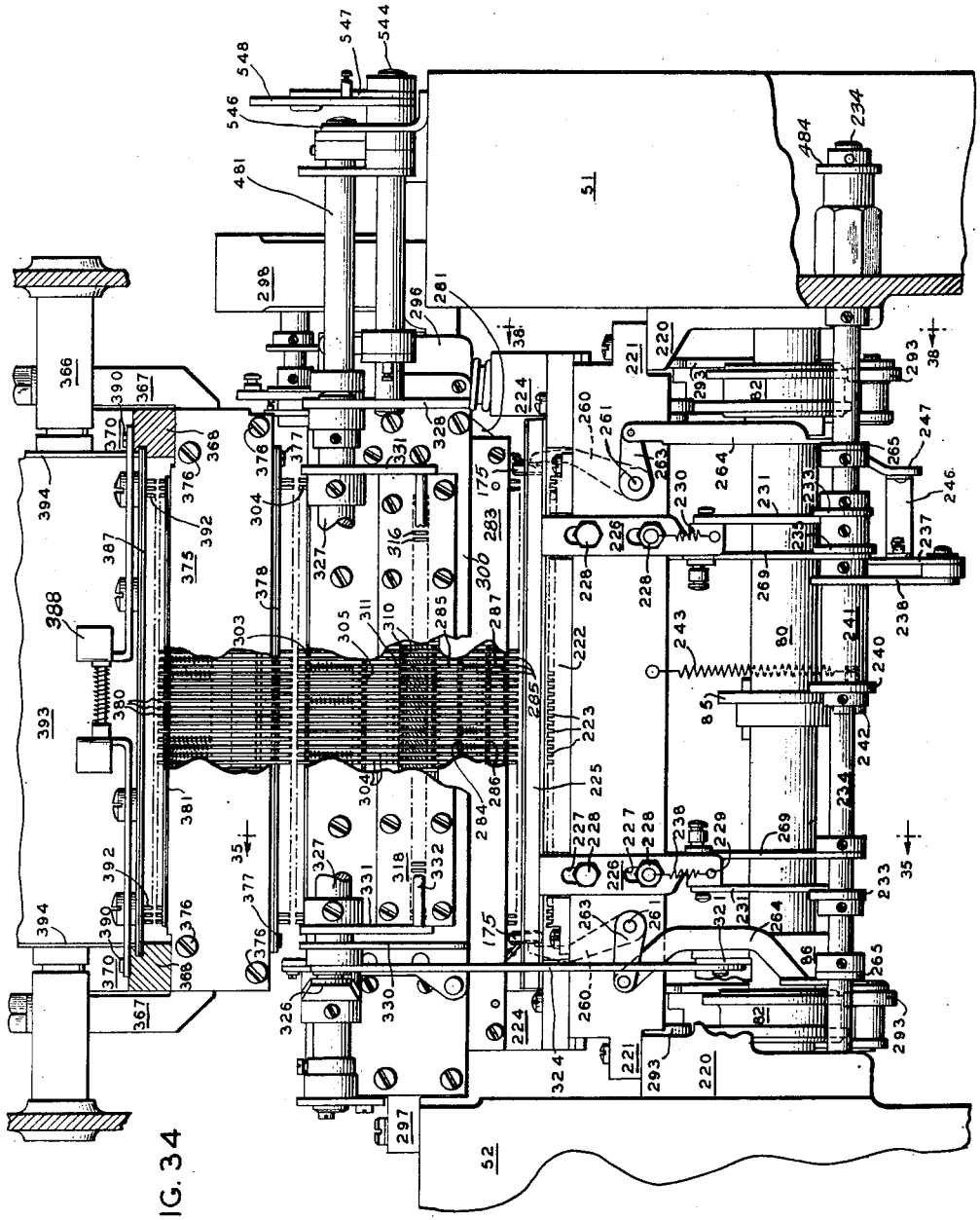
Fig. 34 is a rear cross section taken along the line 34—34 of Fig. 19 and discloses the detail card sensing mechanism, the detail card stop and aligning mechanisms, the decoding mechanism, the translating mechanism, and the set pin retract mechanism.
Figure 38:
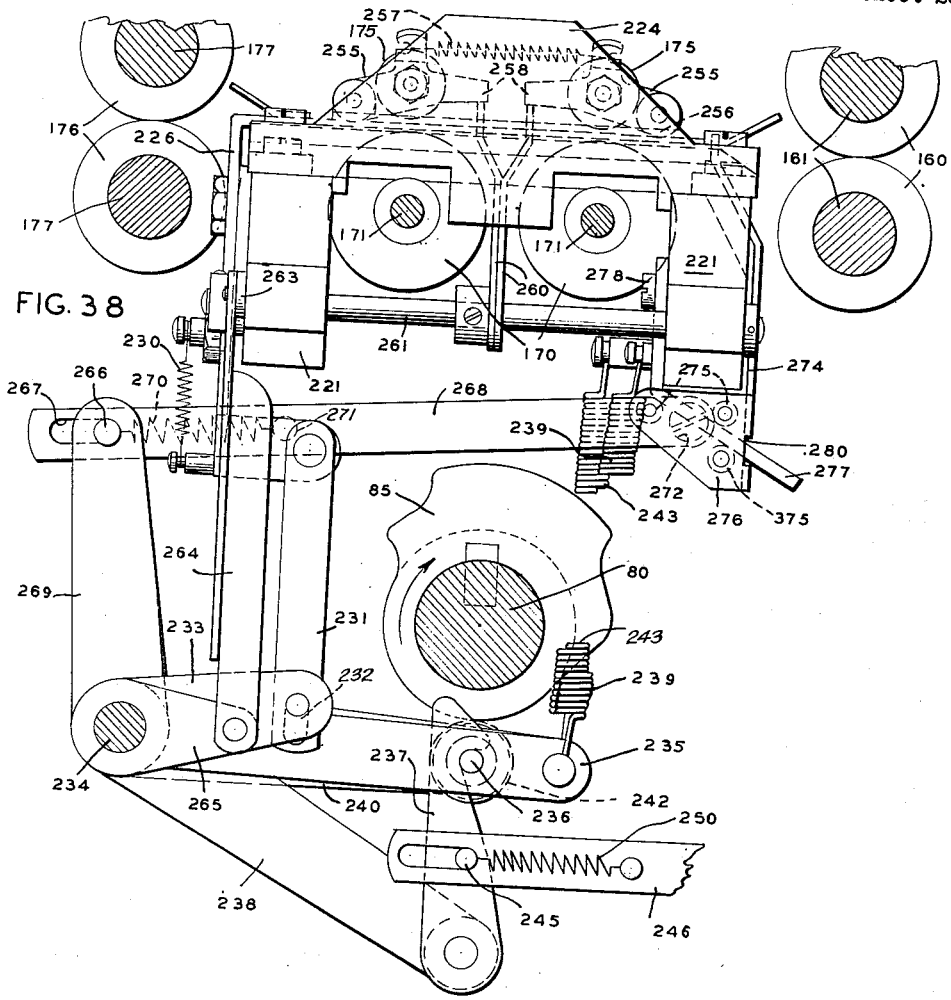
Fig. 38 is a left hand cross sectional detail view of the detail card stop and the detail card stop card aligning mechanisms taken along the line 38—38 of Fig. 34.

In the present machine means are provided to properly align the detail card in the sensing chamber prior to the sensing operation of the machine. In this connection means are provided herein to disengage the pressure rolls 175 from contact with the detail card at a time after the card has been stopped in the sensing chamber by the card stops 226. Referring to Figs. 34, 38 and 42 the pressure rolls 175 are mounted for rotation upon inwardly extending arms 255, pivoted upon upright lugs of brackets 256 secured to the guide brackets 224. Springs 257 serve to urge the pressure rolls into engagement with the detail card. Each of the arms 255 are extended inwardly at 258 to lie above and be engaged by individual cam arms 260 secured to a cross shaft 261 journaled at its ends in cross bars 221. Each of the arms 260 is provided at its upper extremity with a cam portion 262 (see Figs. 44, and 46) adapted to engage the underside of its respective arm 258 and cam the arm and pressure roll out of contact with the detail card. Normally with the machine at the zero stopping position, i. e., with the keyway of cam 85 at its top dead center (see Figs. 43 and 44), the arms 260 are fully in engagement with the arms 258, and the pressure rolls 175 are out of engagement with the detail card.

The means for rocking the arms 260 out of engagement with the arms 258 is as follows: Each of the shafts 261 extends beyond the rear cross bar 221 in which they are journaled, and has securely mounted thereto an arm 263 connected by a link 264 to an arm 265 secured to the shaft 234. As was previously described, shaft 234 is rocked by means of the follower roller 242 riding upon the periphery of the cam 85. The above construction is such that, with the cam 85 at its normal zero position, the roller 242 rides upon the low dwell of the cam and the pressure rolls are out of engagement with the detail card as seen in Figs. 43 and 44. At about 98° rotation of the cam 85 (see also Figs. 39, 45 and 46) the roller 242 starts to ride on the intermediate dwell of the cam, causing the shaft 234 to rock in a clockwise direction which, through arms 265, links 264, and arms 263, causes shafts 261 to rock the arms 260 out of engagement with the arms 258. This will free the pressure rolls 175 to drop into engagement with the detail card. At about 222° rotation of the cam 85, the roller 242 will drop off the intermediate dwell of the cam and begin to ride on the low dwell thereof. This will cause the shaft 234 to rock in a counterclockwise direction to bring the cam portions 262 on arms 260 into engagement with the arms 258, thereby raising the pressure rolls 175 out of engagement with the detail card against the tension of their respective springs 257. It will be noted that when the roller 242 rides upon the highest dwell of the cam, it rocks the cam arms 260 further away from the respective arms 258. However, this is an idle movement.

Each of the arms 260 is further provided with an aligning surface 254 (see Figs. 44 and 46) to engage the associated edges of the detail card at the time that the cam portions 262 thereof are raising the pressure rolls out of engagement with the detail card. This will cause a proper alignment of the card so as to bring the columnar positions of the card in accurate register with the columnar positions of the sensing chamber.

Means are provided herein to insure that the detail card is fed fully against the card stops 226, and kept there during the time that the pressure rolls 175 are out of engagement with the card. Referring to Figs. 4, 23, 38, 47 and 48, the shaft 234 has secured thereto a pair of upright arms 269, the upper end of each of which is provided with a pin 266 which rides in a slot 267 formed in the rear end of a forwardly extending link 268. A spring 270 having one end connected to the pin 266 on the arm 269, and the other end connected to a pin 271 on the link 268, serves to urge said link 268 in a rearward direction. The forward end of the link 268 is connected at 272 (see also Fig. 42) to a rearwardly extending arm 273 of an aligning finger 274. The arm 273 forms one wall of a substantially U shaped lower portion of aligning finger 274. Supported at one end by arm 273 are three rollers 275 which are supported at their other ends in the other arm 276 of the U shaped construction. A forwardly extending support bracket 277, secured by screws 278 to the inner side of the front cross bar 221, passes between the rollers 275 (see Figs. 38 and 42) and serves to support and guide the upward and rearward movement of the aligning finger 274. A slot 280 is provided at the base of the U shaped construction through which the forward end of the bracket 277 may protrude. The aligning finger 274 rises vertically from its U shaped base, and then extends rearwardly and upwardly to form a finger which serves to align the card. The upper ends of the aligning finger 274 are suitably guided in slots formed in the sensing chamber.

The above construction is such, that, with the cam 85 at its normal zero position, i. e., with the keyway at its top dead center (see Fig. 47), the shaft 234 is at its most counter-clockwise position, due to the fact that the follower roller 242 rides on the low dwell of the cam. Consequently, the arms 269 and the links 268 are in their rearmost position to retain their respective aligning fingers 274 in effective aligning position. At about 131° rotation of the cam 85 (see Figs. 39 and 48) and after the pressure rolls 175 have again engaged the card as above described, the follower roller 242 begins to ride upon the highest dwell of the cam. This causes the shaft 234 to be rocked to its most clockwise position whereby the arms 269 are rocked forwardly to cause a forward movement of the links 268, thereby moving the aligning fingers 274 forwardly and downwardly along their brackets 277 and out of the path of a new card that is being fed into the sensing chamber. At about 193° rotation of the cam 85 the roller 242 begins to ride off the highest dwell of the cam, and the aligning fingers 274 begin to move upwardly and rearwardly. At about 242° rotation of the cam 85 the roller 242 begins to ride on the low dwell of the cam, and the aligning fingers 274 are in their full aligning position.

*Sensing pin box and set-up pin unit*

The reciprocable sensing pin box and the set-up pin unit used in the present machine are substantially the same as that shown and described in British Patent No. 401,012, issued to Arthur Thomas. The sensing pin box comprises left and right hand end brackets 281 and 282, respectively (see Figs. 19, 35 and 36) to which are secured front and rear cross bars 283. Each of the cross bars 283 is provided with a longitudinally extending platform, upon the upper surface of which is secured a guide plate 284 provided with openings through each of which protrudes the upper stem of a sensing pin 285. The arrangement of the guide plate 284 is such that the holes punched therein form a pattern of index positions which correspond in number and arrangement to the index positions of an eighty column Hollerith card. Each hole in the plate 284 is also in register with a corresponding hole in the sensing stripper plate 225. Secured to the underside of the platform of brackets 283 is a pair of guide plates 286 and 287, spaced a suitable distance apart by means of cross bars 288. The guide plates 286 and 287 serve to guide the lower and enlarged portions of the sensing pins 285. Formed about midway between the ends of the sensing pins 285 are shoulders 290, which limit the downward movement of the pins by contacting the upper face of the guide plate 286. Individual springs 291 located between the upper guide plate 284 and the shoulders 290 on sensing pins 285 serve to urge the sensing pins in a downward direction. The lower ends of the pins 285 are provided with a reduced portion 292, adapted to fit into the standard rectangular holes of a Hollerith card and the grooves 223 formed in a sensing platform 222. The guide plates 284, 286, and 287 and cross bars 288 are riveted together and secured to the left and right hand brackets 281 and 282 to form a unitary structure. The above sensing pin box structure is reciprocated positively during each machine cycle under control of two sets of complementary cams 82 (see Figs. 19, 23, and 34) keyed to the cam shaft 80. Each cam is provided with two follower rollers 293 mounted on an arm 294 pivoted at 295 to frame castings 51 and 52. One arm 294 is connected to the left end bracket 281, and the other arm 294 is connected to the right hand bracket 282 by a vertical rod 295, guided for vertical movement in holes in brackets 224 secured to the left and right hand castings 51 and 52, as above described.

The construction and arrangement is such that, with the complementary cams at normal zero position, i. e., with the keyway at its top dead center position (see Figs. 19 and 23), the sensing pin box is in its fully raised position (see also Fig. 39). At about 70° clockwise rotation of the cams 82, the sensing pin box is lowered to a position wherein the pins 285 lie just above but not through the sensing stripper plate 225. The sensing pin unit will remain in this position until the complementary cams 82 have rotated about 228°, when the sensing pin unit starts to lower. At about 264° rotation of the cams 82, the sensing pin unit is at its lowest position, i. e., sensing the card, and remains in this position until about 270° rotation of the cams, at which time the sensing pin unit starts to rise and has fully risen at the completion of the cycle.

Referring to Figs. 19, 23 and 34, the set-up pin unit comprises left and right hand brackets 296 and 297, respectively. The left hand bracket 296 is secured to another bracket 298 securely mounted upon the left hand frame casting 51. Secured at their ends to the brackets 297 and 296 is a pair of front and rear cross plates 300 and 301, respectively, which, together with brackets 296 and 297, form a box like structure for supporting the sensing pins and their associated parts. The cross plates 300 and 301 have securely mounted upon their upper and inner sides thereof a pair of cross bars 302, to the upper sides of which is secured a guide plate 303 for guiding the upper ends of pins 304. The lower ends of the pins 304 are guided for vertical movement in another plate 305 secured to the lower sides of the cross bars 302. Enlarged portions 306 formed on pins 304 serve to limit downward movement of said pins. Individual springs 307 are provided to resiliently urge the pins 304 in a downward direction.

The number and arrangement of the pins 304 is the same as the number and arrangement of the sensing pins 285 and are in direct vertical alignment thereof. Cooperating with each of the pins 304 is a pendant pin 310, the shank of which passes through upper and lower guide plates 311 and 312, respectively. The front and rear sides of the plates 311 and 312 fit into the upper and lower surfaces of elongated slots 313 and 314 formed in the cross plates 300 and 301, respectively. Spacer plates 315 secured to the inner sides of the plates 300 and 301 serve to support the upper plate 311 and to space said plate 311 from the plate 312. The above elements are arranged and operated substantially the same as shown and described in the British Patent 401,012. For each column of pendant pins there is provided a retract slide 316 having individual lugs 317 which cooperate with each of the pendant pins 310 in that column. The retract slides 316 are guided at their ends for longitudinal movement in guide plates 318 (see Figs. 23, 34, and 35) secured to the outer sides of the cross plates 300 and 301.

The above construction is such that, in the normal stopping position of the machine the sensing pin box and, consequently, the sensing pins 285 are in their upward position (see also Fig. 39). In this position the pendant pins 310 are offset to one side (to the right in Figs. 23 and 35) of their associated sensing pins 285. When the sensing pins are lowered to sense perforations in a card and if no perforations are found, the sensing pins are prevented from moving downward the full distance by the presence of a card, and thereby retain pendant pins 310 in an offset position. However, if a perforation is sensed, the sensing pin 285 sensing that perforation will be permitted to move downwardly the full distance, and in such movement the upper end thereof moves out of the path of its associated pendant pin 310, whereby said pendant pin may be free to assume an upright position through the action of springs 307. In this position the straightened pendant pins will have the lower extremities thereof in register with the upper extremities of their associated sensing pins 285. When, toward the end of the cycle, the sensing pin box is elevated as above described, the sensing pins 285 which had previously sensed a perforation will engage and move their associated pendant pins 310 and pins 304 in an upward direction (see Figs. 35). The sensing pins 285 which had not sensed a perforation will, as was previously described, wipe past their associated pendant pins and move upwardly to their normal position without effecting any movement of their associated pendant pins.

Any upward movement imparted to the pendant pins 310 will be transmitted through pins 304 to a decoding unit, the function of which will hereinafter be described.

It will be seen from the above that at the end of the cycle the sensing pin 285, which has sensed a perforation will form a continuous transmitting linkage with its associated pendant pin 310 and pin 304 (see Fig. 35). When the sensing pin unit is lowered to sensing position in the following cycle, springs 307 act to restore their associated raised pendant pins 310 and pins 304 to their normal lowered position following the downward movement of sensing pins 285. As is fully set forth in the above British Patent 401,012, the normal tendency of the pendant pins 310 is to assume vertical position. Now, if the sensing pin 285, which in the previous cycle has sensed an opening permitting its associated pin 310 to straighten, has not sensed an opening in the following cycle, it is necessary that the pendant pin 310 thus straightened be moved to its offset ineffective position, so as to prevent a resetting in the same hole. For this purpose, means are provided to move all retract bars 316 in a manner to erase the previous setting made. Referring to Figs. 23, 34, and 35, the retract cam 86 has riding upon its periphery thereof a follower roller 320 mounted upon the forward arm of a bell crank 321 pivoted upon a stub shaft 322 secured to a right hand bracket 220. The rearward arm of the bell crank 321 is connected at 323 to the lower end of an upwardly extending link 324, the upper end of which is connected at 325 to a rearwardly extending arm 326. The arm 326 is secured to a cross shaft 327 journaled at its ends in left and right hand brackets 328 and 330, respectively, which brackets are secured to the rear cross plate 301. Secured to the cross shaft 327 and located between the brackets 328 and 330 is a pair of depending arms 331 which support a cross bail 332 mortised at its ends in the lower ends of the arms 331. The cross bail 332 is common to all the retract slides 316. The retract slides 316 are resiliently urged toward the rear of the machine to the left (Fig. 35) by means of individual springs 333, causing the rear ends of the retract slides 316 to be constantly in contact with cross bail 332. Referring to Figs. 35 and 39, the above construction is such that with the cam 86 at normal zero position, i. e., with the keyway at its top dead center, the follower roller 320 rides upon the low periphery of cam 86. In this position the retract slides 316 and the cross bail 332 are in their extreme rearward position (see Fig. 35), due to the action of springs 333, with the lugs 317 on the retract slides 316, spaced away from their associated pendant pins 310. At about 245° rotation of the cam 86 (see Figs. 49 and 50), the follower roller 320 rides on the high dwell of the cam which causes a counter-clockwise movement of bell crank 321. This will cause through link 324 and arm 326 a counter-clockwise movement of the arm 331 to move the cross bail 332 in a forward direction. It will be noted that about this time the reduced portions 282 of sensing pins 285 are about to sense the card. Counter-clockwise movement of the bail 332 will move all the retract slides 316 and their associated lugs 317 in a forward direction against the springs 333, whereby the lugs will engage all those pendant pins which had been straightened as above described and move said pins out of vertical engagement with their associated sensing pins 285. Immediately the springs 307 associated with the pendant pins 310 will take effect and move said pendant pins to their lowest position, thereby erasing the previous set up made. At about 270° rotation of cam 86 (see Fig. 39) the sensing pins 285 are at their extreme lowest sensing position. At about this time the follower roller 320 rides off the high dwell of the cam to cause a clockwise rotation of the bail 332. This will cause rearward movement of all the retract slides 316 through the action of their respective springs 333 to move all lugs 317 away from the pendant pins 310 a sufficient distance so that, when any of the sensing pins 285 sense a perforation, that sensing pin will free the lower extremity of its associated pendant pin 310, which pendant pin will then assume a straightened position. All those sensing pins which have not found any perforation in the card will prevent their associated pendant pins 310 from assuming a straightened position.

In order to prevent the full complement of pendant pins 310 from being raised when no card is sensed, means are herein provided whereby the retract slides 316 are retained in their forward effective position, so that the pendant pins may not be permitted to straighten when the sensing pins have been lowered to their full sensing position. Guided for vertical movement at its upper end in an L shaped bracket 335 (see Fig. 35), secured to the right hand end bracket 282, and at its lower reduced end in guide plate 287, is a no-card sensing pin 336, which is limited in its downward movement by a shoulder 337 thereon cooperating with the upper surface of the plate 287. At its upper end pin 336 cooperates with an arm 338 (see also Figs. 49, 50, 51 and 52) pivotally mounted upon a stud 340 on a bracket 341, which bracket is secured to the inner side of the rear cross plate 301. Also pivotally mounted upon the stud 340 is a bell-crank 342, which bell-crank is urged in a counter-clockwise direction by means of a spring 343 having one end connected to a pin on the upright arm of said bell crank 342 and the other connected to the front cross plate 300. The forward arm of the bell-crank 342 is provided with a pin 344 which cooperates with the underside of the arm 338. A spring 345, having one end connected to a pin 346 and the other end connected to pin 344, serves to resiliently hold the arm 338 against the pin 344. Secured to the shaft 327 is a forwardly extending arm 347 having adjustably mounted thereto a depending latch 348 which lies in the same vertical plane as the upright arm 342. The arrangement of the latch 348 and the arm 342 is such that, with the follower roller 320 riding on the low dwell of the cam 86 (Fig. 35), the arm is rocked to its full clockwise position, bringing the lower portion of the latch 348 into the path of movement of the upper portion of the upright arm of bell crank 342. In this position the bell crank 342 and the arm 338 are prevented from moving in a clockwise direction. When the follower roller 320 rides upon the high dwell of the cam 86, the latch 348 is moved to its full counter-clockwise position out of the path of the bell crank 342, permitting the bell crank to move in a clockwise direction through the tension of the spring 343.

Assuming now that the sensing pins 285 are lowered to sense perforations in a card, and a card is present in the sensing chamber, the no-card pin 336 moves downwardly following the downward movement of its bracket 335, and the lowered end thereof contacts the upper surface of the card as shown in Fig. 49. Thereafter continued movement of the sensing pin box will not effect a further downward movement of the no-card pin 336. In this position, i. e., when the sensing pin box is moved to its full downward position, the arm 342 is still in its counter-clockwise ineffective position, and the rocking movement of the bail 332 through its cam 86 will be permitted, as has been hereinbefore described. However, if, on the following cycle of the machine, the sensing pin 336 does not sense a card in the sensing chamber, the no-card pin 336 moves downwardly together with the sensing pin box beyond the position whereby it may be stopped by a card as shown in Fig. 50. This will cause the arm 338 and the bell-crank 342 to move to its full clockwise position under tension of the spring 343. As will be seen in Fig. 39, soon after the sensing pins 285 have passed beyond the sensing stage the follower roller 320 begins to ride upon the high dwell of the cam 86 to thereby rock bail 332 in a forward direction, so as to move all the retract slides 316 forwardly to erase the previous set up. This occurs at about 245° rotation of the cam 86. At about 270° rotation of the cam 86 the roller 320 rides off the high dwell of the cam 86 to restore the bail 332 and the latch 348 to the normal clockwise position. However, due to the fact that at this time the no-card pin 336 is still in the lowest position and, consequently, the upright arm of bell crank 342 is in its full clockwise position, i. e., directly beneath the latch 348, the latch is thereby prevented from clockwise movement as shown in Fig. 51. It will be seen that prevention of clockwise movement of the latch 348 also prevents the bail 332 from moving in a clockwise direction, thereby retaining all of the retract slides 336 in their forward effective positions. While in this position, the lugs 317 on the retract slides 316 retain their associated pendant pins 310 in an offset position, whereby the associated lower extremities thereof will not be engaged by the upper extremities of the sensing pins 285. Toward the latter part of this cycle the no-card sensing pin 336 is raised by the sensing pin box to rock the arm 338 in a counter-clockwise direction. However, the spring 345 is not effective to rock the bell-crank 342, due to a binding action present between the lower surface of the latch 348 and the upper surface of the upright arm of bell-crank 342. In the following cycle of the machine, at the time that the follower roller 320 again rides on the high point of the cam 86, and assuming that upon this following cycle the no-card pin 336 senses the presence of a card, the upright arm of the bell crank 342 will be free to rock to its full counter-clockwise position through the action of its spring 345, which it will be noted is heavier than spring 343. If during this following cycle the no-card pin 336 again sensed the absence of a card, then the upright arm on bell-crank 342 again prevents the rearward movement of the retract bail 332, as above described.

In the above cited Patent 2,211,094 and other previous patents, sensing takes place by raising the sensing pins from a lowered position to sense the presence or absence of perforations in a card. In the present instance sensing is accomplished by lowering the sensing pins to sensing position to sense the presence or absence of perforations in a card. Accordingly the no-card machine stopping mechanism has been changed in construction in accordance with the present invention.

Figure 41:
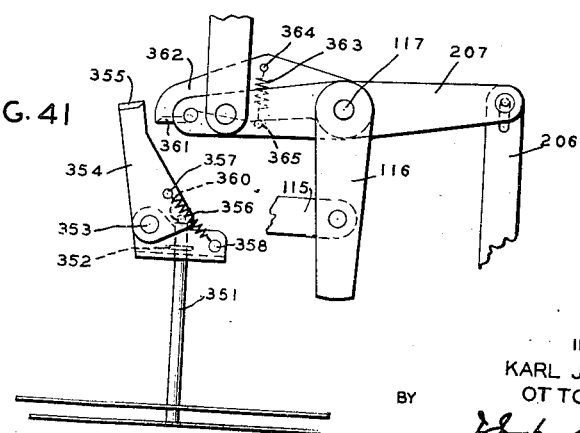
Fig. 41 is a left hand detail view of the no card machine stopping pin and its associated mechanism in operative position when sensing the absence of a card.

Referring to Fig. 36, secured to the left hand bracket 281, which forms part of the reciprocating sensing pin box above described, is a L shaped bracket 350 which supports and guides the upper portion of a stop pin 351 which extends downwardly through an opening in the left hand end of the guide plate 287. The upper end of the pin 351 is provided with a shoulder 352 which serves to limit downward movement of pin 351. Pivotally mounted upon a stud 353 fixed to the upper arm of bracket 350 is a latch arm 354 having a right angle lug 355 formed at the upper end thereof. A spring 356, having one end connected to a pin 357 on the latch arm 354 and the other end connected to a pin 358 on the upright arm of bracket 350, serves to urge the latch arm 354 in a clockwise direction (Fig. 36) about its pivot 353. A pin 360 on the latch arm 354 is arranged to contact the upper extremity of stop pin 351 and serves to resiliently hold the pin 351 in a downward position. The right angle lug 355 on the arm 354 cooperates with a right angle lug 361 formed on a rearwardly extending arm 362 pivoted upon the shaft 117. It will be noted that shaft 117 has the same function as shaft 156 in Patent 2,211,094 (Fig. 29). It will be recalled shaft 117 has secured thereto a bell crank 207. A spring 363, having one end connected to a pin 364 on the arm 362 and the other end connected to a pin 365 on the rearward arm of bell crank 207, serves to urge the arm 362 in a counter-clockwise direction (Fig. 36). The arm 362 is limited in its counter-clockwise movement by the pin 365. The above construction is such that, with the sensing pin box in its full downward sensing position and with no card in the sensing chamber, the stop pin 351 will move downwardly a full distance. The latch arm 354, moving down with the sensing pin box and the stop pin 351, will assume a position wherein its bent over lug 355 is directly beneath and in the path of lug 361 on the arm 362. When, toward the end of this cycle, the sensing pin box is raised, the lug 355 on arm 354 will engage and move the lug 361 on arm 362 and thereby, through the spring 363, rock the bell crank 207 and shaft 117 in a clockwise direction. This will cause a rearward movement of the stepped interponent 115 to a position wherein the machine is made to stop as above described. Continued upward movement of the arm 354 will cause the lug 355 thereon to wipe past the lug 361 on the arm 362. The extra movement of the arm 362 is an idle one against the tension of the spring 363. With the parts in this position, and if the machine is again cycled, the function of the above mechanism is as follows:

The sensing pin box is lowered as above described, and if a card is sensed in the chamber by the pin 351, the pin is prevented from further downward movement by the card, causing a counter-clockwise movement of the arm 354 against the spring 356. This will move the lug 355 on the arm 354 out of the path of lug 361 on arm 362, so that in the following upward movement of the sensing pin box, i. e., toward the end of the cycle, the arm 362 will not be rocked to cause stopping of the machine as above described (see Fig. 41). It will be seen from the foregoing that, as long as a card is in the sensing chamber, lug 355 will be rocked out of the path of lug 361, but will lie in the path only in the absence of a card.

The means for converting or decoding the information in the eighty column Hollerith code to the ninety column Powers code is as follows: Referring to Figs. 3, 19, 23 and 34, a substantially square cross bar 366 is provided, which cross bar extends transversely of the machine and is secured at its ends in the left and right frame castings 56 and 57, respectively. The cross bar 366 has secured near each end thereof a depending bracket 367 of U shaped construction. Located between the upright arms of each bracket 367, and supported by the horizontal base portion thereof, is one end of a rearwardly extending guide rail 368. Spacers 370 between the guide rails 368 and the cross bar 366 are provided to prevent vertical displacement of the guide rails. The guide rails 368 are secured at their rear ends to a cross bar 371 (Figs. 11, 20, and 24), which cross bar extends transversely of the machine and is secured at its ends to brackets 372 and 373 secured to the frame castings 56 and 57, respectively. Secured to the underside of the forward portion of each guide rail 368 by screws 373 (see Fig. 19) is an end bracket 374, having secured to the front and rear sides thereof a front and rear plate 375 by screws 376. The plates 375 and the end brackets 374 form a box like structure for supporting the decoding unit, as will be hereinafter described.

Referring to Figs. 23 and 34, the plates 375 have secured to the underside thereof, by means of screws 377, a pair of guide plates 378 having holes punched therein for guiding the lower ends of pins 380. The upper ends of the decoding pins 380 are guided for vertical movement in holes formed in a pair of guide plates 381 secured by screws 382 to the upper side of the front and rear plates 375. Individual springs 379 serve to urge the decoding pins 380 in a downward direction. The number and arrangement of the decoding pins 380 is the same as the number and arrangement of the sensing pins 285 and the pins 304 with decoding pins 380 lying in direct vertical alignment with their associated pins 304.

For purposes of the following description the decoding pins 380 (see Fig. 35) will be numbered, reading from left to right, "12," "11," and "0" to "9" inclusive. Decoding pin number 9, which corresponds to the IX index position in the Hollerith card, has a flag or bar 383 secured thereto, which bar extends toward the rear of the machine and is secured at its other end to the decoding pin "12." The decoding pins numbers "8," "6," "4" and "2" are provided with extrusions 384 which extend from the sides of the pins to lie directly beneath and in the path of the bar 383. The decoding pins numbers "8," "6," "4" and "2" are also provided with a lug 385, which extends leftwardly to engage a shoulder 386 formed on the decoding pins numbers "7," "5," "3" and "1" which lie directly to the left of the decoding pins "8," "6," "4" and "2," respectively. The decoding pins "0," "11," and "12" do not cooperate with either bar 383, or any of the adjacent pins, as do the decoding pins from "1" to "9," inclusive.

The above construction is such that when any of the pins 304 rise, as above described, these pins elevate their associated decoding pins 380 in the following manner. When the numeral "9" is sensed in a card the corresponding pin 304 is raised causing the raising of the "9" decoding pin 380 together with the flag or bar 383, and the "12" decoding pin (see Fig. 35). The "12" decoding pin which is connected to the "9" decoding pin by bar 383 has no function other than to permit a better vertical sliding motion of the "9" decoding pin, as will hereinafter appear. When the "8" decoding pin is raised by its associated pin 304 its extrusion 384 thereon will engage and raise the flag and, consequently, the "9" decoding pin. Also when the "8" decoding pin is raised its lug 385 thereon will engage the shoulder 386 on its adjacent "7" decoding pin and raise said "7" pin. By the raising of the "7," "8," and "9," decoding pins, as above described, the "8" pin will have no further function, as will hereinafter appear, and the "7" and "9" decoding pins will indicate the numeral "8" in the Powers code. When the "7" decoding pin 380 is raised by its associated pin 304, this pin, having no connection with any of the other decoding pins 380 nor the flag 383, will rise alone to indicate a numeral "7" in the Powers code. When the "6" decoding pin is raised by its associated pin 304, the extrusion 384 will cause the raising of the "9" decoding pin through the flag 383, and its lug 385 will engage and move its adjacent "5" decoding pin. As will appear, the "6" decoding pin having no other function, the "5" and "9" decoding pins will raise to indicate the numeral "6" in the Powers code. When the decoding pin "5" is raised by its associated pin 304, this decoding pin, having no cooperation with any other pin or flag 383, will rise alone, indicating the numeral "5" in the Powers code. When the decoding pin "4" is raised by its associated pin 304, the extrusion 384 thereon will raise the "9" decoding pin through its flag 383, and the lug 385 thereon will engage and raise its adjacent "3" pin. The "4" decoding pin having no other function, the number "9" and "3" decoding pins rise to indicate the numeral "4" in the Powers code. When the "3" decoding pin is raised by its associated pin 304, this "3" decoding pin, having no cooperation with any other decoding pin, will rise alone to indicate a numeral "3" in the Powers code. When the "2" decoding pin is raised by its associated pin 304, its extrusion thereon will raise the "9" pin through the flag 383, and its lug 385 thereon will engage and raise its adjacent "1"

pin. The "2" decoding pin having no other function, the "9" and "1" decoding pins will rise to indicate the numeral "2" in the Powers code. When the "1" decoding pin is raised by its associated pin 384, this decoding pin, having no cooperation with any of the other pins, will rise alone to indicate a numeral "1" in the Powers code. When the zero decoding pin is raised by its associated pin 384, this zero pin, having no cooperation with any of the other pins, will rise alone to indicate a "zero" in the Powers code. As is well known, the Powers code does not utilize index positions in any one column for the numerals "11" and "12" and therefore, the "11" and "12" decoding pins 380 will have no function, and any movement imparted to said pins will not be transmitted to the translating unit, as will hereinafter appear. As the space in which the upper portions of the decoding pins terminate is necessarily limited in this type of structure, and in order that strength of material is not sacrificed, the upper ends of the decoding pins are arranged in a staggered relation as shown in Fig. 53.

The translating unit for transmitting the decoded data from the decoding unit, above described, to the comparing unit, to be described hereinafter, is guided for lateral movement upon the guide rails 368 in the same manner as the removable translator as described in the above mentioned Patent 2,211,094. The translating unit comprises a rectangular frame 386, to the underside of which is secured a pair of guide plates 387 having holes punched therein corresponding in number and arrangement as to the holes in guide plates 381. The guide plates 387 extend rearwardly to the left (Fig. 23) beyond the rectangular frame 386, for supporting a spring pressed latch mechanism 388 co-acting with suitable studs 390 (Fig. 34) secured to the guide rails 368. Secured to the upper portion of the rectangular frame 386 is a plurality of guide plates 391, having holes punched therein, the total number and arrangement of which is the same as the holes punched in the plates 387. The holes in plates 387 and 391 are arranged in vertical alignment and serve to guide the lower and upper ends of a plurality of pins 392. The number and arrangement of the pins 392 is such that there is a pin 392 in direct vertical alignment with the "9," "7," "5," "3," "1" and "0" decoding pins. Secured to the front and rear sides of the rectangular frame 386 is a pair of upright support plates 393, and secured to the left and right hand sides of the frame 386 is a pair of upright plates 394. Secured to the upper portions of the plates 393 and 394 is a rectangular frame 395, having secured to the upper face thereof a plurality of guide plates 396 (Fig. 23) having holes punched therein to guide the upper ends of pins 397. Rectangular frame 395 has secured to the lower surface thereof a guide plate 398 having holes punched therein which serve to guide the lower ends of the pins 397. There is a full complement of pins 397 corresponding to the perforation positions of the lower zone of a ninety column Powers card each column of perforation positions being located at the IX, VIII, VII, VI, V, IV index positions.

Secured to the front and rear plates 393, and located between the guide plates 391 and 398, is a translator wire supporting unit comprising a pair of rectangular frames 400 suitably spaced apart by means of rods 401 to form a unitary support structure. Secured to the upper surface of the upper rectangular frame 400 is a support plate 402 having tapped holes therein for receiving one end of a Bowden wire casing 403, which ends first pass through tapped holes formed in a lower support frame 404 secured to the lower surface of the upper rectangular frame 400. The other end of the Bowden wire casing 403 passes through tapped holes in a plate 405 secured to the upper surface of the lower rectangular frame 400, and terminate in tapped holes formed in a support plate 406 secured to the lower surface of the lower rectangular frame 400. Individual wires 407 enclosed within associated casings 403, and having one end connected to its associated pin 392, and the other end connected to its associated pin 397, serve to transmit upward movement from the decoding pins 380 to the comparing unit. Individual springs 408 associated with the pins 397 serve to urge pins 397 and the pins 392 in a downward direction. It will be noted that the pins 392 are wired to the pins 397 located in a position to corresponnd to the index positions in the lower zone of a Powers card. In this manner, any column sensed in the Hollerith code will be decoded into a Powers code and transmitted to the comparing unit and compared with the information sensed in the corresponding column in the lower zone of a Powers card. However, if it is desired to transmit the decoded data to the comparing unit to compare the information sensed in the Hollerith card with that sensed in the corresponding column in the upper zone of a Powers card, it is only necessary to wire the pins 392 to associated pins 397 located in a position corresponding to the upper zone of a Powers card, i. e., moving pins 397 to the left from the position shown in Fig. 23.

*Master card feeding mechanism*

In the present invention master cards are passed through the machine in substantially the same manner as in the above cited Patent 2,211,094, i. e., the cards placed in the master card magazine are passed seriatim to suitable feed rolls, whereby they are conveyed to a sensing chamber in which their perforated data is sensed and from which they are passed to the master card ejector rolls.

Figure 2:
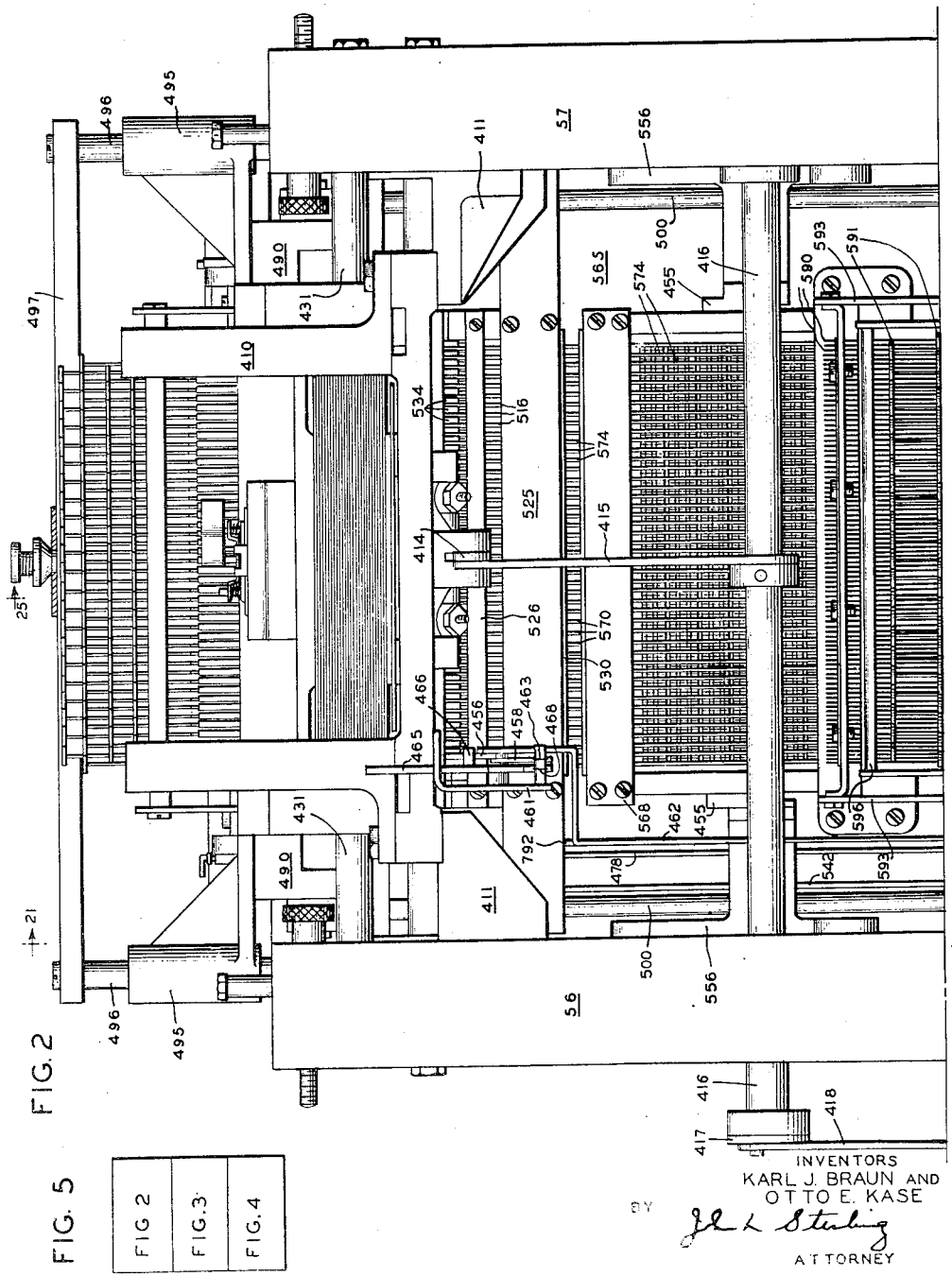

Referring to Figs. 2, 18, and 22, the master cards are placed in a master card magazine 410 supported by brackets 411 bolted to frame castings 56 and 57. A card picker knife 412 (Fig. 22) suitably guided for front to rear movement, and arranged to push the lowermost master card beneath a throat knife 413 to the master card sensing chamber feed rolls, is connected by a link 414 to an arm 415 fixed to a transverse rock shaft 416 journaled in frame castings 56 and 57, which shaft may be rocked during each cycle by the card feed cam 84 (see Fig. 37). For this purpose the left end of shaft 416 projects into frame casting 56 (see also Fig. 15), and is provided with an arm 417 connected by a link 418 to the horizontal arm of an offset bell crank 420 (see Fig. 16), rotatably mounted on the rock shaft 135 to the left of arm 137 of the detail card feeding mechanism (see also Fig. 37). The vertical arm of bell-crank 420 is provided with a follower roller 421 co-acting with a slide 422 guided on studs 141. The rearward edge of slide 422 co-acts with a roller 423 on arm 146 which is provided, as described above, with a follower roller 147 co-acting with the card feed cam 84. A strong spring 424, extended between the vertical arm of bell crank 420 and frame stud 150, resiliently urges slide 422 and arm 146 rearwardly, whereby follower roller 147 is held against the cam 84. The arrangement of cam 84, as indicated in Fig. 39, is such that during the first half revolution of shaft 80, spring 424 tends to urge bellcrank 420 counter-clockwise, whereby shaft 416 is rocked counter-clockwise to cause picker knife 412 to feed a master card to the master card sensing chamber feed roll, whereas during the second half of each revolution of shaft 80 the picker knife is positively returned by the cam 84.

It is frequently desirable to prevent the feeding of master cards during certain types of operation. To render the master card feeding mechanism ineffective under these conditions, slide 422 (see Figs. 16 and 37) is provided with a pin 425 arranged to be engaged by a latch 426 fast on the rock shaft 153. As fully explained in the above mentioned Patent 2,211,094, shaft 153 may be rocked to place latch 426 in either of three substantially horizontal positions, in the lowermost of which the latch engages pin 425. In this position of the parts, slide 422 is held against rearward movement as cam 84 rotates, whereby no movement is imparted to bell crank 420 or rock shaft 416 and master card feeding is prevented.

Figure 7:
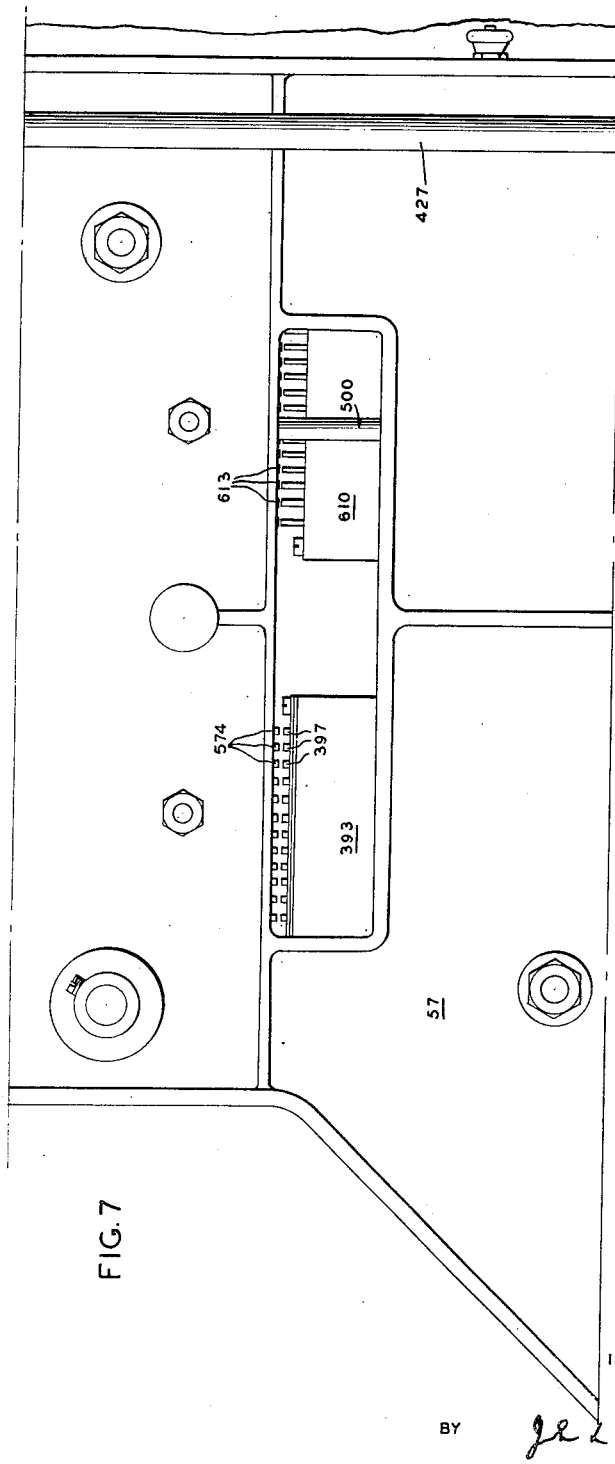

The several card feed rolls, required to pass the master cards from the master card magazine to the master card ejector rolls, as in the case of the detail card feed rolls, are driven from the drive shaft 74. For this purpose a vertical shaft 427 (Figs. 6, 7, and 8), journaled in bearings in frame castings 52 and 57, is driven through a pair of mitre gears by shaft 74, and, through a second pair of mitre gears, serves to rotate a horizontal worm shaft 428 journaled in bearings on frame casting 57. Master cards fed from the master card magazine are passed to the master card sensing chamber feed rolls 430 (Figs. 18 and 22) mounted on transverse shafts 431, the right hand ends of which project into frame casting 57. The lower shaft 431 (Fig. 6) which is journaled in a bearing in the casting, is provided with a worm wheel (not shown) driven by a worm 432 on shaft 428. The lower shaft 431 is also provided with a pinion 433 meshing with a similar pinion for driving the upper shaft. The upper shaft 431 is mounted in a floating ball bearing in an arm 434 pivoted at 435, and is urged downwardly by a spring pressed plunger 436, whereby the upper feed roll 430 is resiliently urged against the lower feed roll to hold the card securely. The left ends of shafts 431 project into frame casting 56 (Fig. 14), the lower shaft being journaled in a stationary bearing 439 and the upper shaft in a floating bearing pivoted at 437.

After passing the sensing chamber feed rolls 430, the edges of the master cards are gripped by two pairs of skid rolls 438 (Fig. 18) arranged at each side of the detail card sensing chamber. These rolls serve to convey the master cards from the sensing chamber feed rolls into the sensing chamber, urge the card against a card stop while it is being sensed, and pass the card to the master card ejector rolls when the card stop is opened. Each skid roll 438, as in the detail card sensing chamber, is fixed on a shaft 440 mounted in a tubular housing (not shown) secured to frame castings 56 and 57. The right hand skid roll shafts 440 are provided with worm wheels 441 (Fig. 6) driven by a worm 442 on the shaft 428. The left hand skid roll shafts 440 (Fig. 14) are provided with worm wheels 443 that mesh with the worm 444 on a shaft 445 driven by the lower punch chamber ejector roll shaft, as hereinafter described. Each skid roll 438 is opposed by a spring pressed idler roll 446 (Fig. 18), mounted on the upper plate of the master card sensing chamber, which serves to keep the cards in contact with the skid rolls to assure a positive feed. When the card stop in the master card sensing chamber is opened, the card is passed to the master card ejector rolls 447 (Figs. 18 and 22) mounted on transverse shafts 448 by which they are passed to the master card pocket feed rolls as hereinafter described. At their right ends the shafts 448 project into frame casting 57 (Fig. 6) and are rotated in the same manner as the sensing chamber feed roll shafts 431, i. e., a worm 450 on shaft 428 drives a worm wheel (not shown) on the lower shaft 448, and a pinion 451 on the lower shaft 448 meshes with a similar pinion to drive upper shaft 448. At each end the upper shaft 448 is mounted in a floating ball bearing 452 (Figs. 6 and 14) and the upper feed roll 447 is resiliently pressed against the lower feed roll by spring urged plungers 453 acting on the bearings 452. To rotate the left hand skid roll shaft 445, the left end of the lower shaft 448 projects into frame casting 56 (Fig. 14) and is provided with a worm wheel 454 arranged to drive a worm 455 fast on shaft 445.

It is desirable that the operation of the machine be stopped when the supply of cards in the master card magazine is exhausted. For this purpose a card presence sensing plunger 456 (see Fig. 36), arranged to pass through a hole in the bottom of master card magazine 410, is connected at 457 to the forward end of an arm 458 pivotally mounted on a stud 460 in a bracket 461 (see also Fig. 2) upon the magazine 410. Also connected at 457 is a vertical link 462 connected at its lower end to the rearward extending arm on bell crank 207 fast on rock shaft 117 of the stopping mechanism. Plunger 456 is urged upwardly by a suitable spring 463, but is held in its lower position as in Fig. 36 due to the weight of the cards and a card weight 464 in the master card magazine. However, when the last master card is fed from the magazine, plunger 456 is free to move upwardly into a cut-out in weight 464, so that arm 458 is rocked counter-clockwise by its spring 463 to raise link 462 and rock bell crank 207 and shaft 117 clockwise. This movement through rock arm 116 places the shallow step in interponent 115 between push rod 120 (see Fig. 16) and the lug on lever 114 of the stopping mechanism, so that the drive mechanism is stopped when push rod 120 is again actuated by cam 83. Under certain conditions it is desirable that the machine continue to operate, even though the supply of master cards is exhausted. In this case it is essential that card presence plunger 456 be rendered ineffective to control interponent 115. For this purpose a lever 465 extending through a slot in bracket 461 is pivotally mounted on stud 460, and is provided with a stud 466 overlying the forward end of arm 458 and a cutaway shoulder 467 adapted to engage the forward end of the slot in bracket 461. Lever 465 is urged counter-clockwise to an ineffective position by a spring 468. When lever 465 is manually depressed to engage shoulder 467 with bracket 461, stud 466 engages the forward end of arm 458 and prevents the elevation of plunger 456 after the last card is fed from the master card magazine. However, a pin and slot connection is provided between plunger 456 and link 462 to permit rocking of shaft 117 by other means if required.

Master card sensing mechanism

The master card sensing mechanism used herein is the same as that described in the above cited Patent 2,211,094. This mechanism differs in function and structure to the detail card sensing mechanism, in that the master cards are punched in ninety column code rather than eighty column code and transmits, mechanically, representations of such ninety column code patterns to the comparing mechanism. For purposes of this description, the master card sensing mechanism may be said to include a master card sensing chamber and reciprocable upper or sensing pin box.

The master card sensing chamber comprises an upper plate 470 (Figs. 18 and 22) bolted to brackets (not shown) secured to the inner walls of frame castings 56 and 57, and a lower plate 471 bolted to plate 470 and separated therefrom by space bars. Both plates are provided with a full complement of holes corresponding to perforation positions in a ninety column card.

To retain the master cards in the sensing chamber during a period in which they are sensed, a card stop mechanism is provided. This device comprises an L-shaped card stop 472 (Figs. 18 and 22) guided for vertical movement by brackets 473 and urged to open position by springs 474 (see Fig. 18). To close stop 472, during the period the master card is sensed, a pair of arms 475 (one shown) fastened to one end of the transverse rock shaft 476 extends forwardly into slots in brackets 473. Fixed to the left end of shaft 476 is an arm 477 connected by a link 478 to an arm 480 (see Fig. 19) fast on a rock shaft 481. Shaft 481 is mounted in suitable brackets and is provided at its left end with an arm 482 (Fig. 16) connected by a link 483 to an arm 484 pivoted at 234, having follower roller 486 cooperating with a card stop cam 487 keyed to front cam shaft 80. The arrangement is such that when follower roller 486 rides on the high dwell of cam 487, card stop 472 is positively moved upwardly to close the master card sensing chamber, whereas when the roller 486 rides on the low dwell of cam 487, springs 474 move card stop 472 to open position. It will be noted that card stop 472 is opened and closed during each machine cycle, even though the detail card stop 226 may be held in closed position during certain cycles.

The master card sensing pin box comprises a pair of end castings 490 (Figs. 2 and 18) interconnected by cross bars 491 and 492 (see Fig. 22) and spanned by an upper plate 493 and a lower plate 494. Each of the plates is perforated with a full complement of holes corresponding to the perforation positions in a ninety column card, and is arranged to register with the perforations in sensing chamber plates 470 and 471. End castings 490 are provided with tubular portions 495 slidably mounted on vertical posts 496 which are set in adjustable supports on the tops of frame castings 56 and 57 and are connected across their tops by a cross bar 497. Thus the master card sensing pin box is suitably guided for vertical reciprocating movement under control of a pair of eccentrics 93 keyed to rear cam shaft 90, each of which is connected to an end casting 490 by a strap 498 (see Fig. 20), a rod 500, and a pin 501 (Fig. 18).

For sensing the perforations in the master cards, a plurality of sensing pins 502 (Fig. 22) having flat mid-portions and reduced ends are slidably mounted in the perforations in plates 493 and 494, and are urged downwardly by springs 503.

Means are provided for locking all pins 502 that pass through perforations in master cards, so that these pins may positively move the associated elements. This means is the same as that shown and described in the above mentioned Patent 2,211,094. Two locking slides 504 (Fig. 22) are interposed between each pair of adjacent longitudinal columns of pins 502, and are provided with extensions arranged to slide in slots formed by cross bars 491 and 492. In each case, each right hand slide 504 is provided with six rectangular openings at its rearward end, and six rectangular openings, having locking faces 505, at its forward end, said locking faces being arranged to co-act with extrusions 506 on the foremost six pins 502 of the adjacent right hand column; whereas each left hand slide 504 is provided with six rectangular openings at its forward end, and six rectangular openings, having locking faces 505, at its rearward end, said locking faces arranged to co-act with extrusions 506 on the rearmost six pins 502 of the adjacent left hand column. All of the slides 504 are urged to their rearward or locking position by leaf springs 507 that co-act with shoulders on the rear ends thereof, but are held in their forward position when the pin box is elevated by a bail bar 508 that co-acts with the rearward ends of all slides 504. Bail bar 508 is supported at either end by bail arms 510 fixed to a bail shaft 511 which is journaled in suitable brackets secured to end castings 490, and is urged clockwise by springs 512. Mounted on each bail arm 510 is a follower roller 513 arranged to co-act with a stationary cam 514 fast on a cross bar 515 bolted to the tops of frame castings 56 and 57. The foregoing elements are so arranged that at the proper time in the downward travel of the pin box, follower roller 513 passes off the high portion of cam 514, whereupon springs 512 rock shaft 511 and bail bar 508 clockwise to permit springs 507 to shift slides 504 to their rearward or locking position. The timing is such that the pins 502 that have passed through perforations in a card are locked in their lower positions and impart positive movement to corresponding pins 516 of the reading retaining mechanism during the remaining downward movement of the pin box, whereas the pins 502 that have not passed through perforations, are held by the card in a stationary position relative to the frame of the machine.

To prevent locking of all pins 502 in the event no card is in the master card sensing chamber, a card presence sensing plunger 517 (Fig. 18) is resiliently mounted in left hand end casting 490. The lower end of plunger 517 is slightly below the ends of sensing pins 502 when the pin box is in its upper position, and is arranged to pass through a hole in the upper plate 470 of the sensing chamber to contact the extreme left edge of a card therein when the pin box is lowered. In the event there is no card in the chamber when the pin box is lowered, plunger 517 continues downwardly through a hole in the lower plate 471. Co-acting with the upper end of plunger 517 is the forward end of a lever 518 which is fast on the left end of a rock shaft 520 mounted in brackets 521 secured to end castings 490, and is urged clockwise by a spring 522. The rearward end of lever 518 is arranged to co-act with the forward face of an arm 523 fast on bail shaft 511. The arrangement of the foregoing elements is such that when there is a card in the sensing chamber and the pin box is lowered, plunger 517 is held by the card and, as the pin box continues to descend, rocks lever 518 counter-clockwise against the tension of spring 522 to move the rearward end of the lever out of the path of movement of arm 523 prior to the time that follower roller 513 rides off the high dwell of cam 514. Thus, bail shaft 511 is free to be rocked clockwise by its spring 512 to permit locking slides 504 to be moved to their locking positions by springs 507 as described above. However, in the event there is no card in the sensing chamber when the pin box is lowered, plunger 517 continues downwardly through the hole in lower plate 471 and is ineffective to rock lever 518. The rearward end of lever 518 then holds arm 523 and bail shaft 511 against the tension of springs 512 when follower roller 513 rides off the high dwell of cam 514 so that bail bar 508 is held in position to prevent movement of slides 504 to their locking position, as shown in Figs. 18 and 22. In the latter case, all pins 502 move downwardly until they contact the pins 516 in the reading retaining mechanism whereupon pins 502 are held stationary during the remaining downward movement of the pin box, due to the fact that springs 524 on pins 516 are substantially stronger than springs 503, as in the usual Powers sensing mechanism construction.

*Master card reading retaining mechanism*

Inasmuch as the sensing pins 502 that sense the perforation pattern in a master card are only held in their lowermost position momentarily, a reading retaining mechanism is provided to retain a mechanical representation of such perforation pattern during the remainder of the cycle, or for several cycles if required. The reading retaining mechanism used herewith is similar to that disclosed in the above cited Patent 2,211,094.

The master card reading retaining mechanism comprises a stationary box-like frame supported by cross bars 525 (Figs. 18 and 22) secured to suitable brackets (not shown) bolted to the inner faces of frame castings 56 and 57. Mounted on cross bars 525 and supported by suitable spacers are two additional pairs of cross bars 526 and 527. Spanning the tops of cross bars 526 and 527 is an upper plate 528, and a lower plate 530 is secured across the bottoms of cross bars 525, each of said plates being perforated with a full complement of holes corresponding to the perforation positions of a ninety column card and arranged in register with the holes in the sensing chamber plates. A plurality of rows of reading retaining pins 516, aligned with and corresponding in number and arrangement to sensing pins 502 are slidably mounted in the perforations in plates 528 and 530 and are urged upwardly against plate 528 by springs 524. As stated above, springs 524 are substantially stronger than springs 503 so that the lowering of an unlocked sensing pin 502 is ineffective to depress the corresponding reading retaining pin 516. However, since all pins 502 that pass through perforations in records are locked in their lowermost positions, unless the associated slide 504 is disabled as set forth in the above mentioned Patent 2,211,094, these pins are effective to depress the corresponding pins 516 against the tension of springs 524.

In order to retain a mechanical representation of the perforation pattern sensed by pins 502, pins 516 are provided with locking means similar to those employed in the sensing pin box. For this purpose two locking slides 531 (see Figs. 22 and 26) are interposed between each pair of adjacent longitudinal columns of pins 516 and are provided with extensions arranged to slide in the slots formed by cross bars 526 and 527. In each case each right hand slide 531 is provided with six rectangular openings at its rearward end and six rectangular openings having locking lugs 532 at its forward end, said locking lugs being arranged to co-act with extrusions 533 on the foremost six pins 516 of the adjacent right hand column; whereas each left hand slide 531 is provided with six rectangular openings at its forward end and six rectangular openings having locking lugs 532 at its rearward end, said locking lugs being arranged to co-act with extrusions 533 on the rearmost six pins 516 of the adjacent left hand column. All slides 531 are normally resiliently urged to their rearward or locking position, the right hand slides 531, by leaf springs 534 mounted on forward cross bar 527 and the left hand slides 531 by leaf springs 535 mounted on rear cross bar 525. Thus, when one or more reading retaining pins 516 are positively depressed by sensing pins 502 in accordance with the perforation pattern in a card, extrusions 533 ride down the inclined face of locking lugs 532 and cam slides 531 forwardly against the tension of their springs until the extrusions pass the lower edges of the lugs. Thereupon slides 531 are shifted rearwardly by their springs 534 or 535 and engage lugs 532 with extrusions 533 to retain pins 516 in their depressed positions whereby a mechanical representation of the perforation pattern in the card is set up in the reading retaining mechanism, and is retained therein until a new set-up is made or until released by other means.

The present machine is provided with means to release the set-up made by a preceding master card immediately prior to the time the set-up from the new card is to be made. This means is the same as that disclosed in the above mentioned Patent 2,211,094 and includes a retract bail bar 536 (Fig. 22) which is arranged to co-act with the rearward ends of all slides 531 of the reading retaining mechanism. Bail bar 536 is supported by arms 537 fast on a transverse rock shaft 538 journaled in brackets 540 bolted to rear cross bars 525 and 527. The left end of shaft 538 is provided with a V-shaped arm 541 (Fig. 18) connected by a link 542 to an arm 543 (Figs. 20 and 19) fast on a rock shaft 544 which is journaled at its right end in bracket 328 secured to bracket 296 of the detail card sensing mechanism and at its left end in a bracket 546 mounted on top of frame casting 51. Fast on the extreme left end of shaft 544 (Fig. 16) is a substantially triangular plate 547 at the apex of which is pivoted a bell crank 548 having a cutaway shoulder 550 on its pendant arm adapted to engage the forward end of an arm 551 pivotally mounted upon the rock shaft 544. Arm 551 overlies the upper end of push rod 120 connected to the forward end of arm 121 which, as heretofore explained, is pivoted at 122 and is provided with a follower roller co-acting with cam 83 upon front cam shaft 80. Thus, arm 551 is rocked counter-clockwise by cam 83 immediately before the end of each cycle. A spring 552, extended between a vertical extension on arm 551 and a stud on bell crank 548, serves to restore the arm after each actuation by cam 83, and also serves to maintain shoulder 550 in engagement with forward end of the arm so that each actuation of cam 83 is imparted to plate 547 to rock shaft 544 counter-clockwise. This movement, through arm 543, link 542, and arm 541 serves to rock shaft 538 clockwise to cause bail bar 536 to shift all slides forwardly to release any depressed pins 516. Therefore, at the end of any machine cycle, the mechanical representation of a perforation pattern made in the reading retaining mechanism at the beginning of that cycle may be released to permit the mechanical representation of a new perforation to be set up at the beginning of the succeeding cycle.

*Comparing mechanism*

For comparing the perforation patterns in master cards and the decoded perforation patterns sensed in the detail cards, the present embodiment is provided with a comparing mechanism similar to that disclosed in the above cited Patent 2,211,094. This device comprises essentially a master card comparing pin assembly for registering the mechanical representation of the perforation pattern in the master card; a detail card comparing pin assembly for registering the mechanical representation of the decoded perforation pattern in the detail card; comparing levers interconnecting the pin assemblies for causing a partial movement of one or more comparing pins in either assembly in the event of a non-comparison; comparing slides co-acting with comparing pins of both assemblies for registering a non-comparison; and comparing slide sensing means to determine the occurrence of a non-comparison.

The master card comparing pin assembly, generally designated by reference character 553 (Figs. 10, 11, 18, 22, 26, and 27), comprises a pair of H shaped end frames 554 (see Fig. 18) each of which is bolted to a longitudinal bar 555 secured to a bracket 556 mounted on the inner face of frame castings 56 and 57, respectively. Connecting the tops of end frames 554 is a pair of transverse cross bars 557 which serve to support an upper plate 558. Connecting the lower portions of end frames 54 are two pairs of cross bars 560 and 561 (see also Fig. 22), the bars 561 serving to support a lower plate 562. Each of the plates 558 and 562 is perforated with a full complement of holes corresponding to the perforation positions of a ninety column card, and is arranged in register with the holes in lower plate 530 of the reading retaining mechanism. A plurality of rows of master card comparing pins 563 co-acting with and corresponding in number and arrangement to reading retaining pins 516, are slidably mounted in the perforations in plates 558 and 562 and are urged upwardly against plate 558 by springs 564. Thus, the depression of any of the pins 516 serves to depress the corresponding comparing pin 563 a similar distance against the tension of its spring 564, so that a mechanical representation of the perforation pattern sensed in a master card is registered by depressed comparing pins 563 when the master card sensing pin box is lowered.

The detail card comparing pin assembly, generally designated by reference characters 565 (Figs. 2, 18, 22), is similar in construction to the master card comparing pin assembly, and comprises a pair of H shaped end frames 566 (see Fig. 18) bolted to longitudinal bars 555 and interconnected at their tops by cross bars 568 which serve to support an upper guide plate 570. Connecting the lower portions of frames 566 are two pairs of cross bars 571 and 572, the bars 572 serving to support a lower guide plate 573. Each of the guide plates 570 and 573 are perforated with a full complement of holes corresponding to the perforation positions of a ninety column card and are arranged in register with the holes in upper plate 396 of the detail card sensing mechanism translator above described. A plurality of rows of detail card comparing pins 574 are guided at their upper ends in respective holes in guide plate 570 and at their lower ends in respective holes in guide plate 573, and are urged downwardly against plate 573 by springs 575. Thus, elevation of any translator pin 397 serves to elevate its corresponding comparing pin 574 a similar distance against the tension of its spring 575, so that a mechanical representation of the decoded perforation pattern sensed in a detail card is registered by elevated comparing pins 574 when the detail card set-up pin box is elevated. For convenience of reference, pins 574 and pins 563 are designated hereinafter with the ordinals commonly used to designate the perforation positions in a ninety column record card, i. e., the extreme left hand pin 563 or 574 is hereinafter referred to as the "XII" pin, the adjacent pin as the "XI," the third from the left as "0," the fourth from the left as "I," etc.

Interconnecting the corresponding comparing pins 563 and 574 of the master and detail comparing pin assemblies, respectively, is a plurality of sets of bifurcated comparing levers 576 (Fig. 22), pivotally mounted on transverse rods 577 supported by suitable frame members 578. To conserve space, levers 576 are arranged in six horizontal rows and are arranged in pairs between each pair of adjacent longitudinal columns of pins 563 and 574. In each case, the left hand lever 576 of each pair in the uppermost horizontal row is provided with a forked forward end 579, encompassing a rightwardly extending lateral extrusion 580 on the "IX" pin of the adjacent left hand longitudinal column of detail card comparing pins 574, and is provided with a forked rearward end 581 encompassing a rightwardly extending lateral extrusion 582 on the "IX" pin of the adjacent left hand longitudinal column of the master card comparing pins 563; whereas, the right hand lever 576 of the adjacent left hand pair is provided with similar forked extensions encompassing leftwardly extending lateral extrusions on the "VIII" pins 574 and 563 of the same longitudinal column. Similarly the "VII" and "VI" pins 563 and 574 are interconnected by the left hand and right hand levers 576, respectively, in the next lower horizontal row, etc. Thus, with reference to the Powers ninety column system, the lower zone pins 563 and 574 of each longitudinal column are interconnected by the three upper horizontal rows of comparing levers 576, whereas the upper zone pins 563 and 574 of each longitudinal column are interconnected by the three lower horizontal rows of comparing levers 576.

In the event the perforation patterns in corresponding columns of a master and detail card are identical, it is apparent that a pin 563 will be fully depressed, under control of a master card sensing pin 502, for each corresponding pin 574 that is elevated under control of a detail card sensing pin 285. However, in the event of a disagreement between such perforation patterns, it is desirable, as hereinafter explained, that one or the other of pins 563 and 574 be only partially depressed. To effect this result the forked extensions 579 and 581 (Fig. 22) on levers 576 are arranged to provide a space between the tines of said forks and the associated extrusions that is equal to one-half the extent of movement of a pin 563 or 574 when fully actuated. Then, with the parts in the position shown in Fig. 22, let it be assumed that a master card comparing pin 563 is depressed by its reading retaining pin 516, but that the corresponding detail card comparing pin 574 is not elevated by its associated pin 397 in the translator. As pin 563 is moved downwardly one-quarter of its ultimate extent of movement, the extrusion 582 thereon contacts the lower tine of forked extension 581 on the associated comparing lever 576, and begins to rock the lever counter-clockwise. After pin 563 is moved downwardly one-half of its ultimate extent of movement, lever 576 is rocked sufficiently to engage the lower tine of its forked extension 578 with the extrusion 580 on the associated detail card comparing pin 574. During the remaining downward movement of pin 563, lever 576 continues to rock counter-clockwise and serves to elevate pin 574 against the tension of a spring 575 whereby, when pin 563 is fully depressed, pin 574 is elevated a distance equal to one-half of its ultimate extent of movement if raised under control of its detail card sensing pin 285. Thus, if a master and a detail card are sensed simultaneously, but the master card perforation pattern contains a perforation for which there is no counterpart in the detail card perforation pattern, the consequent depression of the master card comparing pin 563, corresponding to such perforation, causes a partial elevation of the corresponding detail card comparing pin 574 to its mid-position. In the same manner, the elevation of a detail card comparing pin 574, in accordance with a perforation in the perforation pattern of a detail card for which there is no counterpart in the perforation pattern of the master card, sensed at the same time, causes a depression of the corresponding master card comparing pin 563 to its mid-position.

In order that the occurrence of a non-comparison between the perforation patterns of master and detail cards may be utilized to control machine operations, means are herein provided to register the partial movements of pins 563 and 574 mechanically. For this purpose, two comparing slides 583 (Fig. 22) are interposed between each pair of adjacent longitudinal columns of master card comparing pins 563, and are provided with extensions arranged to slide in slots formed by cross bars 560 and 561. In each case, each right hand slide 583 is provided at its forward end with six rectangular openings having camming faces 584 arranged to co-act with leftwardly extending lateral extrusions 585 on the foremost six pins 563 (or lower zone pins) of the adjacent right hand column, whereas the left hand slide 583 of the adjacent right hand pair is provided at its rearward end with six rectangular openings having camming faces 584 arranged to co-act with rightwardly extending lateral extrusions 585 on the rearmost six pins 563 (or upper zone pins) of the same longitudinal column. In the same manner, two comparing slides 583 are interposed between each pair of adjacent longitudinal columns of detail card comparing pins 574, and are provided with extensions arranged to slide in the slots formed by cross bars 571 and 572. In each case, each right hand slide 583 is provided at its forward end with six rectangular openings having camming faces 586 arranged to co-act with leftwardly extending lateral extrusions 587 on the foremost six pins 574 (or lower zone pins) of the adjacent right hand column, whereas the left hand slide 583 of the adjacent right hand pair is provided at its rearward end with six rectangular openings having camming faces 586 arranged to co-act with rightwardly extending lateral extrusions 587 on the rearmost six pins 574 (or upper zone pins) of the same longitudinal column. Each slide 583 of the master card comparing pin assembly 553 is integrally joined to the corresponding slide 583 of the detail card comparing pin assembly 565 by a suitable connection at 588, whereby any forward or rearward movement of one is effective to move the other. The arrangement of the camming faces 584 and extrusions 585 is such that the depression of a pin 563 is effective to shift the associated slides 583 forwardly. Similarly, the elevation of a pin 574 is effective, through its extrusion 587 and a cam face 586, to shift the associated slide 583 forwardly. However, in the event of a full depression of a pin 563, or full elevation of a pin 574, the extrusion 585 or 587 passes beyond the effective portion of cam face 584, or 586, so that the associated slide 583 may be shifted rearwardly by other means hereinafter described; whereas, in the event of a partial depression of a pin 563, or a partial elevation of a pin 574, extrusion 585 or 587 remains abreast of the effective portion of cam face 584 or 586 and positively retains the associated slide 583 in forward position.

To determine the occurrence of a non-comparison in one or more selected columns, means are provided to sense the positions of comparing slides 583 at the proper time in each machine cycle. For this purpose, a plurality of interponents 590 (Figs. 22 and 23) are pivotally connected to manually settable keys 591 (see also Figs. 2 and 3) guided for vertical movement by transverse comb pieces 592 supported by brackets 593 (see Figs. 18 and 19) secured to transverse cross bars 571 and 572 of the detail card comparing pin assembly 565. By means of key 591 each interponent 590 may be shifted to an upper or effective position, in which a widened portion thereon is aligned with the forward end of a comparing slide 583, or to a lower or ineffective position as shown in Fig. 22, in which the widened portion is out of the path of movement of slide 583. The interponents are retained in either position by suitable detent springs 594 (Fig. 23) that act with V-shaped notches 595 in the shanks of keys 591. Cooperating with the widened portion of all effective interponents 590 is a transverse comparing slide sensing bail rod 596, which is arranged to be resiliently rocked rearwardly during each machine cycle, as is fully disclosed in the above mentioned Patent 2,211,094, during the period in which the detail card sensing pins 285 are normally effective to hold comparing pins 574 in their uppermost positions. Thus, if all pins 563 and 574 in the columns in which interponents 590 are effective are in their extreme upper or lower positions as in the case when the perforation patterns in a master and detail card are identical, bail rod 596 is free to move a complete stroke rearwardly and, incidentally, serves to restore slides 583 to their rearward positions. However, if any pin 563 or 574 is in its mid-position, as in the case when the perforation patterns in a master and detail card are not identical, an extrusion 585 or 587 coacts with a cam face 584 or 586 to prevent the actuation of the associated slide 583, and thereby prevents a complete rearward stroke of bail bar 596. As the effect of the movement or lack of movement of bail bar 596 does not form the subject matter of the present invention, and inasmuch as this effect is fully described in the above mentioned Patent 2,211,094, it will be sufficient to state herein that movement of the bail arm 596, upon comparison or non-comparison, will actuate the "control device" in a manner to vary the functions of sorting, punching, or stopping of the machine as a result of a comparison or non-comparison between patterns of perforations in unlike codes.

The operation of the elements of the comparing mechanism, as well as other mechanisms, heretofore described, may be briefly illustrated with reference to a specific example.

Figure 30:
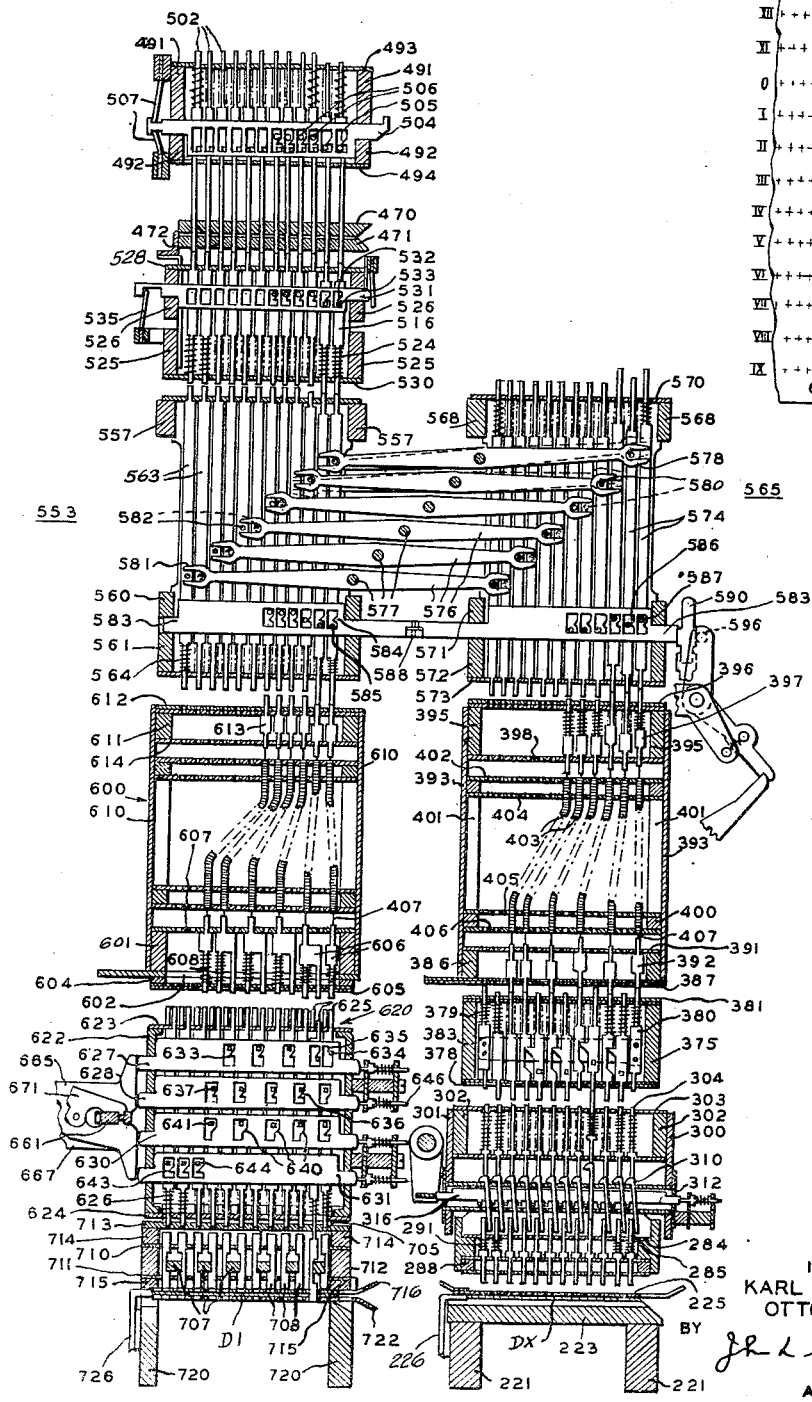
Fig. 30 is a detail of the portion of the detail card shown in the detail card sensing chamber in Fig. 27.

Let it be assumed that a master card MI (Fig. 28) having perforations in the VIII and IX index positions of the sixtieth collumn (considering only the lower zone of a Powers card), which positions according to the Powers ninety hole code indicates the numeral "8" is placed in a master card magazine 410 (Fig. 22), and that a first detail card DI (Fig. 29) having a perforation in the VIII index position of the sixtieth column of a Hollerith card, which position indicates the numeral "8" in the single hole Hollerith code, and a second detail card Dx (Fig. 30) having a perforation in the VI index position of the sixtieth column of a Hollerith card, which index position indicates the numeral "6," are placed in detail card magazine 130 (Fig. 23). Let it also be assumed that key 591 for the sixtieth column is raised to place the associated interponent 590 in effective position to condition the mechanism for comparing perforation patterns in such column. Let it be further assumed that the master card picker knife 412 (Fig. 22) and the detail card picker knife 132 (Fig. 23) are arranged to operate simultaneously during the first machine cycle, and that only the detail card picker knife 132 operates during successive cyles. Under the last made assumption it will be noted, as is fully disclosed in the above cited Patent 2,211,094, that means are provided to prevent the operation of bail bar 536 (Fig. 22) so that the set-up from the master card is retained during successive cycles.

Description of operation during first machine cycle:

When the machine is first started under the foregoing conditions, picker knife 412 feeds master card MI to feed rolls 430 whereby it is conveyed to the master card sensing chamber during the time the master card sensing pin box is elevated, and then started downwardly. After masted card MI reaches the card stop 472 it is sensed by pins 502. The VIII and IX pins 502 are locked by slide 504 after they pass through the card, and serve to depress the corresponding retaining pins 516 which are then held in their lowermost positions by locking slides 531. As pins 516 are depressed they serve to depress the corresponding comparing pins 563 which, by extrusions 582, serve to rock the associated comparing levers 576 counter-clockwise and by extrusions 580, serve to shift the associated slide 583 forwardly. When the master card sensing pin box reaches its lowermost position at the end of the cycle the several above mentioned elements, with the exception of the slide 583 associated with the VIII and IX pins, are in the positions shown in Fig. 26.

Simultaneously with the above described operations, picker knife 132 (Fig. 23) feeds detail card DI to feed rolls 160 whereby it is conveyed to the detail card sensing chamber during the time the detail card sensing pin box is lowered to sensing position. After detail card DI reaches the card stop 226, and is fully aligned as above described, it is sensed by the pins 285. The full downward movement of the pin sensing the perforation in the VIII index position of the detail card causes the straightening of its associated pendant pin 310, whereby a complete transmitting linkage is established by the pins 285, 310 and 304. Upon the upward movement of the sensing pin box, the sensing pin 285 which has sensed the hole, will, through its associated pins 310 and 304, move its associated VIII decoding pin 380 which, as above described, will cause upward movement of the lower translator pins 392 associated with the VII and IX decoding pins 380. The lower translator pins 392 thus raised will, through their respective wires 407, move the upper translator pins 397 corresponding to the VIII and IX index positions of the Powers card. As the pins 397 are elevated they serve to lift the corresponding detail card comparing pins 574 which, by extrusions 580, serve to rock the associated comparing levers 576 counterclockwise, and by extrusions 587 serve to shift the associated slide 583 forwardly. When the detail card sensing pin box reaches its uppermost position at the end of the cycle, the several above mentioned elements, with the exception of the slide 583 associated with the VIII and IX pins, are in the positions shown in Fig. 26.

Immediately before the end of the cycle, bail rod 596 starts to move rearwardly and, since all comparing pins 563 and 574 are in their uppermost or lowermost positions due to the fact that cards MI and DI contain identical perforation patterns in the sixtieth column, completes its full rearward movement at the end of the cycle, and incidentally restores slide 583 to its rearward position.

It will be noted that should master card MI also contain perforations in the II and III index positions in the same column (as shown by dotted lines in Fig. 28) with the above mentioned VIII and IX perforations, these perforations also cause the depression of the II and III comparing pins 563, and the consequent partial elevation of the II and III comparing pins 574 to hold the associated slides 583 in their forward position. However, inasmuch as the II and III perforation positions represent a portion of a separate and distinct column of pins in the Powers ninety column system (the fifteenth column, upper zone) for which a separate slide 583 is provided as described above, the partial elevation of the II and III pins 574 is ineffective to prevent the complete rearward movement of bail rod 596, since the corresponding interponent 590 is not set in its effective position.

Description of operations during second machine cycle:

During the second cycle, master card MI is fed out of the master card sensing chamber and is passed to the feed rolls 447 (Fig. 22). However, inasmuch as bail 536 is not operated to retract slides 531, a mechanical representation of the perforation pattern in master card MI is retained by the locked reading retaining pins 516, which, in turn, hold the corresponding VIII and IX comparing pins 563 in fully depressed position.

As the detail card sensing pin box moves downwardly during the early part of the second cycle, the VIII and IX comparing pins 574 (Fig. 22) are released and are moved downwardly by their springs 575. However, after they have descended halfway, their extrusions 580 engage the lower tines of forked extensions 578 of comparing levers 576 and since levers 576 are positively held by comparing pins 563, reading retaining pins 516, and locking slides 531, the VIII and XI comparing pins 574 are suspended in their mid-positions in which their extrusions 587 are aligned with cam faces 586 to hold the associated slide 583 in its forward position.

Figure 27:
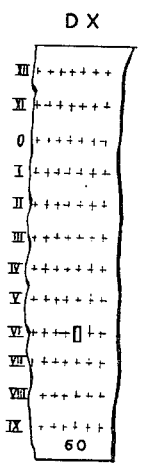
Fig. 27 is a detail of the several mechanisms shown in Fig. 26 illustrating the several elements in operated position after non-comparing detail and master cards have been sensed.

Shortly after the sensing pins 285 have moved to their intermediate position, and before reaching the sensing stage as above described, the detail card D1 is fed out of the sensing chamber and is passed by punch feed rolls 176 to the punch mechanism. Simultaneously, the second detail card DX is fed into the sensing chamber, as above. In this case, as the sensing pin box is lowered to sensing position, the VI sensing pin 285 passes through the new card, causing its associated pendant pin 310 to straighten, whereby a continuous transmitting linkage is established by associated pins 285, 310, and 304 which, when the sensing pin box is again moved upwardly, serves to elevate the VI and IX comparing pins 574 through decoding pins 380 and translator pins 392 and 397 to their uppermost positions. Inasmuch as the IX comparing pin 574 was previously held in mid-position by associated comparing lever 576 and the IX comparing pin 563, the additional movement thereof merely serves to elevate its extrusion 587 beyond the effective portion of the associated cam face 586. However, the elevation of the VI comparing pin 574, through its extrusion 580, rocks the associated lever 576 counter-clockwise to lower the VI comparing pin 563 to its mid-position, whereby its extrusion 585 is placed in alignment with a cam face 584 on the slide 583. Thus, due to the non-comparison between the perforation patterns in detail card DX and master card M1, the comparing slide 583 associated with comparing pins 563 and 574 of the sixtieth column, is positively held in its forward position at the end of the second cycle, by extrusion 587 on the VIII comparing pin 574 and by extrusion 585 on the VI comparing pin 563, to prevent a complete rearward movement of the comparing slide sensing bail rod 596 as illustrated in Fig. 27.

To summarize briefly, it will be noted that when the mechanism, thus far described, is utilized for any operation involving the comparison of designated data contained in master cards according to the ninety column code with designative data contained in corresponding columns of detail cards punched in accordance with the eighty column code, the master cards are placed in magazine 410 (Fig. 1), the detail cards are placed in magazine 130, and keys 591 associated with the comparing slides 583 in the columns containing the designative data are set in their upper positions. Then, during each machine cycle, regardless of the type of operation involved, the perforation pattern of the designative data in a detail card is sensed, decoded, and compared with perforation pattern of the designative data in a master card. In the event such perforation patterns are identical, the slides 583 are free to move rearwardly to permit a complete rearward movement of bail rod 596 whereas, if either pattern contains a perforation for which there is no counterpart in the other, one or more slides 583 are blocked and prevent the rearward movement of bail rod 596 to control the various machine operations, as fully described in the above mentioned Patent 2,211,094.

Punch mechanism

Under certain conditions, it is desirable that part or all of the perforation patterns in a master card be transferred to one or more detail cards. Therefore, means are provided to pass each detail card through a punch mechanism, settable under control of the master cards, wherein such transferring operation may be effective in the machine cycle following that in which the detail card is sensed.

Essentially, the punch mechanism includes a punch translator for transmitting mechanical representations of master card perforation patterns, a reciprocable decoding pin box including set pins for sensing and retaining the decoded mechanical representations of perforation patterns so transmitted, punch gags controlled by the set pins for perforating detail cards in accordance therewith, and a punch chamber in which detail cards are retained during punching operations.

In order to transmit mechanical representations of the perforation patterns in the ninety column master cards to the decoding set pin box and thence to the detail card, a removable punch translator, generally designated by reference numeral 600 (Figs. 11, 20, and 24), is provided which translator, when inserted in the machine, lies beneath and in vertical alignment with the master card comparing pin assembly 553. The translator 600 is guided for lateral movement upon guide rails 368 and comprises a rectangular frame 601 (Fig. 24), to the underside of which is secured a translator supporting guide plate 602 which extends beyond the longitudinal sides of the frame 601 to fit into slots provided in the guide rails 368. The guide plate 602 extends beyond the rear portion of the rectangular frame 601 to form a platform for supporting a latch device 603, which cooperates with pins on guide rails 368 in a manner to lock the translating unit in effective position. Secured to the underside of the plate 602, and spaced therefrom by suitable spacers 604, is a plurality of guide plates 605 having a full complement of holes punched therein corresponding in number and arrangement to the perforation positions in the eighty column Hollerith card, and serve to guide the lower ends of the pins 606. Pins 606 are guided at their upper ends in a guide plate 607 secured to the upper side of the rectangular frame 601. Individual springs 608 serve to urge associated pins 606 upwardly. Secured to each of the outer sides of the rectangular frame 601 is an upright frame 610, to the upper portion of which is secured another rectangular frame 611. Secured to the upper portion of the rectangular frame 611 is a plurality of guide plates 612, having a full complement of holes punched therein corresponding to the ninety column Powers card, which holes serve to guide the upper ends of pins 613. Pins 613 are guided at their lower ends in holes punched in a guide plate 614 secured to the underside of the rectangular frame 611. Secured to the frame plates 610, and located between the rectangular frames 601 and 611 is a box like frame structure, similar in all respects to the box like structure used in the sensing translator unit, for mounting similar Bowden wires connecting the pins 606 to associated pins 613.

The upper pins 613 are arranged in a manner to transfer the information sensed in the master card, and which is transmitted by the comparing unit 553 to the decoding unit, as will hereinafter be described. There is a full complement of pins 613 corresponding to the perforating positions in lower zone of a Powers ninety column card which, as is well known, are located in the IX, VIII, VII, VI, V, and IV index positions in each column of the zone. The IX pin 613 is connected by wire 407 to its associated IX pin 606 having a single stem corresponding to the IX index position in a Hollerith card. The VIII pin 613 is connected to its associated pin 606 having two stems corresponding to the VIII and VII index positions in a Hollerith card. The VII pin 613 is connected to its associated pin 606 having two stems corresponding to the VI and V index positions of the Hollerith card. The VI pin 613 is connected to its associated pin 606 having two stems corresponding to the IV and III index positions of a Hollerith card. The V pin 613 is connected to its associated pin 606 having stems corresponding to the II and I positions of a Hollerith card. The IV pin 613 is connected to its associated pin 606 having a single stem corresponding to the "0" index position in a Hollerith card. It is to be noted at this time that the pins 613 are so positioned that only perforation patterns in the lower zone of the Powers ninety column master card will be transmitted to the pins 606. However if it is desired that the upper zone pattern perforations sensed in the master card be transmitted to the pins 606, it is only necessary to place the pins 613 in vertical alignment with the comparing pins 563 associated with the upper zone of the card, i. e., the XII, XI, zero, I, II, and III index positions.

*Decoding unit*

For sensing the perforation patterns represented by depressed pins 606, and decoding and transferring such patterns to a detail card, the punch mechanism includes a reciprocable decoding set pin box generally designated by reference character 620 (Figs. 20, 24 and 31). This device comprises a pair of end castings 621 interconnected by side plates 622, to which are secured a plurality of upper plates 623 and a plurality of lower plates 624. Each of the plates 623 and 624 is perforated with a full complement of holes corresponding to the perforation positions of an eighty column Hollerith card and both are arranged in alignment with the perforation positions in the lower plates 605 of the translator 600. A plurality of rows of set pins 625 (see Figs. 24, 26, 27, and 31) corresponding in number and arrangement to the index positions of an eighty column Hollerith card, and arranged to be depressed by the stems on pins 606, as hereinafter described, are slidably mounted in the perforations in plates 623 and 624, and are urged upwardly against the plates 623 by springs 626. There are two extra pins 625 corresponding to the XI and XII index positions for which there are no associated pins 606, as will become apparent hereinafter. Four locking slides 627, 628, 630, and 631 are interposed between each pair of adjacent longitudinal columns of pins 625, and are provided with extensions arranged to slide in slots in side plates 622 and are suitably spaced by means of comb plates 632 secured to the side plates 622. In each case the slide 627 is provided with four rectangular openings having lugs 633 arranged to engage leftwardly extending lateral extrusions 634 on the VIII, VI, IV and II set pins 625. Each locking slide 627 is further provided with a rectangular opening having a shoulder 635 arranged to engage an extrusion 634 on the IX set pin 625. Each slide 628 is provided with four rectangular openings having locking lugs 636 arranged to engage leftwardly extending lateral extrusions 637 on the VII, V, III and I set pins 625. Each locking slide 628 is further provided with a rectangular opening having a cam surface 638 arranged to engage extrusion 637 on the IX set pin 625. Each locking slide 630 is provided with four rectangular openings having cam surfaces 640 adapted to be engaged by extrusions 641 on the VII, V, III and I set pins 625. Each locking slide 630 is further provided with a rectangular opening having locking lug 642 adapted to be engaged by extrusion 641 on the IX pin. Each locking slide 631 is provided with 3 rectangular openings having locking lugs 643 adapted to engage extrusions 644 on the "0," XI, and XII set pins 625. The slides 627, 628, 630, and 631 are urged rearwardly by respective individual springs 645 and plungers 646.

Referring to Figs. 12, 20, and 24 the decoding unit, generally designated by numeral 620, reciprocates in an up and down movement once for each cycle of the machine through the action of two sets of complementary cams 94 keyed to the rear cross shaft 90 of the machine. Each cam 94 is provided with two follower rollers 647 mounted on an arm 648 pivoted at 650 (see Figs. 20 and 24) to frame castings 51 and 52. Each arm 648 is connected to its associated end casting 621 by a vertical rod 651 (see also Fig. 31) guided for vertical movement in holes in a stationary bracket 652.

The construction and arrangement is such that, during the first half of each machine cycle, the set pin box 620 is positively moved upwardly to force the upper ends of set pins 625 against the lower ends of all depressed translator pins 606, and is positively moved downwardly during the last half of the cycle (see Fig. 39). The extent of movement is sufficient to permit the locking of any depressed pin 625 by its associated slides 627, 628, 630 or 631. Thus, during the mid-portion of the machine cycle, following that in which a master card is sensed, the mechanical representation of the master card perforation pattern registered by depressed translator pins 606 is transferred to the set pins 625. However, upon receiving the perforation pattern from the pin 606, the set pin box, through slides 627, 628, 630, and 631, is arranged to decode the information received in ninety column Powers code to that of the eighty column Hollerith code in the following manner.

Referring particularly to Fig. 24, when the IX pin 613 is lowered, in the manner described, its associated pin 606 having a single stem will lower the IX set pin 625 at the proper time in the cycle, to its effective position wherein it is held by the lug 642 engaging the extrusion 641 on the slide 630. When the VIII pin 613 is lowered, its associated pin 606 having two stems will lower its associated VIII and VII set pins 625. The extrusion 637 on the VII pin will engage its associated lug 636 on slide 628 and thereby be locked in its downward position. However, a shoulder 635 on slide 627 prevents a full rearward movement of the slide 627 so that the extrusion 634 on the VIII pin will not be permitted to engage its associated lug 633 when said pin is lowered, and therefore only the VII set pin 625 is set. Similarly when the VII, VI, and V pins 613 are lowered their associated pins 606, each having two stems, will lower their associated VI and V, IV and III and II and I set pins 625, respectively. The V, III and I set pins 625 will be locked in a lower position by their associated lugs 636 on slides 628 which engage their associated extrusions 637 while the set pins VI, IV, and II will be restored to normal position due to the fact that slide 627 is prevented from moving to locking position by means of the shoulder 635, thereon, engaging the extrusion 634 on the IX pin. When the IV pin 613 is lowered its corresponding pin 606 having a single stem will lower its associated "0" set pins 625 which set pin will be locked in its lower position by its associated lug 643 on slide 631 engaging extrusion 644 on the pin.

As is well known in the Powers ninety column code, even numbers are indicated by double perforations in a column. Thus an "8" is indicated by perforations in the VIII and IX index positions, a "6" is indicated by VII and IX, a "4" is indicated by VI and IX and a "2" is indicated by V and IX. Accordingly, when the VIII and IX pins 613 are lowered to indicate an "8," their associated pins 606 are lowered to lower the VII, VIII, and IX set pins 625. Immediately the extrusion 634 on the IX pin 625 moves out of the path of shoulder 635 permitting the slide 627 to move rearwardly through the action of its spring 645. This places the lug 633, associated with VIII set pin, in the path of its associated extrusion 634 to lock said VIII pin in its lowered position. However, when the IX pin 625 is lowered, its extrusion 637 engages its associated cam surface 638 on the slide 628 and cams said slide forwardly to move its lug 636 out of the path of its associated extrusion 637 on the VII pin, thereby preventing the latching of the VII pin. At the same time, the extrusion 641 on the VII pin engages its associated cam surface 640 on the slide 630 and moves said slide forwardly to move its lug 642 out of the path of its associated extrusion 641 on the IX pin 625 thereby preventing the latching of said pin. In this manner, only the VIII set pin 625 is latched in its effective position when a perforation is sensed in the IX and VIII index positions of a Powers card. Similarly, when the VII, VI, or V pins 613 are lowered together with the IX pin 613, the VI, IV, and II set pins will be latched by their associated slides 627, and the IX, V, III and I set pins 625 will not be latched in a lower position due to the camming of their associated slides to ineffective forward position. It will be noted at this point and as will hereinafter appear that the extrusion 634 on the IX set pin 625 will assume the normal position shown (Fig. 24) before the set pin box 620 is elevated, whereby it retains the slide 627 in a forward position.

Figure 32:
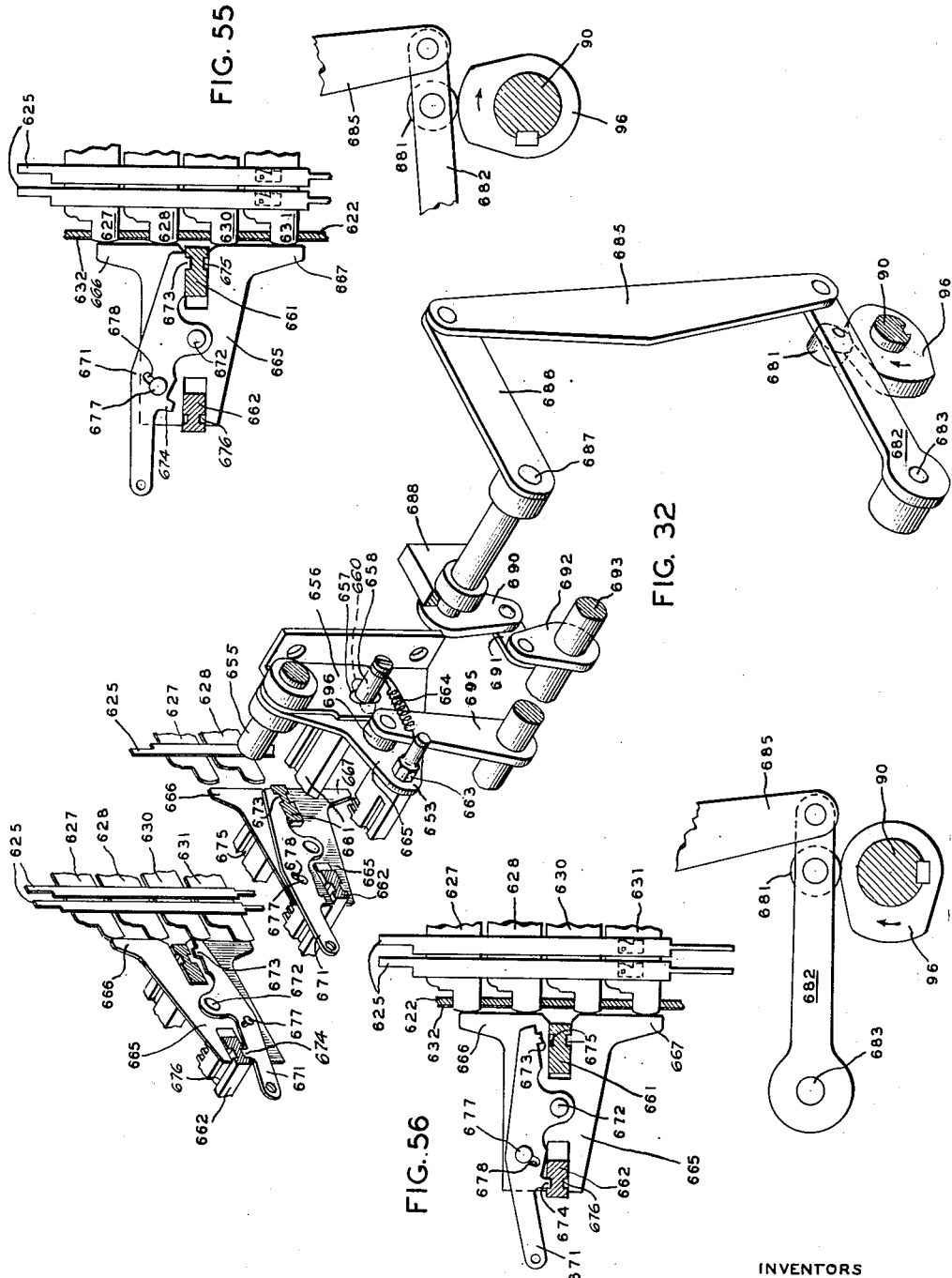
Fig. 32 is an isometric detail view of the punch retract mechanism with the retract cam in normal position.

As in the master card reading retaining mechanism, the decoding set pin box 620 is provided with means to release the set-up made by a preceding master card immediately prior to the time a new set-up is to be made. For this purpose, a pair of rearwardly extending brackets 653 (Figs. 20, 24, and 31) are provided, which brackets are secured to the rear side plate 622 and are suitably prevented from lateral displacement by a pair of tie rods 654 secured thereto. Journaled in the upper portion of the brackets 653, is a cross shaft 655, each end of which extends beyond its associated bracket 653 and has secured thereto, a downwardly extending arm 656 (see Fig. 32) having a substantially vertical slot 657 formed therein through which passes a stud 658. Each stud 658 extends beyond its associated slot 657 laterally and inwardly through a substantially horizontal slot 660 formed in the bracket 653 and is secured to one end of a cross bail 661. The cross bail 661 is adapted, by means to be hereinafter described, to be moved forwardly and rearwardly once for each cycle of the machine. A cross bar 662 located to the rear and, substantially in horizontal alignment with the cross bail 661 is secured to the brackets 653 by screws 663 (see Figs. 11 and 12). The assembly consisting of shaft 655, arms 656, and cross bail 661, is urged in a clockwise direction (see Figs. 20 and 24) by means of individual springs 664 having one end connected to studs 658 on cross bail 661 and the other end connected to screws 663. Mounted for substantial horizontal sliding movement on the cross bail 661 and cross bar 662 is a plurality of retract slides 665, eighty in number, and each having an upper arm 666 for cooperating with its associated slides 627 and 628, and a lower arm 667 for cooperating with its associated slides 630 and 631. The slides 665 are suitably spaced by means of a pair of comb plates 668 secured to cross bars 654, which bars are mounted upon the brackets 653. Forward and rearward movement is imparted from the cross bail 661 to the retract slides 665 to bring their arms 666 and 667 into and out of engagement with their associated slides 627 and 628, and 630 and 631, respectively, by means of individual latches 671. Each latch 671 is pivoted at 672 to its respective slide 665, and is provided with a tooth 673 at the forward end thereof and a second tooth 674 toward its rearward end thereof. The forward tooth 673 is adapted to engage its associated notch 675 on the cross bail 661, and the rear tooth 674 is adapted to engage its associated notch 676 in the cross bar 662. It will be noted that for the purposes of conserving space the latches are arranged in staggered relation forming two rows of forty alternately inverted adjusting fingers, as is best seen in Figs. 12 and 32. Individual pins 677 secured to retract slides 665 pass through substantially concentric slots 678 formed in latches 671 and serve to limit the clockwise and counter-clockwise movement of the latches 671. Each latch 671 may be moved to either of three positions, i. e., with the tooth 673 in engagement with the notch 675 on the cross bail 661 (Fig. 55), with the tooth 674 in engagement with the notch 676 on the bar 662 (Fig. 56), and in a neutral position with both teeth 673 and 674 out of engagement with their respective notches 675 and 676 (Fig. 24). Individual ball detents 680 are provided to resiliently retain latches 671 in either of the above three positions.

The construction and arrangement of the above mechanism is such that, when it is desired to release the setup made by a preceding master card immediately prior to the time a new setup is to be made, the retract slides 665 corresponding to the columns of pins 625 to be released are preset, with the forward tooth 673 of the associated latches 671 in engagement with the notch 675 on the bail bar 661 (see also Fig. 55). In this position when the bail bar 661 is moved forwardly, as will hereinafter appear, all those retract slides 665 which had been pre-set will move forwardly to engage their associated slides 627, 628, 630 and 631 forwardly against the tension of their respective springs 645 to release all the previously set pins 625. When it is desired to retain a previous set-up made by a preceding master card, the latches associated with the set pins 625 not to be released will be pre-set in a position wherein neither teeth 673 nor 674 are in engagement with their respective notches 675 or 676. It is sometimes desired that no set-up be made by the set pins 625. In this case the tooth 674 on latch 671 corresponding to the column of set pins 625, not to be set, will be brought into engagement with its associated notch 676 (see also Fig. 56). As will be seen in Fig. 24 the tooth 674 is not in engaging alignment with its associated notch 676 and it is, therefore, necessary that the latch 671 and its associated retract slide 665 be moved forwardly a suitable distance to bring the tooth 674 into engagement with the notch 676. This forward movement of the retract slide 665 will cause its upper and lower arms to engage and move their associated slides 627 and 628, and 630 and 631 forwardly to move all the locking lugs on said slides out of the path of their associated extrusions on the set pins 625. It will be seen that as long as the rear teeth 674 are in engagement with the notches 676 their respective set pins are prevented from being set as above described.

Referring to Figs. 15, 16, 31 and 32, the means for reciprocating bail 661 forwardly and rearwardly each cycle of the machine is as follows: As was previously described, the left hand end of the rear cam shaft 90 has keyed thereto a retract cam 96, upon the periphery of which rides a follower roller 681 mounted on a follower arm 682, which arm is pivoted at 683 to the left hand frame casting 51. A spring 684 serves to urge the follower roller 681 against the periphery of the cam 96. The follower arm 682 is connected by an upwardly extending link 685 to a rearwardly extending arm 686, secured to a shaft 687 journaled at its ends in a bracket 688 secured to the left hand frame casting 51. Secured to the right hand end of shaft 687 is a depending arm 690 (see also Fig. 20) connected by a link 691 to an arm 692, which arm is secured to a shaft 693. The shaft 693 is journaled at its left hand end in the bracket 688 and at its right hand end in a bracket 694 secured to the right hand frame casting 52. Secured to the shaft 693 is a pair of upright arms 695, each having a roller 696 to cooperate with a substantially vertical rear face of its associated arm 656.

The above construction is such that with the cam 96 at its normal position, i. e., with the keyway at its bottom dead center, the roller 681 rides on the low dwell of the cam whereby the rollers 696 on arms 695 are in their rearmost ineffective position. Upon clockwise rotation of the cam 96 from its normal position the roller 691 begins to rise causing the shaft 693, through the linkage described, to rock clockwise and move the follower rollers 696 into operative engagement with their respective arms 656. This causes the movement of the arms 656 in a counter-clockwise direction, thereby moving the cross bail 661, and all the retract slides 665 connected thereto, forwardly by means of their associated latches 671. This will cause as has been described, forward movement of the associated locking slides 627, 628, 630, and 631 to release the set-up made by a preceding master card. Shortly before the set pin box 620 has reached its uppermost position, i. e., at about 60° rotation of shaft 90 (see Fig. 39), the roller 681 begins to ride upon the high dwell of cam 96, in which position the locking slides are held ineffective. At about 120° rotation of cam 96 the roller 681 begins to ride off the high dwell to restore all the locking slides to effective position.

In the present machine a control mechanism, similar in all respects to the mechanism shown and described in the above mentioned Patent 2,214,010, for the punch retract mechanism above described is provided, whereby the punching of additional information may be prevented in either the non-comparing or in the comparing detail cards as desired. As this control mechanism does not form the subject matter of the present invention, a brief description thereof will suffice to show the connection between the present invention and the above retract control mechanism. Referring particularly to Figs. 15, 16, 31, and 32, the shaft 687, rocked under the control of the retract cam 96, arms 697 and 698 mounted on arm 686, and stationary stud 700 are similar in operation and arrangement, and are operated in the same manner as the respective shaft 548, arms 810 and 812 and stationary stud 816, shown and described in the above mentioned Patent 2,214,010. The arms 697 and 698 are moved into and out of engagement with the stud 700 by means of links 702 and 703. The link 702 is the same as link 820 in the above Patent 2,214,010, and is under the control of the control mechanism as is fully described therein. The link 703 is the same as the link 801 in the above mentioned Patent 2,214,010, and is connected to an adjustable lever 704 which is the same as the lever 800 in the above patent. The adjustable lever is settable in any one of three positions so as to move arms 697 and 698 in cooperation with the control mechanism, as described in the above mentioned Patent 2,214,010, in the following manner: When the adjustable lever 704 is moved to the No. 1 position (see Fig. 15), the arm 698, through the link 703, is retained out of latching engagement with stud 700, and if the control mechanism is set for a comparison detail cards will be punched in a normal manner. However, if the control mechanism is set for non-comparison the arm 697 through link 702 is permitted to move into engagement with the stud 700, at the proper time in the cycle, to prevent punching. When the adjustable lever 704 is set in No. 2 position, the arms 697 and 698 will remain out of engagement with stud 700, regardless of whether the control mechanism is set for comparison or non-comparison. In this position punching is effected in a normal manner. If the adjustable lever 704 is set in No. 3 position, the arm 698 through link 703 is permitted to move into engagement with the stud 700. With the parts in this position and the control mechanism set for comparison, punching is prevented. However, if the control mechanism is set for non-comparison, the arm 698 is moved out of engagement with the stud 700 through link 702 and punching is effected in a normal manner.

Referring to Figs. 20, 26, 27, and 31, each of the end casings 621 have suspended from the lower portion therefrom a bracket 705 having a horizontal row of substantially rectangular openings 706 (see also Fig. 57), six in number, for receiving and supporting the ends of individual cross bars 707. Each of the cross bars 707 support, for vertical movement, two rows of punches 708, the total number of which correspond to the total number of set pins 625 and are arranged in vertical alignment therewith to be actuated thereby at the proper time in the cycle. Punches 708 are guided at their upper ends in a guide plate 710 and at their lower ends in a guide plate 711, which plates 710 and 711 are secured to the upper and lower portions of a stationary rectangular frame 712, respectively. The rectangular frame 712 has further secured to the upper portion thereof a guide plate 713 having a full complement of holes according to the index positions of an eighty column card, which holes are in vertical alignment with the set pins 625 and punches 708. The guide plates 713 and 710 are suitably spaced from each other by space bars 714. Also secured to the lower portion of the rectangular frame 712, and suitably spaced from the guide plate 711 by spacer bars 715, is a stripper plate 716 having a full complement of holes corresponding in number and arrangement to the punches 708. The stripper 716 forms the upper portion of the punch chamber.

The above construction is such that when the set pins 625 which had previously been set in accordance with the perforation pattern in the master card, move downwardly at the proper time in the cycle, as above described, they will engage and positively lower their corresponding punches 708 to effect a perforation of the detail card (see Fig. 27). Those punches 708 which are not engaged by the set pins 625 will fall of their own weight until engaged by the upper surfaces of the card. When the set pins 625 are again raised during the following punching operation, the cross bars 707 rising therewith, will restore all of their associated punches 708 to their extreme upper ineffective position.

Referring to Fig. 57 guide plates 710 and 711 are rigidly connected together by means of a plurality of longitudinally extending reinforcement plates 717, for preventing any distortion of the plates from the punching and stripping action. For a similar purpose the stripper plate 716 has riveted thereto a plurality of studs 718 which bear against the lower surface of the guide plate 715.

The rectangular frame 712 is secured at its ends to the guide brackets 652 (see Fig. 31), which guide brackets are interconnected by a pair of cross bars 720 (Figs. 20 and 31) securely mounted at their ends on brackets 721, which brackets 721 form an integral part with the frame castings 51 and 52. Secured to the upper portion of the cross brackets 720 is a die plate 722 having a full complement of holes punched therein corresponding in number and arrangement to the punches 708 through which the lower ends of said punches may pass. Die plate 722 (Fig. 33) is prevented from possible distortion during punching operation by means of a plurality of longitudinally extending reinforcement plates 723 riveted thereto. The reinforcing plates 723 are each provided with a plurality of vertical slots, through which pass transversely extending cross bars 724, the ends of which are received in slots in individual brackets 725 secured to the inner faces of the cross bars 720. It will be noted that a suitable space is provided between the stripper plate 716 and the die plate 722 to permit passage of a card therebetween.

To retain the detail cards in the punch chamber during the period in which they are punched, a card stop mechanism is provided. This device comprises a pair of inverted L-shaped card stops 726 (Figs. 12, 20, 24, 31, 33 and 58) guided for vertical movement by means of slots 727 (see Fig. 31) formed therein encompassing studs 728 secured to the rear cross bar 720. Individual springs 730, one end of which is connected to a stud 728 on the bar 720, and the other end connected to a stud 731 on the card stop 726, serve to urge the card stops in a normal closed position. The lower end of each card stop is provided with a forwardly extending right angle lug to which is connected one end of the depending link 732, the other end of which link is connected by pin and slot connection 733 to an arm 734 secured to a cross shaft 735. The cross shaft 735 is journaled at its right hand end in the frame casting 52 and at its left hand end in the frame casting 51. Card stops 726 may be closed or opened by means of a forwardly extending arm 736 secured to the shaft 735 (Fig. 33) and has mounted at its forward end thereon a follower roller 737 which rides upon the periphery of the cam 97 (see also Fig. 16). The above construction is such that with the cam 97 at its normal zero position, as shown in Figs. 16 and 59, i. e., with the keyway at its bottom dead center, the follower roller 737 rides upon the low dwell of the cam 97. In this position the card stop is in its uppermost position to stop the card in the punch chamber. At about 127° (Fig. 39) rotation of the cam 97 the roller 737 begins to rise from the intermediate dwell of the cam 97, and through arm 734 and link 732 begins to lower the card stop 734. At about 146° rotation of cam 97 the roller 737 begins to ride upon the highest dwell of the cam to retain the card stops in the fully open position (see Fig. 60). At about 209° rotation of the cam 97 the follower roller begins to ride off the highest dwell of the cam 97 and the card stops 726 begin to close. At about 228° rotation of the cam 97 the follower roller 737 has reached the intermediate dwell of the cam 97 and the card stop is now in its fully closed position. It will be noted that when the roller 737 rides from the low dwell to the intermediate dwell of the cam 97, the pin of the pin and slot connection 733 rides the full length of its associated slot without effecting any downward movement of the link 732, and, therefore, the card stop remains in closed position.

Figure 62:
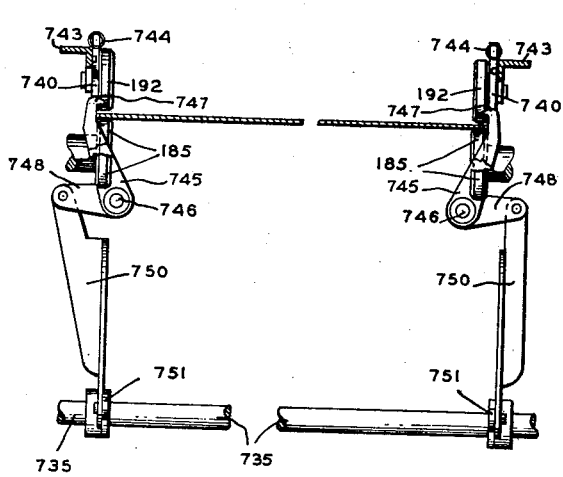
Fig. 62 is a side view of Fig. 61 showing pressure rolls out of engagement with the card and the card being aligned by the aligning fingers.
Figure 64:
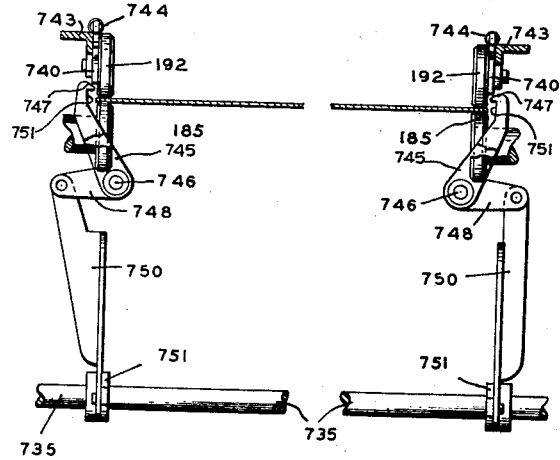
Fig. 64 is a side view of Fig. 63 with the pressure rolls on the card and the aligning fingers out of aligning position.

In the present machine, means are provided to properly align the detail card in the punching chamber prior to the punching operation of the machine. In this connection means are provided herein to disengage the pressure rolls 192 from contact with the detail card at a time after the card has been stopped in the punching chamber by card stops 726. Referring to Figs. 24, 31, 33, and 58 the pressure rolls 192 are mounted for rotation upon inwardly extending arms 740 of bell cranks 741, pivoted at 742 to brackets 743, which brackets are secured to the rectangular frame 712. Individual springs 744 serve to urge each pair of pressure rolls 192 into cooperative engagement with the detail card and the skid rolls 185. The arms 740 of bell crank 741 are each provided with downwardly extending portions which lie above and are engageable by individual cam arms 745 secured to a cross shaft 746 journaled at its ends in cross bars 720. Each of the arms 745 are provided at their upper extremities thereof with a cam surface 747 (Figs. 31, 62, and 64) adapted to engage the underside of its respective arm 740 and cam the arm and pressure rolls out of contact with the detail card. Normally, with the machine at the zero position, i. e., with the keyway of cam 97 at its bottom dead center, the cam surfaces 747 on the arms 745 are fully in engagement with the lower portion of arms 740 and the pressure rolls 192 are out of engagement with the detail card.

Means for rocking the arms 745 out of engagement with the arms 740, thereby permitting the pressure rolls 192 to engage the detail card, is as follows: Each of the shafts 746 extend beyond the rear cross bar 720 and has securely mounted thereto an arm 748 (Figs. 31, 33, 61 and 62) connected by a depending link 750 to an arm 751 secured to the shaft 735.

Figure 63:
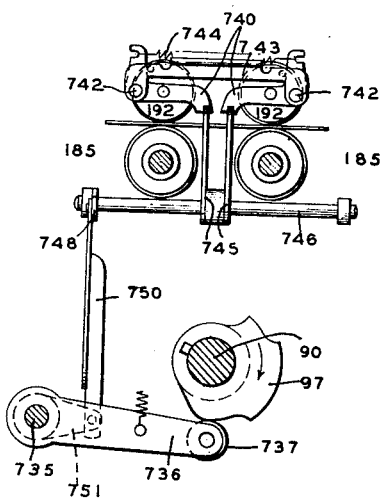
Fig. 63 is a detail left side view similar to Fig. 61 but in operated position with the pressure rolls in engagement with the card.

As was previously described, shaft 735 is rocked by means of follower roller 737 riding upon the periphery of cam 97. The above construction is such that, with the cam 97 at its normal zero position (Fig. 61), the roller 737 rides upon the low dwell of the cam and the pressure rolls are out of engagement with the detail card (see also Fig. 39). At about 102° rotation of the cam 97 the roller 737 begins to ride upon the intermediate dwell of the cam, by which time the shaft 735 has rocked in a clockwise direction and, through arms 751, links 750 and arms 748, causes the shaft 746 to rock the arms 745 out of engagement with their respective arms 740 (see Figs. 63 and 64). This will free the pressure rolls 192 permitting them to drop into engagement with the detail card under tension of their respective springs 744. At about 270° rotation of the cam 97 the roller 737 has ridden off the intermediate dwell of the cam and begins to ride upon the low dwell thereof. During this time the shaft 735 rocks in a counter-clockwise direction to bring the cam surfaces 747 on arms 745 into engagement with the lower portions of arms 740, thereby raising the pressure rolls 192, against the tension of their respective springs 744, out of engagement with the detail card.

Each of the arms 745 is further provided with an aligning surface 751 (see Figs. 62 and 64), to engage the associated edges of the detail card at the same time that the cam surfaces 747 thereof are raising pressure rolls 192 out of engagement with the card. This will cause a proper alignment of the card so as to bring the columnar positions of the card in accurate register with the columnar positions of the punches 708. An adjustment plate 749 (see Figs. 31 and 33) adjustably secured to cross bar 720 is provided for each arm 748 to limit the movement of its associated cam arms 745.

Means are provided herein to insure that the detail card is fed fully against the card stops 726 and kept there during the time that the pressure rolls 192 are out of engagement with the card. Referring particularly to Figs. 20, 31, 33, 59, and 60, the shaft 735 has secured thereto a pair of upright arms 752, the upper end of each of which is provided with a pin 753 which rides in a slot 754 formed in the rear end of a forwardly extending link 755. A spring 756, having one end connected to the pin 753 on arm 752 and the other end connected to a pin 757 on link 755, serves to urge said link 755 in a rearward direction. The forward end of the link 755 is connected at 758 to a rearwardly extending arm 760 of an aligning finger 761 (see also Fig. 58). The arm 760 forms one wall of a substantially U-shaped lower portion of an aligning finger 761. Supported at one end by arm 760 are three rollers 762, which are supported at the other end in the other arm 763 of the U-shaped construction. A forwardly extending support bracket 764, secured by screws 765 to the inner-side of the front cross bar 720, passes between the rollers 762 and serves to support and guide, for upward and rearward movement, the aligning finger 761. A slot 766 is provided at the base of the U-shaped construction through which the forward end of the bracket 764 may protrude. The aligning finger 761 rises vertically from its U-shaped base, and is provided with an upwardly and rearwardly extending stop pin 767 suitably guided for vertical and rearward movement in slots formed in the punch chamber.

The above construction is such that, with the cam 97 at its normal zero position (see Fig. 59), i. e., with the keyway at its bottom dead center, the shaft 735 is at its most counter-clockwise position due to the fact that the follower roller 737 rides on the low dwell of the cam. Consequently, the arms 752 and links 755 are in their rearmost positions to retain their respective aligning fingers 761 in effective aligning position. At about 102° rotation of the cam 97, the follower roller 737 begins to ride on the intermediate dwell of the cam by which time the shaft 735 has been rocked clockwise to cause a forward movement of the links 755, thereby moving the aligning fingers 761 and their associated pins 767 forwardly and downwardly out of aligning position. Further rotation of cam 97 causes roller 737 to ride upon the highest dwell (see Fig. 60), during which time the aligning fingers are out of the path of a new card that is being fed into the punch chamber. At about 270° rotation of the cam 97 the roller 737 has ridden off the intermediate dwell, by which time aligning fingers 761 have moved upwardly and rearwardly into full aligning position.

The operation of the elements of the punch mechanism may be briefly illustrated with reference to the same example and assuming the same conditions described hereinbefore in connection with the description of operation of the comparing mechanism, and assuming further that the machine is conditioned to transfer the perforation pattern from the ninety column master card M1 to the eighty column detail cards having corresponding perforation patterns in the sixtieth column.

In the early part of the first machine cycle, during which the several elements are moved from the positions shown in Figs. 22, 23, and 24 to the positions shown in Fig. 26, set pin box 620 is moved upwardly to urge set pins 625 against the lower translator pins 606. However, inasmuch as the translator pins 606 are not depressed until the end of the cycle, all set pins 625 remain in their upper positions when the set pin box 620 is raised. In the early part of the second machine cycle, during which the several elements are moved from the positions shown in Fig. 26 to those of Fig. 27, set pin box 620 is again moved upwardly to urge set pins 625 against the translator pins 606. In this instance, inasmuch as the lower translator pins 606 associated with the IX and VIII upper translator pins 613 were depressed in accordance with the perforation pattern in the master card M1 at the end of the first cycle, the corresponding IX, VIII, and VII set pins are depressed. However, due to the arrangement of the decoding locking slides associated with the depressed pins, only the VIII set pin 625 is locked in its lower position. During the period in which set pin box 620 is elevated, detail card D1 is fed into the punch card chamber and is retained and aligned therein as above described. As set pin box 620 is lowered during the latter part of the cycle, the locked VIII set pin 625 is effective to force its associated punch gag 708 through detail card D1. Inasmuch as detail card D1 is already perforated in the VIII position, the corresponding punch gag 708 merely passes through the existing perforation. However, the II and III punch gags 708, which may be depressed through the sensing of the II and III positions (dotted in Fig. 28) in the master card M1, will be opposed by the solid portions of the card and serve to transfer the additional data in the master card M1 to detail card D1. Thus, the perforation pattern in master card M1 would be transferred to detail card D1, at the end of the cycle following that in which the detail card is sensed.

In most types of operation the entire perforation pattern in the master card is transferred to the detail card in the manner described above. However, in the event that one or more columns of data in the master card are not to be transferred (particularly the comparing data), the corresponding retract slides 665 are set in their effective position to engage locking slides 627, 628, 630 and 631 and prevent the locking of the set pins 625 in such columns. Thus, even though some of the perforation pattern is sensed and transferred to the punch translator, punching will not be effected in such columns.

It will be noted that the above operation may be performed provided that the adjustable lever 704 (Fig. 15) is set in its No. 1 position, i. e., to effect punching on comparison and prevent punching on non-comparison, and provided that the control mechanism is set for comparison as above described. The above operation may also be performed with the adjustable lever 704 set at its "2" position, wherein punching is effected whether a comparison or non-comparison is sensed. In the third cycle the second detail card DX, which was sensed during the second cycle, is passed into the punch card chamber and is retained and aligned therein as above described. At the end of the third cycle, and in the event that the adjustable lever 704 set in its No. 1 position and the control mechanism is set for comparison, the set pins 625 will be prevented from being locked in a lowered position and thereby prevent punching. However, as was above described, punching may be effected in this case if the adjustable lever 704 is moved to its "3" position and the control mechanism is set for non-comparison.

*Master and detail card sorting*

Means for sorting master and detail cards in accordance with the comparison or non-comparison between perforation patterns is substantially similar to that disclosed in the above mentioned Patent 2,211,094, and, therefore, only a brief description of this mechanism is necessary herein.

Referring to Figs. 10, 18, and 22, the master card pocket feed rolls are arranged in suitable side castings 768 supported by brackets 770 secured to frame castings 56 and 57. Master cards pass from master card ejector rolls 447 and are fed over a table plate 771 supported by a cross bar 772 to feed rolls 773 mounted on a transverse shaft 774, journaled in the side castings 768. From feed rolls 773, the cards may be deflected into a front or "eject" pocket 65, or may be fed over a rear set of feed rolls 775 mounted on a transverse shaft 776 journaled in side castings 768 into a rear or "receiver" pocket 64. For rotating feed rolls 773 and 775, a gear 777 (Fig. 22) is fixed to lower eject roll shaft 448 and serves, through an idler 778, to drive a gear 780 fixed on feed roll shaft 774 which, in turn, through a second idler 781, drives a gear 782 on rear feed roll shaft 776. In order to secure relatively positive feeding of the master cards, three sets of skid rolls 783 are pivotally mounted on a cross rod 784 supported by levers 785 pivoted on a cross rod 786, and are urged against their respective feed rolls 773 and 775 by springs 787.

The detail card feed roll mechanism (Figs. 12, 20, and 24) is arranged to convey detail cards from the detail card ejector rolls 193 to a front or "eject" pocket 67, or to a rear or "receiver" pocket 66 in the same manner. Therefore, similar reference characters are used to designate corresponding parts.

For guiding master cards into the master "receiver" pocket 64 (Fig. 22) or master "eject" pocket 65, a card deflector 788 (see also Fig. 18), is arranged between master card pocket feed rolls 773 and 775, and is fixed on a transverse rock shaft 790 journaled in side castings 768. Card deflector 788 is arranged to occupy either of two positions, viz., a horizontal or closed position in which it serves to guide cards from rolls 773 to rolls 775, from whence they are passed to "receiver" pocket 64, or an inclined or open position in which it serves to deflect cards passed from rolls 773 into "eject" pocket 65. The deflector is normally held in its horizontal position whereby, in the absence of further control, all master cards are guided to "receiver" pocket 64. However, as is fully set forth in the above mentioned Patent 2,211,094, the deflector 788 may be rocked to its inclined position under control of the "control mechanism" whenever a non-comparison is sensed, whereby each master card for which there is no corresponding detail card is passed into "eject" pocket 65. For this purpose an arm 791 (Fig. 18) fixed to rock shaft 790 is connected by a link 792 (see also Figs. 15 and 16) to an arm 793 fast on a rock shaft 794. Shaft 794 corresponds to shaft 685, disclosed in the above Patent 2,211,094, and may be operated in the same manner under control of the "control" mechanism. Thus, when a non-comparison is sensed, shaft 794 will be rocked in a clockwise direction as fully set forth in the above patent, whereby link 792 is elevated to rock the deflector 788 to its inclined position. It will be recalled that the actuation of the shaft 794, which serves to rock deflector 788, is effected in the early part of the cycle following that in which the non-comparison is sensed. Thus, deflector 788 is held open during the greater part of the following cycle, and serves to deflect the non-comparing master card, which is passed from the master card sensing chamber during the mid-portion of the cycle, into "eject" pocket 65. In the event the succeeding master card also contains non-comparing perforation pattern, no further movement is imparted to shaft 794, and the succeeding non-comparing master card is also passed to "eject" pocket 65. However, if the succeeding master card contains a comparing perforation pattern, the shaft 794 will be rocked in a counter-clockwise direction, as fully set forth in the patent, whereby deflector 788 is restored to its horizontal position at the beginning of the succeeding cycle to guide the comparing master card to "receiver" pocket 64.

In order to segregate the simultaneously sensed detail cards in a similar manner, a detail card deflector 795 (Figs. 20 and 24) is arranged between detail card pocket feed rolls 775 and 773, and is fixed to a transverse rock shaft 796 journaled in the side castings 768. Fixed to the left end of the rock shaft 796 is a bell crank 797 (Fig. 20) having a pin in its pendant arm protruding through a slot in a horizontal link 798. Bell crank 797 is urged in a counter-clockwise direction, to urge deflector 795 to its inclined position by a spring 800, extended between the pin on the bell crank and a pin on link 798, but is retained in the position, shown in Fig. 20 by a latch plate 801 pivoted at 802 and provided with a shoulder arranged to engage the horizontal arm of the bell crank. Interconnecting rock arm 791 (Fig. 18) and latch plate 801 is a substantially vertical link 803 suspended by a light spring 804 from a pin in rock arm 791 and provided with an elongated slot encompassing the pin. Thus, when shaft 794 is rocked clockwise, as hereinbefore described to open deflector 788, spring 804 tends to elevate link 803 and permit the opening of deflector 795 under control of spring 800.

However, as heretofore described, all detail cards are passed through the punch mechanism after leaving the detail card sensing mechanism, and require an additional cycle to reach their respective card pockets. Therefore, means are provided to prevent the opening of deflector 795 until the cycle following that in which deflector 788 is opened. For this purpose, spring 800 is made substantially stronger than spring 804, whereby it serves to retain bell crank 797 engaged with plate 801 when arm 791 is rocked. Thus, link 803 remains in its lower position and spring 804 is tensioned. In order to release the deflector 795 in the succeeding cycle, the forward end of link 798 is connected to an offset bell crank 805, that is pivotally mounted on transverse shaft 735, and is urged counter-clockwise by a strong spring 807, whereby its follower roller 808 is urged against cam 95 on the rear cam shaft 90. Near the end of the cycle following that in which the non-comparison was sensed, follower roller 808 rides in the low dwell of cam 95 and permits spring 807 to rock bell crank 805 rearwardly. This movement serves to rock bell crank 797 slightly clockwise to disengage latch plate 801, whereby link 803 is immediately elevated by spring 804 to rock latch plate 801 counter-clockwise out of latching position. Immediately before the end of the cycle, cam 95 rocks bell crank 805 clockwise to return link 798 whereby spring 800 is effective to rock bell crank 797 and shaft 796 counter-clockwise to open deflector 795. Thus, at the end of the cycle in which deflector 788 is opened to deflect the non-comparing master card into "eject" pocket 65, deflector 795 is opened. During the next cycle, i. e., during the second cycle following the sensing of the non-comparison, the detail card is passed from the punch chamber and is deflected into "eject" pocket 67.

Near the end of the last mentioned cycle, the roller 808 again rides into the low dwell of cam 95. In this case, since spring 800 has pulled the pin in bell crank 797 to the forward end of the slot in link 798, spring 807 is effective to close deflector 795 and to rock bell crank 797 to a position to engage latch plate 801. In the event another non-comparison is sensed, latch plate 801 is held in rocked position by link 803 and arm 791 and cam 95 is effective at the end of this cycle to reopen deflector 795, whereby the other non-comparing detail card is deflected into "eject" pocket 67. However, if a comparison was sensed, latch plate 801 will have been returned to its latching position and engages bell crank 797 whereby deflector 795 is retained in closed position to guide the comparing detail card to "receiver" pocket 66.

As is fully described in the above mentioned Patent 2,211,094, the "control" mechanism may be adjusted whereby it controls sorting operations conversely to the manner described above, i. e., it causes all comparing master and detail cards to be guided to their respective front or "eject" pockets, and causes all non-comparing detail and master cards to be guided to their respective rear or "receiver" pockets.

While I have described what I consider to be a highly desirable embodiment of my invention, it is obvious that many changes in form could be made without departing from the spirit of my invention, and I therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described having means for sensing data recorded in unlike codes and a comparing mechanism for receiving and comparing said recorded data, the combination with said comparing mechanism, of a decoding mechanism for converting the data sensed in one code to correspond to the data sensed in another code.

2. In a machine of the class described having means for sensing pattern perforations recorded in unlike codes and a comparing mechanism for receiving and comparing pattern perforations recorded in a common code, the combination with said comparing mechanism, of a decoding mechanism for converting the pattern perforations recorded in one code to correspond to pattern perforations recorded in a common code.

3. In a machine of the class described having means for sensing data recorded in unlike codes, a comparing mechanism for receiving and comparing said recorded data, and a punch mechanism operable under control of said comparing mechanism for transferring additional data from one record to another, the combination with said comparing mechanism, of separate decoding means for converting the data sensed in one code to correspond to the data sensed in another code.

4. In a machine of the class described having means for sensing pattern perforations recorded in unlike codes, a comparing mechanism for receiving and comparing pattern perforations in a common code, a punch mechanism for transferring additional pattern perforations from one record to another, and means operable under control of the comparing mechanism for rendering said punch mechanism ineffective when the comparing mechanism receives non-comparing pattern perforations, the combination with said comparing mechanism, of separate decoding means for converting the pattern perforations sensed in one code to said common code and for converting the pattern perforations sensed in said common code to said one code.

5. In a machine of the class described having means for sensing pattern perforations recorded in unlike codes, a comparing mechanism for receiving and comparing pattern perforations in a common code, a punch-mechanism for transferring additional pattern perforations from one record to another, and means operable under control of the comparing mechanism for rendering said punch mechanism ineffective when the comparing mechanism receives comparing pattern perforations, the combination with said comparing mechanism, of separate decoding means for converting the pattern perforations sensed in one code to said common code and for converting pattern perforations sensed in said common code to said one code.

6. In a machine of the class described, the combination of means for sensing records containing pattern perforations in a first code, means for sensing records containing pattern perforations in a second code, means for converting the sensed pattern perforations from the second code to the first code, and means for comparing the pattern perforations sensed in the first code with the converted pattern perforations sensed in the second code.

7. In a machine of the class described, the combination of means for sensing pattern perforations in master records in one code, means for sensing pattern perforations in detail records in another code, decoding means for converting the pattern perforations sensed in the detail records to correspond to the pattern perforations sensed in the master records, and means for comparing said decoded pattern perforations sensed in the detail records with the pattern perforations sensed in the master records.

8. In a machine of the class described having means for sensing master and detail records, and a comparing mechanism for receiving and comparing pattern perforations recorded in said master and detail records, the combination with said comparing mechanism, of an aligning mechanism for positioning said detail records relative to said detail record sensing means, and means operable under control of said comparing means for rendering said aligning means ineffective upon receiving non-comparing pattern perforations.

9. In a machine of the class described having means for sensing master and detail records, and a comparing mechanism for receiving and comparing pattern perforations recorded in said master and detail records, the combination with said comparing mechanism, of an aligning mechanism for positioning said detail records relative to said detail record sensing means, and means operable under control of said comparing means for rendering said aligning means ineffective upon receiving comparing pattern perforations.

10. In a machine of the class described having means for sensing master and detail records, and a comparing mechanism for receiving and comparing pattern perforations recorded in said master and detail records, the combination with said comparing mechanism, of an aligning mechanism for engaging the contiguous edges of said detail records for positioning said records relative to said detail record sensing means, and means operable under control of said comparing mechanism for rendering said aligning means ineffective upon receiving non-comparing pattern perforations.

11. In a machine of the class described having means for sensing master and detail records, and a comparing mechanism for receiving and comparing pattern perforations recorded in master and detail records, the combination with said comparing mechanism, of an aligning mechanism for engaging the contiguous edges of said detail records for positioning said records relative to said detail record sensing means, and means operable under control of said comparing mechanism for rendering said aligning means ineffective upon receiving comparing pattern perforations.

12. In a machine of the class described having means for sensing master records containing pattern perforations in one code and detail records containing pattern perforations in another code, a comparing mechanism for receiving and comparing pattern perforations contained in said master and detail records, and a punch mechanism operable under control of said comparing mechanism for transferring additional pattern perforations from said master records to said detail records, the combination with said comparing mechanism, of a first decoding means for converting the pattern perforations sensed in the detail records to correspond to the pattern perforations sensed in the master records, and a second decoding means for converting the pattern perforations sensed in the master records to correspond to the pattern perforations sensed in the detail records.

13. In a machine of the class described having means for sensing and comparing pattern perforations recorded in unlike codes, and a punch mechanism operable under control of said comparing mechanism for transferring additional pattern perforations from a first record to a second record, the combination with said punch mechanism, of an aligning mechanism for positioning said second record relative to said punch mechanism.

14. In a machine of the class described having means for sensing master and detail records, a comparing mechanism for receiving and comparing pattern perforations recorded in said master and detail records, and a punch mechanism operable under control of said comparing mechanism for transferring additional pattern perforations from said master records to said detail records, the combination with said comparing mechanism, of a first aligning mechanism for positioning said detail records relative to said detail record sensing means, and a second aligning mechanism for positioning said detail records relative to said punch mechanism.

15. In a machine of the class described having means for sensing master and detail records, a comparing mechanism for receiving and comparing pattern perforations recorded in said master and detail records, and a punch mechanism operable under control of said comparing mechanism for transferring additional pattern perforations from said master records to said detail records, the combination with said comparing mechanism, of a first aligning mechanism for positioning said detail records relative to said detail record sensing means, a second aligning mechanism for positioning said detail records relative to said punch mechanism, and means operable under control of said comparing mechanism for rendering said first aligning mechanism ineffective upon receiving non-comparing pattern perforations.

16. In a machine of the class described having means for sensing master and detail records, a comparing mechanism for receiving and comparing pattern perforations recorded in said master and detail records, and a punch mechanism operable under control of said comparing mechanism for transferring additional pattern perforations from said master records to said detail records, the combination with said comparing mechanism, of a first aligning mechanism for positioning said detail records relative to said record sensing means, a second aligning mechanism for positioning said detail records relative to said punch mechanism, and means operable under control of said comparing mechanism for rendering said first aligning mechanism ineffective upon receiving comparing pattern perforations.

17. In a machine of the class described having means for sensing master records in one code, means for sensing detail records in another code, a comparing mechanism for receiving and comparing pattern perforations sensed in said master and detail records in a common code, and a punch mechanism operable under control of said comparing mechanism for transferring additional pattern perforations from said master records to said detail records, the combination with said comparing mechanism, of a first decoding mechanism for converting pattern perforations sensed in the detail record to correspond to the pattern perforations sensed in the master record, a second decoding mechanism for converting pattern perforations sensed in the master record to correspond to the pattern perforations sensed in the detail record, a first aligning mechanism for positioning said detail records relative to said detail record sensing means, and a second aligning mechanism for positioning said detail record relative to said punch mechanism.

18. In a machine for sensing master and detail records, and including a comparing mechanism for comparing perforation patterns in such records, the combination of a punch mechanism for transferring additional perforation patterns from the master records to the detail records, said punch mechanism including a plurality of columns of set pins arranged to effect punching when locked in their lower positions and locking slides operative to retain the set pins in such lower positions, and presettable means operable under control of said comparing mechanism to render a certain preselected number of said locking slides ineffective for retaining said set pins, when the perforation patterns of the master and detail records are not identical.

19. In a machine for sensing master and detail records, and including a comparing mechanism for comparing perforation patterns in such records, the combination of a punch mechanism for transferring additional perforation patterns from the master records to the detail records, said punch mechanism including a plurality of columns of set pins arranged to effect punching when locked in their lower positions and locking slides operative to retain the set pins in such lower positions, and presettable means operable under control of said comparing mechanism to render a certain preselected number of said locking slides ineffective for retaining said set pins, when the perforation patterns of the master and detail records are identical.

20. In a machine for sensing master and detail records, and including a comparing mechanism for comparing perforation patterns in such records, the combination of a punch mechanism for transferring additional perforation patterns from the master records to the detail records, said punch mechanism including a plurality of columns of set pins arranged to effect punching when locked in their lower positions and locking slides operative to retain the set pins in such lower positions, and presettable means operable under control of said comparing mechanism to render a certain preselected number of said locking slides ineffective for retaining said set pins, when the perforation patterns of the master and detail records are not identical and to render a certain preselected number of said locking slides ineffective for retaining said set pins regardless of the action of the comparing mechanism.

21. In a machine for sensing master and detail records, and including a comparing mechanism for comparing perforation patterns in such records, the combination of a punch mechanism for transferring additional perforation patterns from the master records to the detail records, said punch mechanism including a plurality of columns of set pins arranged to effect punching when locked in their lower positions and locking slides operative to retain the set pins in such lower positions, and presettable means operable under control of said comparing mechanism to render a certain preselected number of said locking slides ineffective for retaining said set pins, when the perforation patterns of the master and detail records are identical and to render a certain preselected number of said locking slides ineffective for retaining said set pins regardless of the action of the comparing mechanism.

22. In a machine of the class described having means for sensing master and detail records, and a comparing mechanism for receiving and comparing pattern perforations recorded in said master and detail records, the combination with said comparing mechanism, of a positive aligning mechanism for positioning said detail records relative to said detail record sensing means.

23. In a machine of the class described having means for sensing master and detail records and a comparing mechanism for receiving and comparing pattern perforations recorded in said master and detail records, the combination with said comparing mechanism, of aligning mechanism for engaging the contiguous edges of said detail records for positioning said detail records relative to said detail record sensing means.

24. In a machine of the class described having means for sensing pattern perforations recorded in master and detail records in unlike codes, and a comparing mechanism for receiving and comparing said pattern perforations in either of said codes, the combination with said comparing mechanism of aligning mechanism for positioning said detail records relative to said detail record sensing means.

25. In a machine of the class described having means for sensing pattern perforations recorded in master and detail records in unlike codes, and a comparing mechanism for receiving and comparing said pattern perforations in either of said codes, the combination with said comparing mechanism, of aligning mechanism for engaging the contiguous edges of said detail records for positioning said detail records relative to said detail record sensing means.

26. In a machine of the class described, the combination of means for sensing and comparing pattern perforations recorded in master and detail records in unlike codes, a punch mechanism operable under control of said comparing mechanism for transferring additional pattern perforations from the master records to the detail records, and aligning mechanism for positioning said detail records relative to said punch mechanism.

27. In a machine of the class described, the combination of means for sensing and comparing pattern perforations recorded in master and detail records in unlike codes, a punch mechanism operable under control of said comparing mechanism for transferring additional pattern perforations from the master records to the detail records, and aligning mechanism for engaging the contiguous edges of said detail records for positioning said detail records relative to said punch mechanism.

28. In a machine of the class described, the combination of means for sensing pattern perforations recorded in master and detail records in dissimilar codes, a comparing mechanism for receiving and comparing said pattern perforations, a punch mechanism operable under control of said comparing mechanism for transferring additional pattern perforations from the master records to the detail records in a code similar to that sensed in the detail records, and aligning mechanism for positioning said detail records relative to said punch mechanism.

29. In a machine of the class described, the combination of means for sensing pattern perforations recorded in master and detail records in dissimilar codes, a comparing mechanism for receiving and comparing said pattern perforations, a punch mechanism operable under control of said comparing mechanism for transferring additional pattern perforations from the master records to the detail records in a code similar to that sensed in the detail records, and aligning mechanism for engaging the contiguous edges of said detail records relative to said punch mechanism.

30. In a machine of the class described having means for sensing data recorded in unlike codes, a comparing mechanism for receiving and comparing said recorded data, and a punch mechanism operable under control of said comparing mechanism for transferring additional data from a first record to a second record, the combination with said punch mechanism of a decoding mechanism for converting said additional data sensed in one code to correspond to the data sensed in another code, and aligning mechanism for positioning said second record relative to said punch mechanism.

31. In a machine of the class described having means for sensing data recorded in unlike codes, a comparing mechanism for receiving and comparing said recorded data, and a punch mechanism operable under control of said comparing mechanism for transferring additional data from a first record to a second record, the combination with said punch mechanism, of a decoding mechanism for converting said additional data sensed in one code to correspond to the data sensed in another code.

32. In a machine of the class described having means for sensing pattern perforations recorded in master and detail records in unlike codes, a comparing mechanism for receiving and comparing said recorded pattern perforations, and a punch mechanism operable under control of said comparing mechanism for transferring additional data from the master records to the detail records, the combination with said punch mechanism, of a decoding mechanism for converting said additional pattern perforations sensed in the master records to correspond to the pattern perforations sensed in the detail records.

33. In a machine of the class described having means for sensing master records in one code, means for sensing detail records in another code, a comparing mechanism for receiving and comparing pattern perforations sensed in said master and detail records in a common code, and a punch mechanism operable under control of said comparing mechanism for transferring additional pattern perforations from said master records to said detail records, the combination with said comparing mechanism of a first decoding mechanism for converting pattern perforations sensed in the detail record to correspond to the pattern perforations sensed in the master record, a second decoding mechanism for converting pattern perforations sensed in the master record to correspond to the pattern perforations sensed in the detail record, a first aligning mechanism for positioning said detail records relative to said detail record sensing means, a second aligning mechanism for positioning said detail record relative to said punch mechanism, and means operable under control of said comparing mechanism for rendering said first aligning mechanism ineffective upon receiving non-comparing pattern perforations.

34. In a machine of the class described having means for sensing master records in one code, means for sensing detail records in another code, a comparing mechanism for receiving and comparing pattern perforations sensed in said master and detail records in a common code, a punch mechanism operable under control of said comparing mechanism for transferring additional pattern perforations from said master records to said detail records, the combination with said comparing mechanism, of a first decoding mechanism for converting pattern perforations sensed in the detail record to correspond to the pattern perforations sensed in the master record, a second decoding mechanism for converting pattern perforations sensed in the master record to correspond to the pattern perforations sensed in the detail record, a first aligning mechanism for positioning said detail records relative to said detail record sensing means, a second aligning mechanism for positioning said detail record relative to said punch mechanism, and means operable under control of said comparing mechanism for rendering said first aligning mechanism ineffective upon receiving comparing pattern perforations.

35. In a machine of the class described having means for sensing and comparing perforation patterns recorded in unlike codes, and a punch mechanism for transferring additional perforation patterns from one record to another, the combination with said punch mechanism, of settable means operable under control of said comparing mechanism to render a portion of said punch mechanism ineffective for transferring a preselected number of additional perforation patterns when the perforation patterns sensed in said records are not identical.

36. In a machine of the class described having means for sensing and comparing perforation patterns recorded in unlike codes, and a punch mechanism for transferring additional perforation patterns from one record to another, the combination with said punch mechanism, of settable means operable under control of said comparing mechanism to render a portion of said punch mechanism ineffective for transferring a preselected number of additional perforation patterns when the perforation patterns sensed in said records are identical.

37. In a machine of the class described having means for sensing master and detail records, a comparing mechanism for sensing comparisons and non-comparisons between perforation patterns in such records, and a punch mechanism for transferring additional perforation patterns from the master records to the detail records, the combination with said punch mechanism, of settable means operable under control of said comparing mechanism to render a portion of said punch mechanism ineffective for transferring a preselected number of additional perforation patterns when a non-comparison is sensed and to render a portion of said punch mechanism ineffective for transferring a preselected number of additional perforations regardless of the action of the comparing mechanism.

38. In a machine of the class described having means for sensing master and detail records, a comparing mechanism for sensing comparisons and non-comparisons between perforation patterns in such records, and a punch mechanism for transferring additional perforation patterns from the master records to the detail records, the combination with said punch mechanism, of settable means operable under control of said comparing mechanism to render a portion of said punch mechanism ineffective for transferring a preselected number of additional perforation patterns when a comparison is sensed and to render a portion of said punch mechanism ineffective for transferring a preselected number of additional perforation patterns regardless of the action of the comparing mechanism.

KARL J. BRAUN.
OTTO E. KASE.